US011832255B2

United States Patent
Choi et al.

(10) Patent No.: US 11,832,255 B2
(45) Date of Patent: *Nov. 28, 2023

(54) DATA TRANSMISSION METHOD AND RECEPTION METHOD FOR WIRELESS COMMUNICATION SYSTEM AND DEVICE USING SAME

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/686,643

(22) Filed: Mar. 4, 2022

(65) Prior Publication Data

US 2022/0264549 A1 Aug. 18, 2022

Related U.S. Application Data

(63) Continuation of application No. 16/809,548, filed on Mar. 5, 2020, now Pat. No. 11,304,181, which is a
(Continued)

(30) Foreign Application Priority Data

Sep. 8, 2017 (KR) .......................... 10-2017-0115232
Sep. 17, 2017 (KR) .......................... 10-2017-0119178
(Continued)

(51) Int. Cl.
*H04W 72/20* (2023.01)
*H04W 72/0446* (2023.01)
(Continued)

(52) U.S. Cl.
CPC ........... *H04W 72/20* (2023.01); *H04L 5/0055* (2013.01); *H04W 72/044* (2013.01); *H04W 72/0446* (2013.01)

(58) Field of Classification Search
CPC ............... H04W 72/20; H04W 72/044; H04W 72/0446; H04L 5/0055
See application file for complete search history.

(56) References Cited

U.S. PATENT DOCUMENTS 9,591,621 B2 * 3/2017 Shan ..................... H04L 5/0051
2013/0014419 A1 1/2013 McCrimmon, Jr. et al.
(Continued)

FOREIGN PATENT DOCUMENTS

CN 104584476 4/2015
CN 104852778 8/2015
(Continued)

OTHER PUBLICATIONS

Notice of Allowance dated Sep. 21, 2022 for Korean Patent Application No. 10-2020-7007587 and its English translation provided by Applicant's foreign counsel.
(Continued)

*Primary Examiner* — Raj Jain
(74) *Attorney, Agent, or Firm* — Ladas & Parry, LLP

(57) ABSTRACT

A base station of a wireless communication system is disclosed. The base station of the wireless communication includes a communication module; and a processor configured to control the communication module. The processor receives a radio resource control (RRC) signal from a base station of the wireless communication system through the communication module and determines a time-frequency resource corresponding to at least one resource-set indicated by the RRC signal. The processor receives a physical control channel from the base station through the communication
(Continued)

module, determines a time-frequency resource domain in which physical data channel reception of the terminal is scheduled by the physical control channel, and receives a physical data channel based on a time-frequency resource in which the physical data channel reception of the terminal is scheduled and a time-frequency resource in which the at least one resource-set overlap. The resource-set is a set of time-frequency resources.

10 Claims, 31 Drawing Sheets

Related U.S. Application Data continuation of application No. PCT/KR2018/010576, filed on Sep. 10, 2018.

(30) Foreign Application Priority Data

Nov. 30, 2017 (KR) .......................... 10-2017-0163637
Jan. 12, 2018 (KR) .......................... 10-2018-0004324

(51) Int. Cl.
*H04L 5/00* (2006.01)
*H04W 72/044* (2023.01)

(56) References Cited

U.S. PATENT DOCUMENTS

| | | | | |
|---|---|---|---|---|
| 2013/0114419 | A1* | 5/2013 | Chen | H04W 72/044 370/312 |
| 2014/0164864 | A1* | 6/2014 | Takeda | H04L 5/0055 714/749 |
| 2015/0304995 | A1 | 10/2015 | Yi et al. | |
| 2016/0081043 | A1 | 3/2016 | Seo et al. | |
| 2016/0330700 | A1* | 11/2016 | Lee | H04L 5/0048 |
| 2017/0230994 | A1 | 8/2017 | You et al. | |
| 2017/0302412 | A1* | 10/2017 | Guan | H04L 1/1861 |
| 2018/0013533 | A1* | 1/2018 | Yang | H04L 5/0053 |
| 2018/0054284 | A1 | 2/2018 | Fröberg Olsson et al. | |
| 2019/0372728 | A1* | 12/2019 | Sun | H04L 1/0668 |
| 2020/0213989 | A1 | 7/2020 | Choi et al. | |
| 2022/0191854 | A1* | 6/2022 | Choi | H04L 5/0044 |

FOREIGN PATENT DOCUMENTS

| | | |
|---|---|---|
| KR | 10-2015-0023000 | 3/2015 |
| KR | 10-2018-0108342 | 10/2018 |
| KR | 10-2019-0051730 | 5/2019 |
| WO | 2016/106905 | 7/2016 |
| WO | WO2019/050371 | 3/2019 |

OTHER PUBLICATIONS

Office Action dated Jun. 27, 2022 for Korean Patent Application No. 10-2020-7007587 and its English translation provided by Applicant's foreign counsel.
Notice of Allowance dated Jul. 21, 2022 for European Patent Application No. 18 853 967.0.
Notice of Allowance dated Aug. 2, 2022 for Chinese Patent Application No. 201880064942.4 and its English translation provided by Applicant's foreign counsel.
Notice of Allowance dated Aug. 8, 2022 for Japanese Patent Application No. 2020-513789 and its English translation provided by Applicant's foreign counsel.
International Search Report for PCT/KR2018/010576 dated Jan. 11, 2019 and its English translation from WIPO (now published as WO2019/050371).
Written Opinion of International Search Authority for PCT/KR2018/010576 dated Jan. 11, 2019 and its English translation by Google Translate (now published as WO2019/050371).
Samsung, "Multiplexing NR-PDCCH and PDSCH", R1-1713615. 3GPP TSG RAN WG1, Meeting #90, Prague, Czechia, Aug. 11, 2017 (See pp. 1-3; and figure 1).
LG Electronics. "Discussion on Time-domain Resource Allocation", R1-1713186, 3GPP TSG RAN WG1 Meeting #90, Prague, Czech Republic, Aug. 12, 2017 (See pp. 2-4; and figure 1).
Nokia et al., "Resource Sharing between PDCCH and PDSCH in NR", R1-1714098, 3GPP 1-20 TSG-RAN WG1 #90, Prague, Czech Republic, Aug. 11, 2017 (See pp. 2-4; and figure 2).
Huawei et al., "Dynamic Resource Multiplexing between PDCCH and PDSCH", R1-1712185, 3GPP TSG RAN WG1 Meeting # 90, Prague, Czech Republic, 20, Aug. 12, 2017 (See pp. 1-3; and figures 1-2).
Office Action for European Patent Application No. 18853967.0 dated Feb. 4, 2022.
Office Action for Japanese Patent Application No. 2020-513789 dated Jan. 4, 2022 and its English translation provided by the Applicant's foreign counsel.
Office Action for Chinese Patent Application No. 201880064924.4 dated Jan. 4, 2022 and its English translation provided by the Applicant's foreign counsel.
International Preliminary Report on Patentability (Chapter I) for PCT/KR2018/010576 dated Mar. 10, 2020 and its English translation from WIPO (now published as WO2019/050371).
Office Action for Japanese Patent Application No. 2020-513789 dated Apr. 12, 2021 and its English translation from Global Dossier.
Office Action for Indian Patent Application No. 202027011750 dated Apr. 27, 2021.
Extended European Search Report for European Patent Application No. 18853967.0 dated May 12, 2021.
ZTE Nokia Panasonic Intel Docomo Sharp LGE Samsung Interdigital Mediatek Wilus [Ericsson] [CATT]: "WF on PDCCH/PDSCH resource sharing", R1-1714676, 3GPP TSG RAN WG1 #90, Prague, Czech Republic, Aug. 26, 2017, pp. 1-5.
Notice of Allowance dated Dec. 8, 2021 for U.S. Appl. No. 16/809,548 (now published as U.S. 2020/0213989).
Office Action dated Aug. 13, 2021 for U.S. Appl. No. 16/809,548 (now published as U.S. 2020/0213989).
Notice of Allowance dated Aug. 2, 2022 for Chinese Patent Application No. 201880064924.4 and its English translation provided by Applicant's foreign counsel.
Extended European Search Report dated Feb. 6, 2023 for European Patent Application No. 22211093.4.
Office Action dated Mar. 7, 2023 for U.S. Appl. No. 17/686,592.
Office Action dated Jun. 28, 2023 for U.S. Appl. No. 17/686,592.
Office Action dated Jun. 29, 2023 for Vietnamese Patent Application No. 1-2020-02017 and its English translation provided by Applicant's foreign counsel.
Hearing Notice dated Sep. 27, 2023 for Indian Patent Application No. 202027011750.

\* cited by examiner (a)

(b)

(a)

(b)

(a)

(b)

| State | Starting symbol index | Length | State | Starting symbol index | Length | State | Starting symbol index | Length | State | Starting symbol index | Length |
|---|---|---|---|---|---|---|---|---|---|---|---|
| 0 | 0 | 1 | 16 | 4 | 2 | 32 | 0 | 8 | 48 | - | - |
| 1 | 1 | 1 | 17 | 6 | 2 | 33 | 2 | 8 | 49 | - | - |
| 2 | 2 | 1 | 18 | 8 | 2 | 34 | 4 | 8 | 50 | - | - |
| 3 | 3 | 1 | 19 | 10 | 2 | 35 | 6 | 8 | 51 | - | - |
| 4 | 4 | 1 | 20 | 12 | 2 | 36 | 0 | 10 | 52 | - | - |
| 5 | 5 | 1 | 21 | 0 | 4 | 37 | 2 | 10 | 53 | - | - |
| 6 | 6 | 1 | 22 | 2 | 4 | 38 | 4 | 10 | 54 | - | - |
| 7 | 7 | 1 | 23 | 4 | 4 | 39 | 0 | 12 | 55 | - | - |
| 8 | 8 | 1 | 24 | 6 | 4 | 40 | 2 | 12 | 56 | - | - |
| 9 | 9 | 1 | 25 | 8 | 4 | 41 | 0 | 14 | 57 | - | - |
| 10 | 10 | 1 | 26 | 10 | 4 | 42 | 0 | 7 | 58 | - | - |
| 11 | 11 | 1 | 27 | 0 | 6 | 43 | 7 | 7 | 59 | - | - |
| 12 | 12 | 1 | 28 | 2 | 6 | 44 | - | - | 60 | - | - |
| 13 | 13 | 1 | 29 | 4 | 6 | 45 | - | - | 61 | - | - |
| 14 | 0 | 2 | 30 | 6 | 6 | 46 | - | - | 62 | - | - |
| 15 | 2 | 2 | 31 | 8 | 6 | 47 | - | - | 63 | - | - |

*FIG. 29*

| State | Starting symbol index | Length | State | Starting symbol index | Length | State | Starting symbol index | Length | State | Starting symbol index | Length |
|---|---|---|---|---|---|---|---|---|---|---|---|
| 0 | 0 | 1 | 16 | 4 | 2 | 32 | 0 | 8 | 48 | 6 | 7 |
| 1 | 1 | 1 | 17 | 6 | 2 | 33 | 2 | 8 | 49 | 7 | 7 |
| 2 | 2 | 1 | 18 | 8 | 2 | 34 | 4 | 8 | 50 | - | - |
| 3 | 3 | 1 | 19 | 10 | 2 | 35 | 6 | 8 | 51 | - | - |
| 4 | 4 | 1 | 20 | 12 | 2 | 36 | 0 | 10 | 52 | - | - |
| 5 | 5 | 1 | 21 | 0 | 4 | 37 | 2 | 10 | 53 | - | - |
| 6 | 6 | 1 | 22 | 2 | 4 | 38 | 4 | 10 | 54 | - | - |
| 7 | 7 | 1 | 23 | 4 | 4 | 39 | 0 | 12 | 55 | - | - |
| 8 | 8 | 1 | 24 | 6 | 4 | 40 | 2 | 12 | 56 | - | - |
| 9 | 9 | 1 | 25 | 8 | 4 | 41 | 0 | 14 | 57 | - | - |
| 10 | 10 | 1 | 26 | 10 | 4 | 42 | 0 | 7 | 58 | - | - |
| 11 | 11 | 1 | 27 | 0 | 6 | 43 | 1 | 7 | 59 | - | - |
| 12 | 12 | 1 | 28 | 2 | 6 | 44 | 2 | 7 | 60 | - | - |
| 13 | 13 | 1 | 29 | 4 | 6 | 45 | 3 | 7 | 61 | - | - |
| 14 | 0 | 2 | 30 | 6 | 6 | 46 | 4 | 7 | 62 | - | - |
| 15 | 2 | 2 | 31 | 8 | 6 | 47 | 5 | 7 | 63 | - | - |

*FIG. 30*

| State | Starting symbol index | Length | State | Starting symbol index | Length | State | Starting symbol index | Length | State | Starting symbol index | Length |
|---|---|---|---|---|---|---|---|---|---|---|---|
| 0 | 0 | 1 | 16 | 4 | 2 | 32 | 0 | 8 | 48 | 1 | 4 |
| 1 | 1 | 1 | 17 | 6 | 2 | 33 | 2 | 8 | 49 | 3 | 4 |
| 2 | 2 | 1 | 18 | 8 | 2 | 34 | 4 | 8 | 50 | 5 | 4 |
| 3 | 3 | 1 | 19 | 10 | 2 | 35 | 6 | 8 | 51 | 7 | 4 |
| 4 | 4 | 1 | 20 | 12 | 2 | 36 | 0 | 10 | 52 | 9 | 4 |
| 5 | 5 | 1 | 21 | 0 | 4 | 37 | 2 | 10 | 53 | 1 | 6 |
| 6 | 6 | 1 | 22 | 2 | 4 | 38 | 4 | 10 | 54 | 3 | 6 |
| 7 | 7 | 1 | 23 | 4 | 4 | 39 | 0 | 12 | 55 | 5 | 6 |
| 8 | 8 | 1 | 24 | 6 | 4 | 40 | 2 | 12 | 56 | 7 | 6 |
| 9 | 9 | 1 | 25 | 8 | 4 | 41 | 0 | 14 | 57 | 1 | 8 |
| 10 | 10 | 1 | 26 | 10 | 4 | 42 | 1 | 2 | 58 | 3 | 8 |
| 11 | 11 | 1 | 27 | 0 | 6 | 43 | 3 | 2 | 59 | 5 | 8 |
| 12 | 12 | 1 | 28 | 2 | 6 | 44 | 5 | 2 | 60 | 1 | 9 |
| 13 | 13 | 1 | 29 | 4 | 6 | 45 | 7 | 2 | 61 | 3 | 9 |
| 14 | 0 | 2 | 30 | 6 | 6 | 46 | 9 | 2 | 62 | 1 | 11 |
| 15 | 2 | 2 | 31 | 8 | 6 | 47 | 11 | 2 | 63 | - | - |

*FIG. 31*

| State | Starting symbol index | Length | State | Starting symbol index | Length | State | Starting symbol index | Length | State | Starting symbol index | Length |
|---|---|---|---|---|---|---|---|---|---|---|---|
| 0 | 0 | 1 | 16 | 4 | 2 | 32 | 0 | 8 | 48 | 1 | 4 |
| 1 | 1 | 1 | 17 | 6 | 2 | 33 | 2 | 8 | 49 | 3 | 4 |
| 2 | 2 | 1 | 18 | 8 | 2 | 34 | 4 | 8 | 50 | 5 | 4 |
| 3 | 3 | 1 | 19 | 10 | 2 | 35 | 6 | 8 | 51 | 7 | 4 |
| 4 | 4 | 1 | 20 | 12 | 2 | 36 | 0 | 10 | 52 | 9 | 4 |
| 5 | 5 | 1 | 21 | 0 | 4 | 37 | 2 | 10 | 53 | 1 | 6 |
| 6 | 6 | 1 | 22 | 2 | 4 | 38 | 4 | 10 | 54 | 3 | 6 |
| 7 | 7 | 1 | 23 | 4 | 4 | 39 | 0 | 12 | 55 | 5 | 6 |
| 8 | 8 | 1 | 24 | 6 | 4 | 40 | 2 | 12 | 56 | 7 | 6 |
| 9 | 9 | 1 | 25 | 8 | 4 | 41 | 0 | 14 | 57 | 1 | 8 |
| 10 | 10 | 1 | 26 | 10 | 4 | 42 | 1 | 2 | 58 | 3 | 8 |
| 11 | 11 | 1 | 27 | 0 | 6 | 43 | 3 | 2 | 59 | 5 | 8 |
| 12 | 12 | 1 | 28 | 2 | 6 | 44 | 5 | 2 | 60 | 1 | 9 |
| 13 | 13 | 1 | 29 | 4 | 6 | 45 | 7 | 2 | 61 | 3 | 9 |
| 14 | 0 | 2 | 30 | 6 | 6 | 46 | 9 | 2 | 62 | 0 | 7 |
| 15 | 2 | 2 | 31 | 8 | 6 | 47 | 11 | 2 | 63 | 7 | 7 |

*FIG. 32*

| State | Starting symbol index | Length | State | Starting symbol index | Length | State | Starting symbol index | Length | State | Starting symbol index | Length |
|---|---|---|---|---|---|---|---|---|---|---|---|
| 0 | 0 | 1 | 16 | 2 | 2 | 32 | 5 | 4 | 48 | 6 | 3 |
| 1 | 1 | 1 | 17 | 3 | 2 | 33 | 6 | 4 | 49 | 9 | 3 |
| 2 | 2 | 1 | 18 | 4 | 2 | 34 | 7 | 4 | 50 | 0 | 5 |
| 3 | 3 | 1 | 19 | 5 | 2 | 35 | 8 | 4 | 51 | 5 | 5 |
| 4 | 4 | 1 | 20 | 6 | 2 | 36 | 9 | 4 | 52 | 0 | 6 |
| 5 | 5 | 1 | 21 | 7 | 2 | 37 | 10 | 4 | 53 | 6 | 6 |
| 6 | 6 | 1 | 22 | 8 | 2 | 38 | 0 | 7 | 54 | 0 | 8 |
| 7 | 7 | 1 | 23 | 9 | 2 | 39 | 1 | 7 | 55 | 0 | 9 |
| 8 | 8 | 1 | 24 | 10 | 2 | 40 | 2 | 7 | 56 | 0 | 10 |
| 9 | 9 | 1 | 25 | 11 | 2 | 41 | 3 | 7 | 57 | 0 | 11 |
| 10 | 10 | 1 | 26 | 12 | 2 | 42 | 4 | 7 | 58 | 0 | 12 |
| 11 | 11 | 1 | 27 | 0 | 4 | 43 | 5 | 7 | 59 | 0 | 13 |
| 12 | 12 | 1 | 28 | 1 | 4 | 44 | 6 | 7 | 60 | 0 | 14 |
| 13 | 13 | 1 | 29 | 2 | 4 | 45 | 7 | 7 | 61 | - | - |
| 14 | 0 | 2 | 30 | 3 | 4 | 46 | 0 | 3 | 62 | - | - |
| 15 | 1 | 2 | 31 | 4 | 4 | 47 | 3 | 3 | 63 | - | - |

*FIG. 33*

DATA TRANSMISSION METHOD AND RECEPTION METHOD FOR WIRELESS COMMUNICATION SYSTEM AND DEVICE USING SAME

CROSS-REFERENCE TO RELATED APPLICATIONS

The present application is a continuation of U.S. patent application Ser. No. 16/809,548 filed on Mar. 5, 2020, which is a continuation of International Patent Application No. PCT/KR2018/010576 filed on Sep. 10, 2018, which claims the priority to Korean Patent Application No. 10-2017-0115232 filed in the Korean Intellectual Office on Sep. 8, 2017, Korean Patent Application No. 10-2017-0119178 filed in the Korean Intellectual Office on Sep. 17, 2017, Korean Patent Application No. 10-2017-0163637 filed in the Korean Intellectual Office on Nov. 30, 2017, and Korean Patent Application No. 10-2018-0004324 filed in the Korean Intellectual Office on Jan. 12, 2018, the entire contents of which are incorporated herein by reference.

TECHNICAL FIELD

The present invention relates to a wireless communication system. Specifically, the present invention relates to a data transmission method, a reception method, and a device using the same in a wireless communication system.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE

Technical Problem

An object of an embodiment of the present invention is to provide a method and device for transmitting a signal efficiently in a wireless communication system. Another object of an embodiment of the present invention is to provide a data transmission method, a reception method, and a device using the same in a wireless communication system.

Technical Solution

A terminal of a wireless communication system according to an embodiment of the present invention includes: a communication module; and a processor configured to control the communication module. The processor is configured to receive a radio resource control (RRC) signal from a base station of the wireless communication system through the communication module, determine a time-frequency resource corresponding to at least one resource-set indicated by the RRC signal, receive a physical control channel from the base station through the communication module, determine a time-frequency resource domain in which physical data channel reception of the terminal is scheduled by the physical control channel, and receive a physical data channel based on a time-frequency resource in which the physical data channel reception of the terminal is scheduled and a time-frequency resource in which the at least one resource-set overlap. The resource-set is a set of time-frequency resources.

The overlapping time-frequency resource may be divided into a plurality of sub-resource-sets. The processor may be configured to obtain a rate-matching indicator indicating whether the physical data channel reception is unavailable for each of the plurality of sub-resource-sets from the physical control channel, and receive the physical data channel by determining whether the physical data channel reception is unavailable in a time-frequency resource corresponding to a sub-resource-set for each of the sub-resource-set according to the rate-matching indicator.

The sub-resource-set may be divided based on a frequency domain among the overlapping time-frequency resources without distinction in a time domain.

The at least one resource-set may be respectively identified by indices which are different from each other. The rate-matching indicator may be composed of a plurality of bits, and a sub-resource-set indicated by each of the plurality of bits may be determined based on the indicies.

When the time-frequency resource in which the physical data channel reception of the terminal is scheduled and all of the at least one resource-set do not overlap, the processor may be configured to receive the physical data channel in a time-frequency resource domain in which the reception of the physical data channel of the terminal is scheduled, regardless of the rate-matching indicator.

The physical control channel may be received in a first slot. When a time-frequency resource in which a physical data channel is scheduled and the at least one resource-set overlap in a second slot in which the physical data channel is received, the processor may be configured to perform rate matching to receive the physical data channel in a time-frequency resource, in a time-frequency resource in which the physical data channel is scheduled in the second slot, except for a time-frequency resource in which a time-frequency resource in which the at least one resource-set overlaps with a time-frequency in which the physical data channel is scheduled. In this case, the first slot and the second slot may be different from each other.

A terminal of a wireless communication system according to an embodiment of the present invention includes: a communication module; and a processor configured to control the communication module. The processor is configured to receive a physical control channel, and when physical data channel reception of the terminal is scheduled by the physical control channel in a plurality of slots, receive the physical data channel based on a constant orthogonal frequency division multiplexing (OFDM) symbol position in all slots in which the physical data channel is transmitted.

The physical control channel may be transmitted in a first slot. The processor may be configured to receive a radio resource control (RRC) signal from a base station of the wireless communication system through the communication module and determine a time-frequency resource corresponding to at least one resource-set indicated by the RRC signal, and when a time-frequency resource in which the physical data channel is scheduled and the at least one resource-set overlap in a second slot included in the plurality of slots, perform rate matching to receive the physical data channel in a time-frequency resource except for a time-frequency resource in which the physical data channel is scheduled in the second slot and a time-frequency resource in which the at least one resource-set overlaps. The first slot and the second slot may be different from each other.

A location of a time-frequency resource corresponding to a resource set in which physical data channel reception is unavailable in each of the plurality of slots may be the constant. Rate matching may be performed to receive a physical data channel in a time-frequency resource except for a time-frequency resource corresponding to the location in a time-frequency resource corresponding to the physical data channel scheduled in each of the plurality of slots.

The OFDM symbol location may be indicated by the physical control channel.

An operation method of a terminal of a wireless communication system according to an embodiment of the present invention includes: receiving a radio resource control (RRC) signal from a base station of the wireless communication system through the communication module; determining a time-frequency resource corresponding to at least one resource-set indicated by the RRC signal; receiving a physical control channel from the base station through the communication module; determining a time-frequency resource domain in which physical data channel reception of the terminal is scheduled by the physical control channel; and receiving a physical data channel based on a time-frequency resource in which physical data channel reception of the terminal is scheduled and a time-frequency resource in which the at least one resource-set overlaps. The resource-set is a set of time-frequency resources.

The overlapping time-frequency resource may be divided into a plurality of sub-resource-sets. The determining the time-frequency resource domain in which the physical data channel reception of the terminal is scheduled by the physical control channel may include obtaining a rate-matching indicator indicating whether the physical data channel reception is unavailable for each of the plurality of sub-resource-sets from the physical control channel. The receiving the physical data channel may include receiving the physical data channel by determining whether the physical data channel reception is unavailable in a time-frequency resource corresponding to a sub-resource-set for each of the sub-resource-set according to the rate-matching indicator.

The sub-resource-set may be divided based on a frequency domain among the overlapping time-frequency resources without distinction in a time domain.

The at least one resource-set may be respectively identified by indices which are different from each other. The rate-matching indicator may be composed of a plurality of bits, and a sub-resource-set indicated by each of the plurality of bits may be determined based on the index.

The receiving the physical data channel may include, when the time-frequency resource in which the physical data channel reception of the terminal is scheduled and all of the at least one resource-set do not overlap, receiving the physical data channel in a time-frequency resource domain in which the reception of the physical data channel of the terminal is scheduled, regardless of the rate-matching indicator.

The physical control channel may be received in a first slot. The receiving the physical data channel may include, when a time-frequency resource in which a physical data channel is scheduled and the at least one resource-set overlap in a second slot in which the physical data channel is received, performing rate matching to receive the physical data channel in a time-frequency resource except for a time-frequency resource in which a time-frequency resource in which the at least one resource-set overlaps with a time-frequency in which the physical data channel is scheduled in a time-frequency resource in which a physical data channel is scheduled in the second slot. The first slot and the second slot may be different from each other.

An operation method of a terminal of a wireless communication system according to an embodiment of the present invention includes: receiving a physical control channel; and when physical data channel reception of the terminal is scheduled by the physical control channel in a plurality of slots, receiving the physical data channel based on a constant orthogonal frequency division multiplexing (OFDM) symbol position in all slots in which the physical data channel is transmitted.

The physical control channel may be transmitted in a first slot. The operation method may further include receiving a radio resource control (RRC) signal from a base station of the wireless communication system through the communication module and determining a time-frequency resource corresponding to at least one resource-set indicated by the RRC signal.

The receiving the physical data channel may include, when a time-frequency resource in which the physical data channel is scheduled and the at least one resource-set overlap in a second slot included in the plurality of slots, performing rate matching to receive the physical data channel in a time-frequency resource except for a time-frequency resource in which the physical data channel is scheduled in the second slot and a time-frequency resource in which the at least one resource-set overlaps. The first slot and the second slot may be different from each other.

A location of a time-frequency resource corresponding to a resource set in which physical data channel reception is unavailable in each of the plurality of slots may be constant. The receiving the physical data channel may include performing rate matching to receive a physical data channel in a time-frequency resource except for a time-frequency resource corresponding to the location in a time-frequency resource corresponding to the physical data channel scheduled in each of the plurality of slots.

The OFDM symbol location may be indicated by the physical control channel.

Advantageous Effects

An embodiment of the present invention provides a method for efficiently transmitting data, a method of receiving data, and a device using the same in a wireless communication system.

Effects obtainable from various embodiments of the present disclosure are not limited to the above-mentioned effects, and other effects not mentioned above may be clearly derived and understood to those skilled in the art from the following description.

DESCRIPTION OF DRAWINGS

FIGS. 29 to 33 illustrate an OFDM symbol corresponding to a physical data channel scheduled for a terminal represented by 6 bits of an RRC signal in a wireless communication system according to another embodiment of the present invention.

MODE FOR CARRYING OUT THE INVENTION

Figure 1:
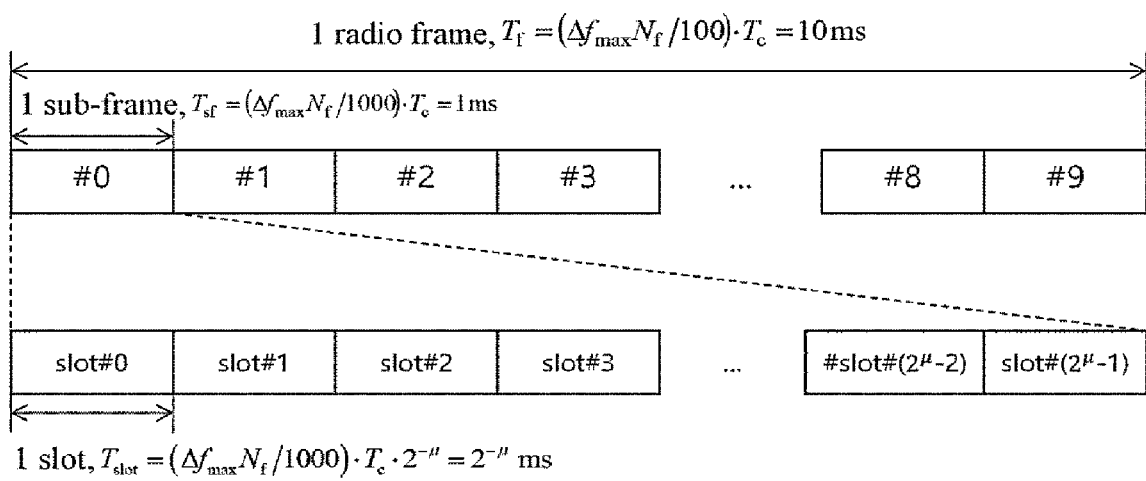
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified in this specification, a base station may refer to a next generation node B (gNB) as defined in 3GPP NR. Furthermore, unless otherwise specified, a terminal may refer to a user equipment (UE).

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100$)*In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one subframe. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe number), and a slot number (or a slot index).

Figure 2:
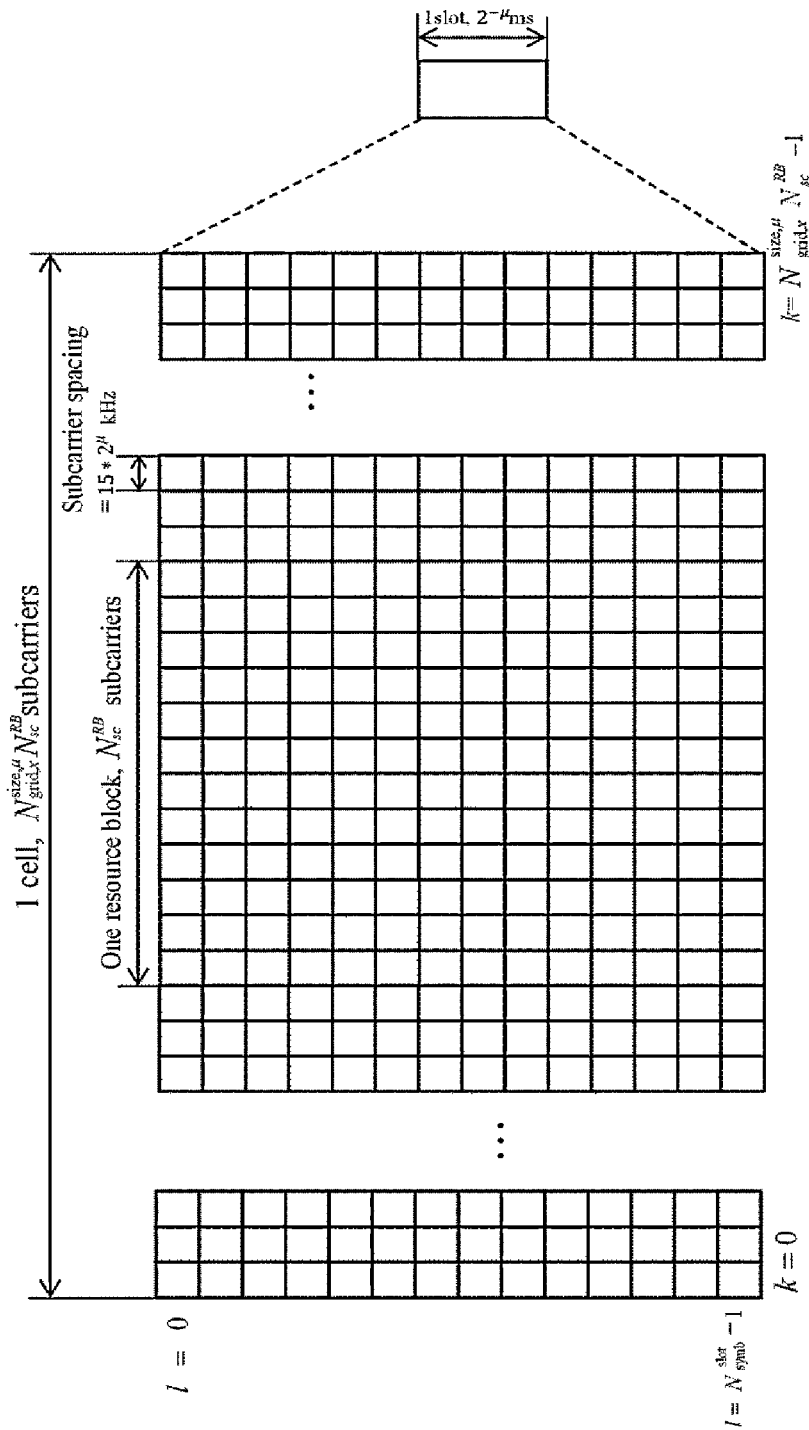
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e.g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb} * N^{RB}_{sc}$ resource elements. Each resource element in the resource grid can be uniquely defined by a pair of indexes (k, 1) in one slot. k may be an index assigned from 0 to $N^{size,\mu}_{grid,x} * N^{RB}_{sc} - 1$ in the frequency domain, and 1 may be an index assigned from 0 to $N^{slot}_{symb} - 1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated by a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| | Symbol number in a slot | | | | | | | | | | | | | | | Symbol number in a slot | | | | | | | | | | | | | |
|---|---|---|---|---|---|---|---|---|---|---|---|---|---|---|---|---|---|---|---|---|---|---|---|---|---|---|---|---|---|
| Index | 0 | 1 | 2 | 3 | 4 | 5 | 6 | 7 | 8 | 9 | 10 | 11 | 12 | 13 | Index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D | 28 | D | D | D | D | D | D | D | D | D | D | D | D | X | U |
| 1 | U | U | U | U | U | U | U | U | U | U | U | U | U | U | 29 | D | D | D | D | D | D | D | D | D | D | D | X | X | U |
| 2 | X | X | X | X | X | X | X | X | X | X | X | X | X | X | 30 | D | D | D | D | D | D | D | D | D | D | X | X | X | U |
| 3 | D | D | D | D | D | D | D | D | D | D | D | D | D | X | 31 | D | D | D | D | D | D | D | D | D | D | D | X | U | U |
| 4 | D | D | D | D | D | D | D | D | D | D | D | D | X | X | 32 | D | D | D | D | D | D | D | D | D | D | X | X | U | U |
| 5 | D | D | D | D | D | D | D | D | D | D | D | X | X | X | 33 | D | D | D | D | D | D | D | D | D | X | X | X | U | U |
| 6 | D | D | D | D | D | D | D | D | D | D | X | X | X | X | 34 | D | X | U | U | U | U | U | U | U | U | U | U | U | U |
| 7 | D | D | D | D | D | D | D | D | D | X | X | X | X | X | 35 | D | D | X | U | U | U | U | U | U | U | U | U | U | U |
| 8 | X | X | X | X | X | X | X | X | X | X | X | X | X | U | 36 | D | D | D | X | U | U | U | U | U | U | U | U | U | U |
| 9 | X | X | X | X | X | X | X | X | X | X | X | X | U | U | 37 | D | X | U | U | U | U | U | U | U | U | U | U | U | U |
| 10 | X | U | U | U | U | U | U | U | U | U | U | U | U | U | 38 | D | D | X | U | U | U | U | U | U | U | U | U | U | U |
| 11 | X | X | U | U | U | U | U | U | U | U | U | U | U | U | 39 | D | D | D | X | U | U | U | U | U | U | U | U | U | U |
| 12 | X | X | X | U | U | U | U | U | U | U | U | U | U | U | 40 | D | X | X | U | U | U | U | U | U | U | U | U | U | U |

TABLE 1-continued

| | Symbol number in a slot | | | | | | | | | | | | | | | Symbol number in a slot | | | | | | | | | | | | | |
|---|---|---|---|---|---|---|---|---|---|---|---|---|---|---|---|---|---|---|---|---|---|---|---|---|---|---|---|---|---|
| Index | 0 | 1 | 2 | 3 | 4 | 5 | 6 | 7 | 8 | 9 | 10 | 11 | 12 | 13 | Index | 0 | 1 | 2 | 3 | 4 | 5 | 6 | 7 | 8 | 9 | 10 | 11 | 12 | 13 |
| 13 | X | X | X | X | U | U | U | U | U | U | U | U | U | U | 41 | D | D | K | X | X | U | U | U | U | U | U | U | U | U |
| 14 | X | X | X | X | X | U | U | U | U | U | U | U | U | U | 42 | D | D | D | X | X | X | U | U | U | U | U | U | U | U |
| 15 | X | X | X | X | X | X | U | U | U | U | U | U | U | U | 43 | D | D | D | D | D | D | D | D | D | X | X | X | X | U |
| 16 | D | X | X | X | X | X | X | X | X | X | X | X | X | X | 44 | D | D | D | D | D | D | X | X | X | X | X | X | U | U |
| 17 | D | D | X | X | X | X | X | X | X | X | X | X | X | X | 45 | D | D | D | D | D | X | X | X | U | U | U | U | U | U |
| 18 | D | D | D | X | X | X | X | X | X | X | X | X | X | X | 46 | D | D | D | D | D | X | U | D | D | D | D | X | U |
| 19 | D | X | X | X | X | X | X | X | X | X | X | X | X | U | 47 | D | D | X | U | U | U | U | D | D | X | U | U | U | U |
| 20 | D | D | X | X | X | X | X | X | X | X | X | X | X | U | 48 | D | X | U | U | U | U | U | D | X | U | U | U | U | U |
| 21 | D | D | D | X | X | X | X | X | X | X | X | X | X | U | 49 | D | D | D | D | X | U | D | D | D | D | X | U | U |
| 22 | D | X | X | X | X | X | X | X | X | X | X | X | U | U | 50 | D | D | X | X | U | U | D | D | X | X | U | U | U |
| 23 | D | D | X | X | X | X | X | X | X | X | X | X | U | U | 51 | D | X | X | U | U | U | D | X | X | U | U | U | U |
| 24 | D | D | D | X | X | X | X | X | X | X | X | X | U | U | 52 | D | X | X | X | X | U | D | X | X | X | X | U |
| 25 | D | X | X | X | X | X | X | X | X | X | X | U | U | U | 53 | D | D | X | X | X | U | D | D | X | X | X | U |
| 26 | D | D | X | X | X | X | X | X | X | X | X | U | U | U | 54 | X | X | X | X | X | X | D | D | D | D | D | D |
| 27 | D | D | D | X | X | X | X | X | X | X | X | U | U | U | 55 | D | D | X | X | X | U | U | U | D | D | D | D | D |
| 56-255 | | | | | | | | | | | | | | | Reserved | | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
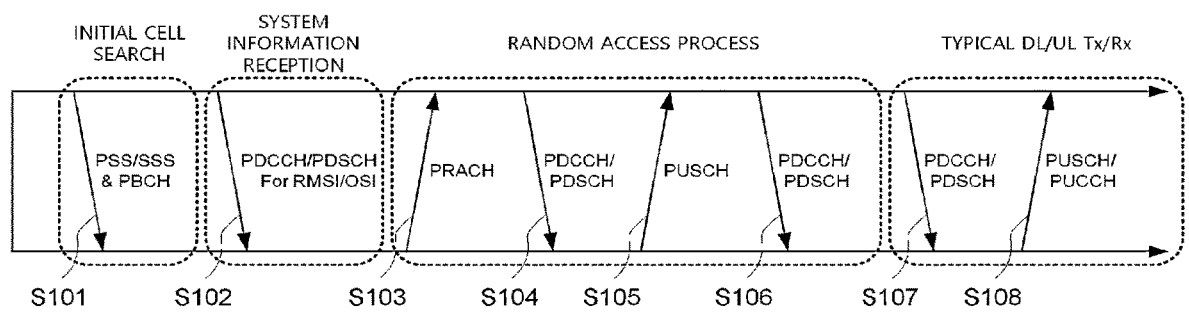
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the use enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
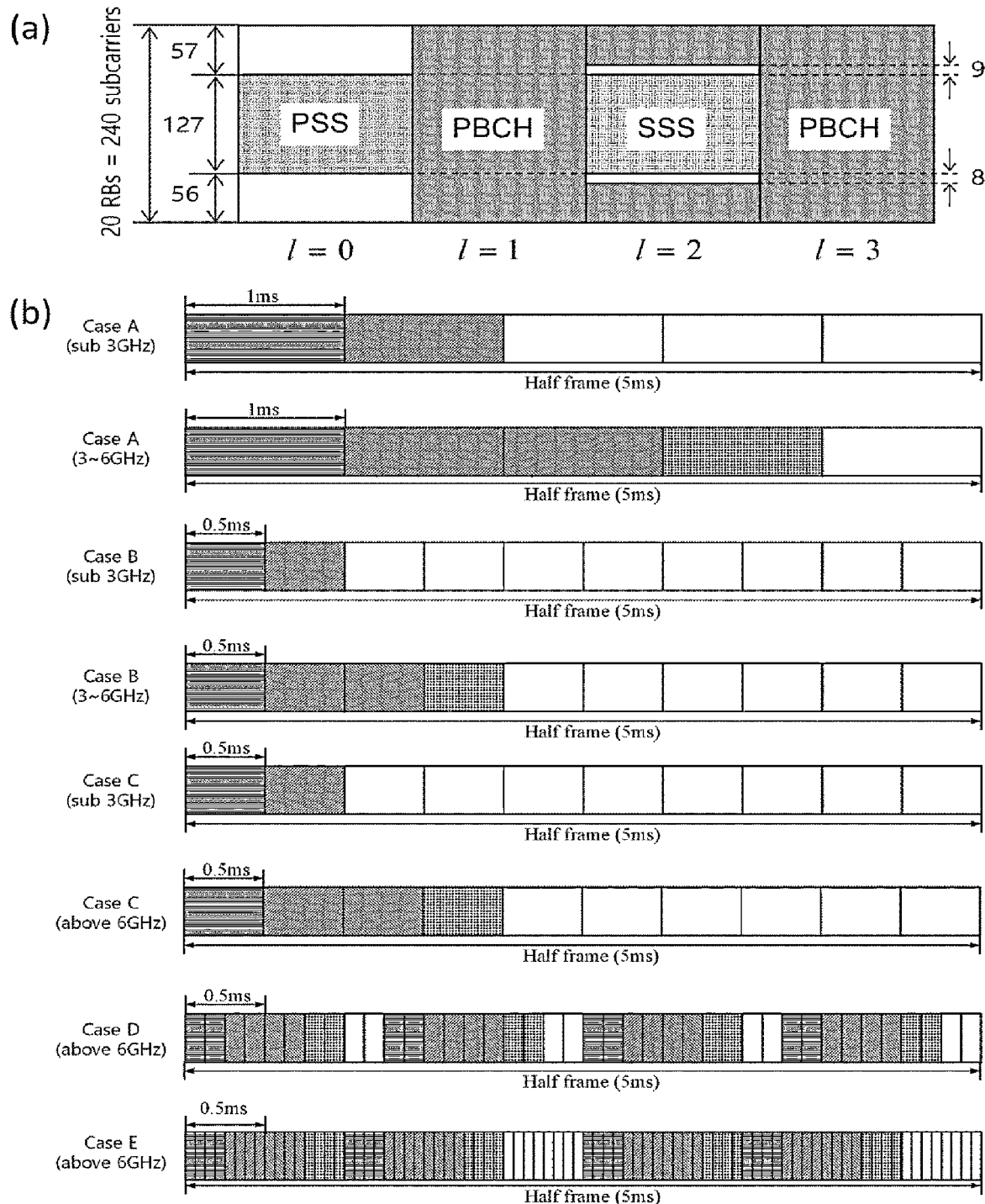
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4A and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number l relative to the start of an SS/PBCH block | Subcarrier number k relative to the start of an SS/PBCH block |
| --- | --- | --- |
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$d_{PSS}(n)=1-2x(m)$ $m=(n+43N_{ID}^{(2)})\mod 127$ $0 \le n < 127$

Here, $x(i+7)=(x(i+4)+x(i))\mod 2$ and is given as
[x(6) x(5) x(4) x(3) x(2) x(1) x(0)]=[1 1 1 0 1 1 0]
Further, the sequence $d_{SSS}(n)$ of the SSS is as follows.

$d_{SSS}(n) = [1 - 2x_0((n + m_0)\mod 127)][1 - 2x_1((n + m_1)\mod 127)]$ $m_0 = 15 \left\lfloor \frac{N_{ID}^{(1)}}{112} \right\rfloor + 5N_{ID}^{(2)}$ $m_1 = N_{ID}^{(1)} \mod 112$ $0 \le n < 127$ Here, $x_0(i+7)=(x_0(i+4)+x_0(i))\mod 2$ $x_1(i+7)=(x_1(i+1)+x_1(i))\mod 2$ and is given as
[$x_0(6)$ $x_0(5)$ $x_0(4)$ $x_0(3)$ $x_0(2)$ $x_0(1)$ $x_0(0)$]=[0 0 0 0 0 0 1]
[$x_1(6)$ $x_1(5)$ $x_1(4)$ $x_1(3)$ $x_1(2)$ $x_1(1)$ $x_1(0)$]=[0 0 0 0 0 0 1]

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5:
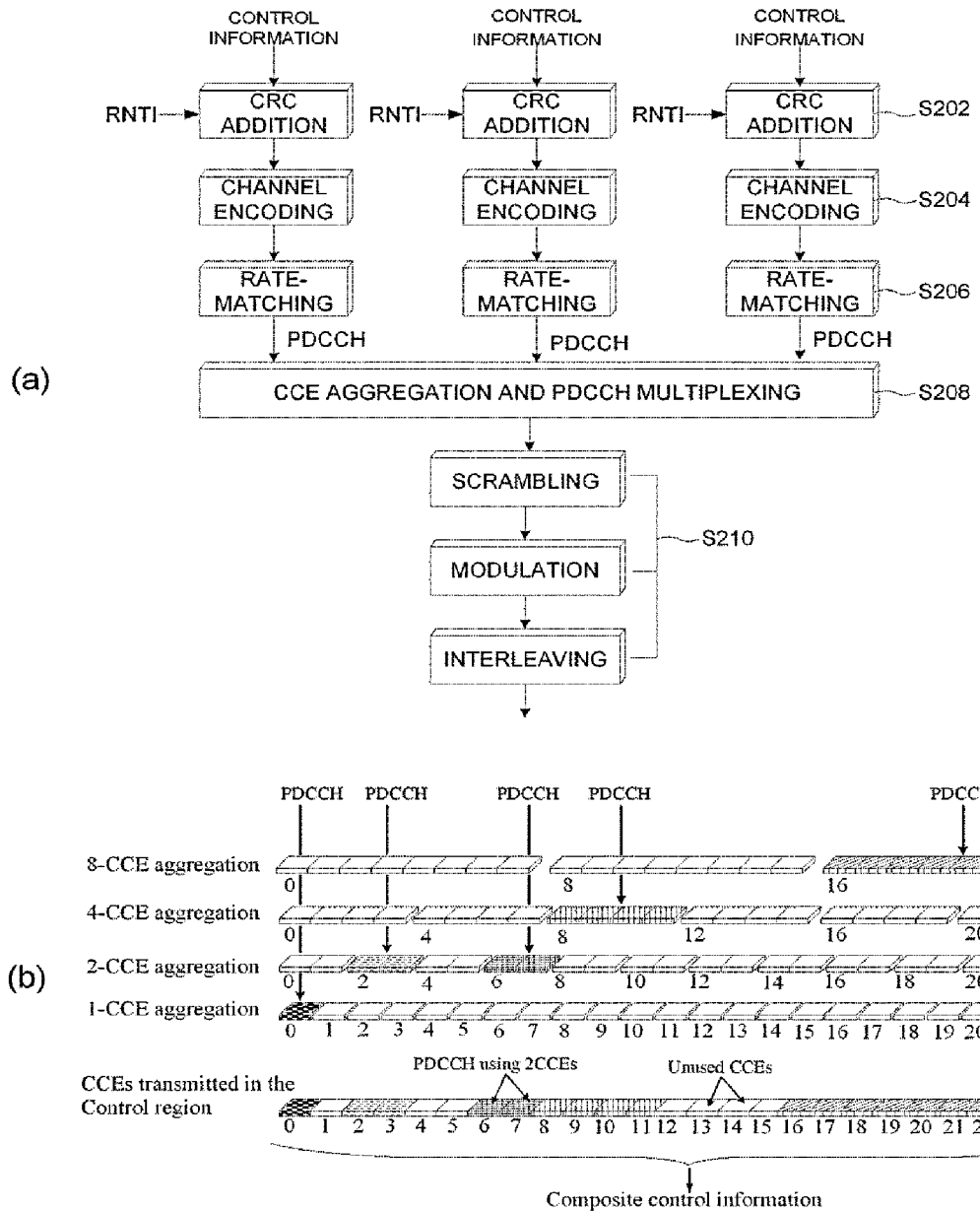
FIG. 5 illustrates a procedure for transmitting control information and a control channel in a 3GPP NR system.

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
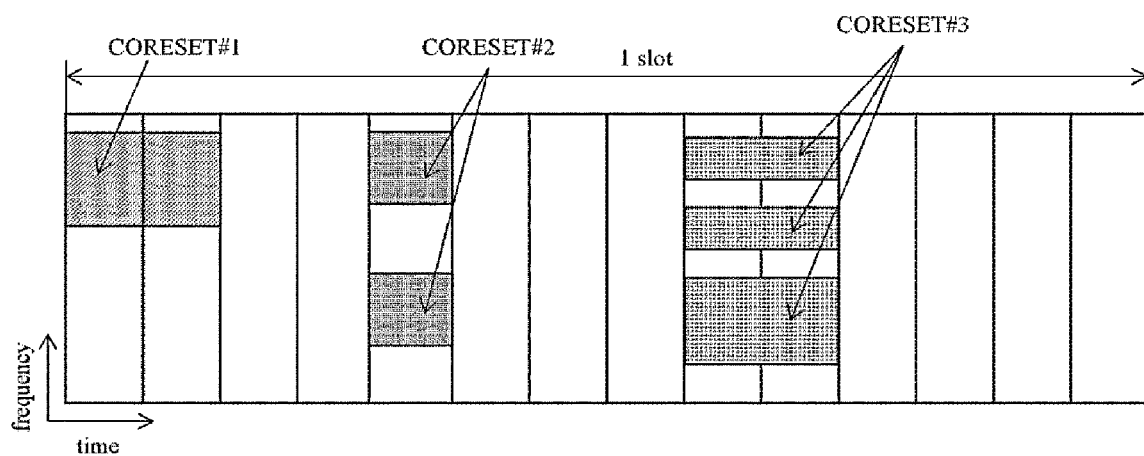
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
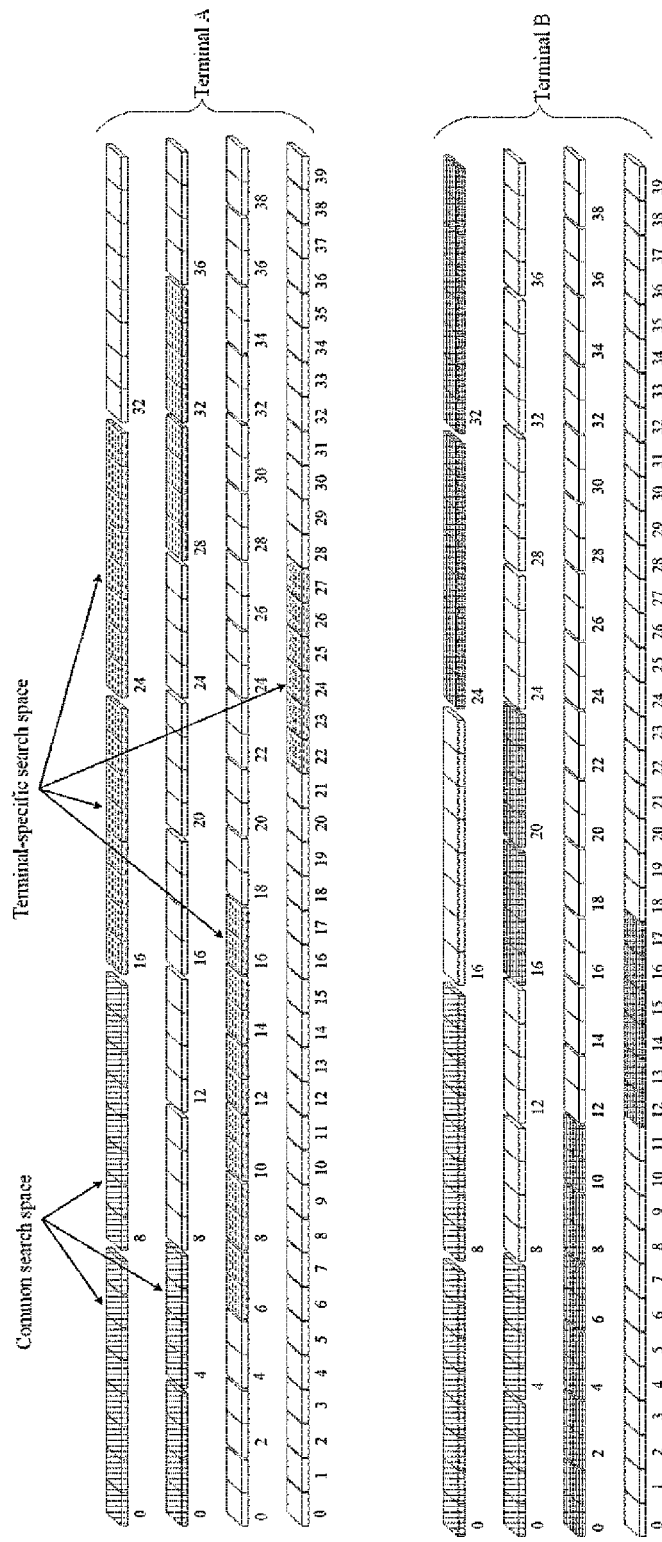
FIG. 7 illustrates a method for configuring a PDCCH search space in a 3GPP NR system.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), ..., d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
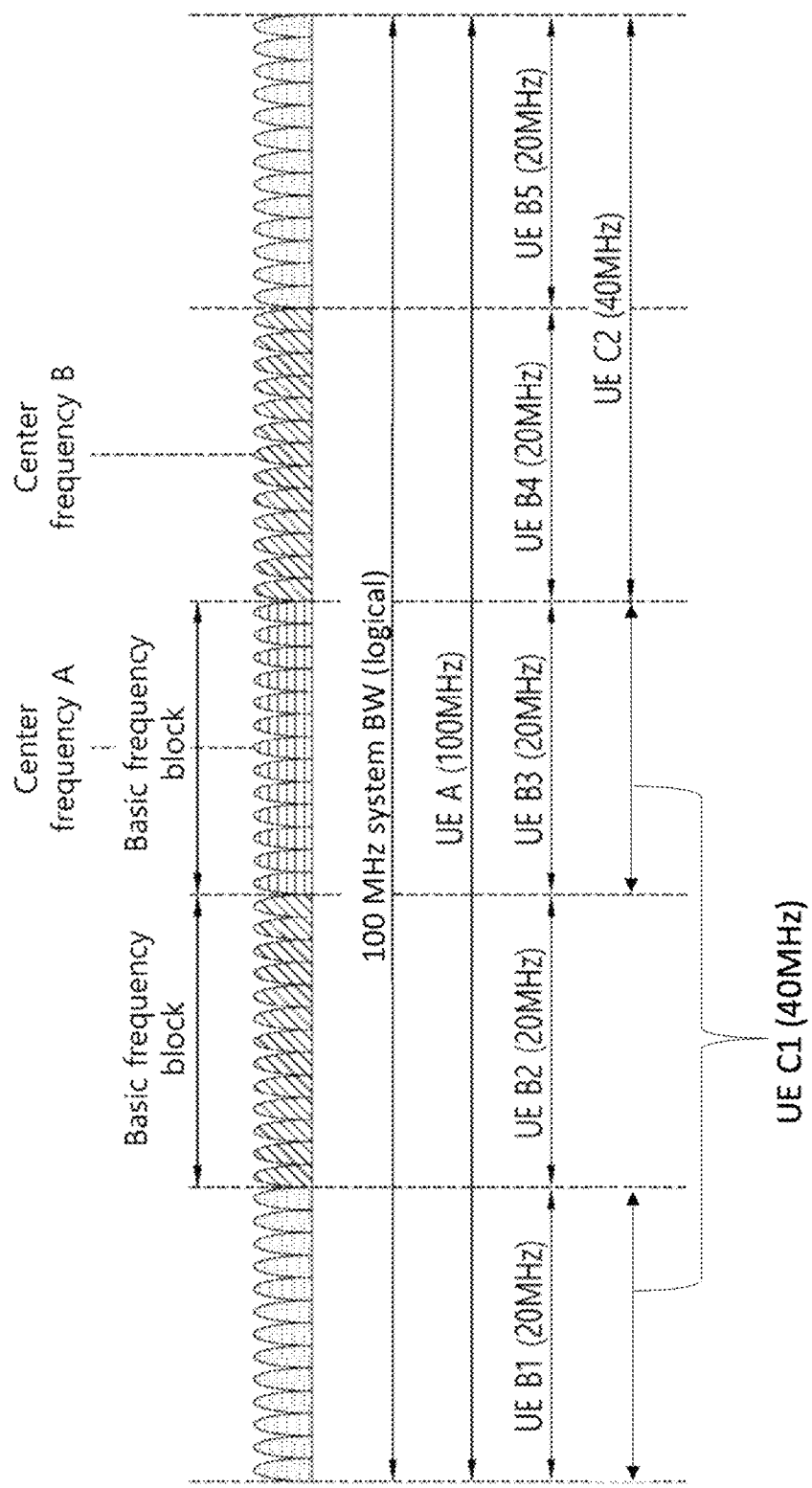
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
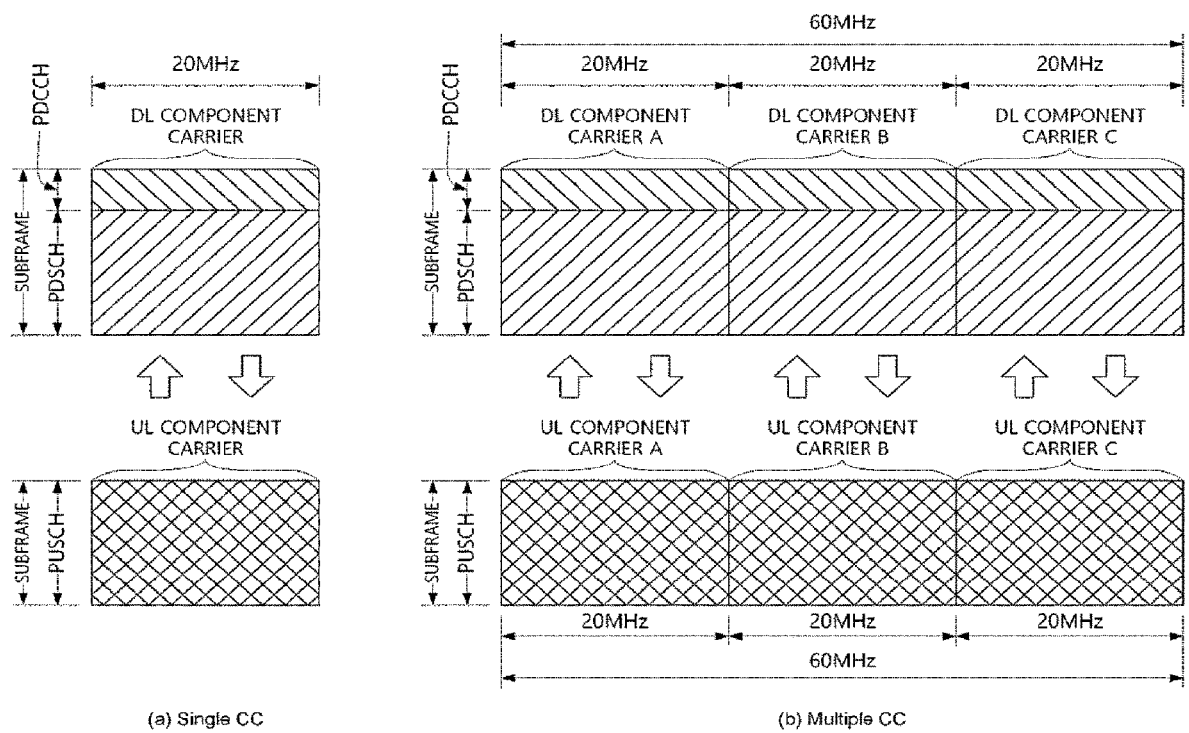
FIG. 9 is a diagram for explaining signal carrier communication and multiple carrier communication.

FIG. 9 is a drawing for explaining signal carrier communication and multiple carrier communication. Particularly, FIG. 9A shows a single carrier subframe structure and FIG. 9B shows a multi-carrier subframe structure.

Referring to FIG. 9A, in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9B, three 20 MHz component carriers (CCs) can be aggregated into each of UL and DL, so that a bandwidth of 60 MHz can be supported. Each CC may be adjacent or non-adjacent to one another in the frequency domain. FIG. 9B shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
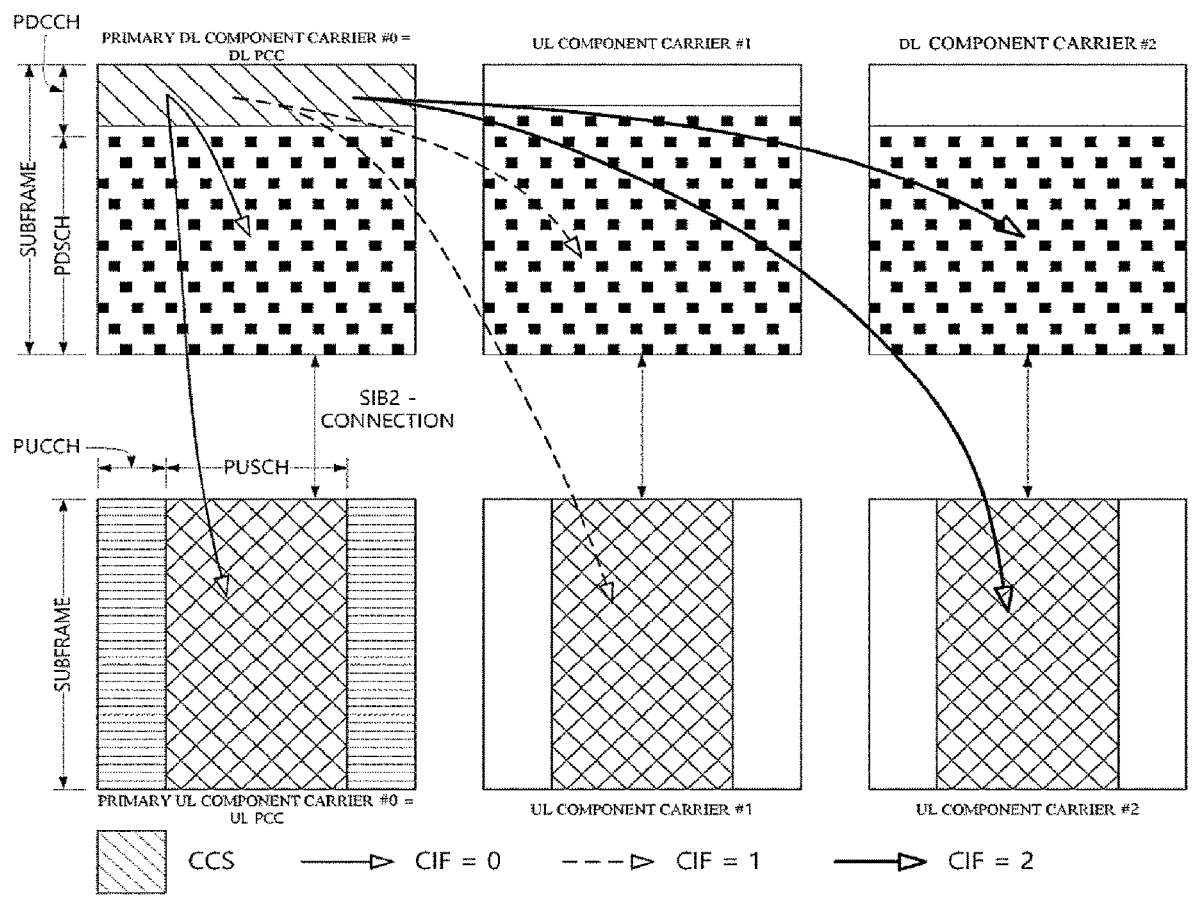
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
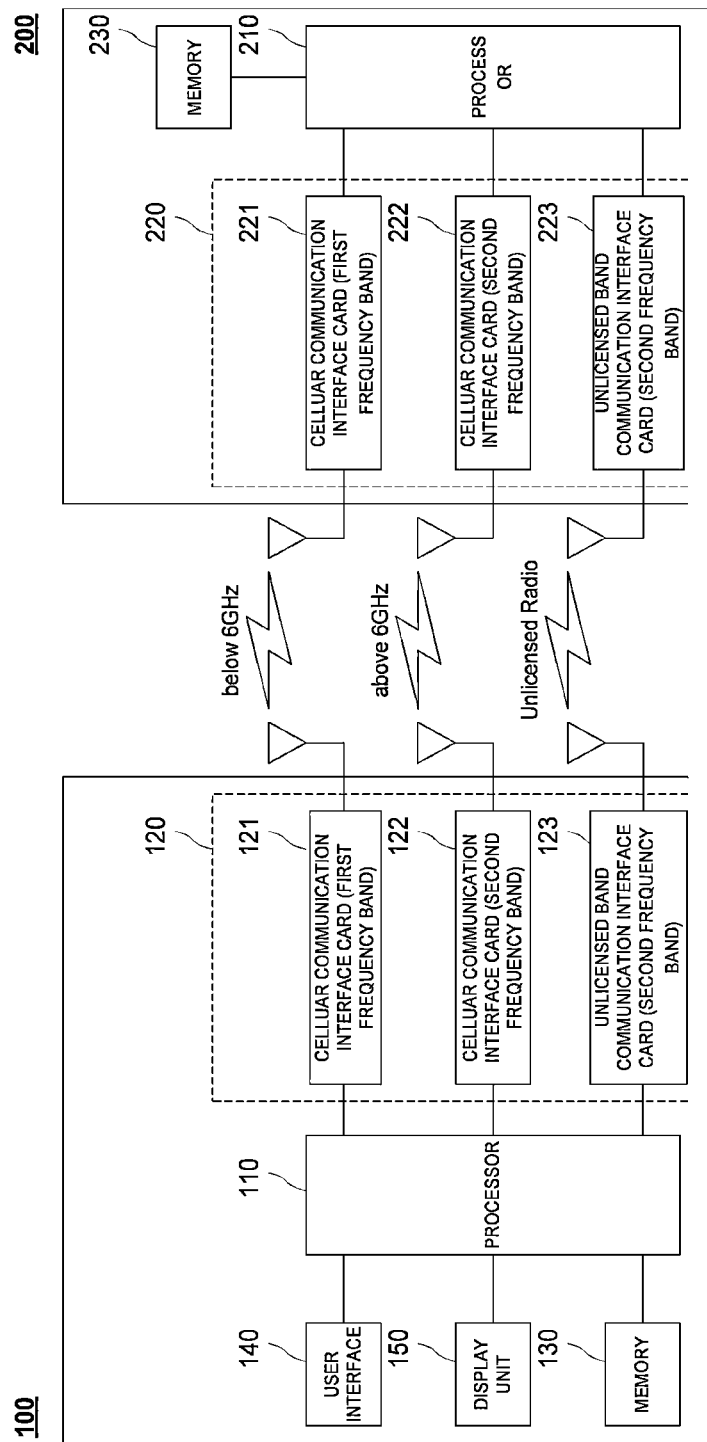
FIG. 11 is a block diagram showing the configurations of a UE and a base station according to an embodiment of the present disclosure.

FIG. 11 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the base station 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the base station 100, an external device, and a server in accordance with the cellular communication standards or protocols in the frequency bands less than 6 GHz supported by the corresponding NIC module.

The cellular communication interface card 222 may transmit or receive a radio signal with at least one of the base station 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the base station 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

Figure 12:
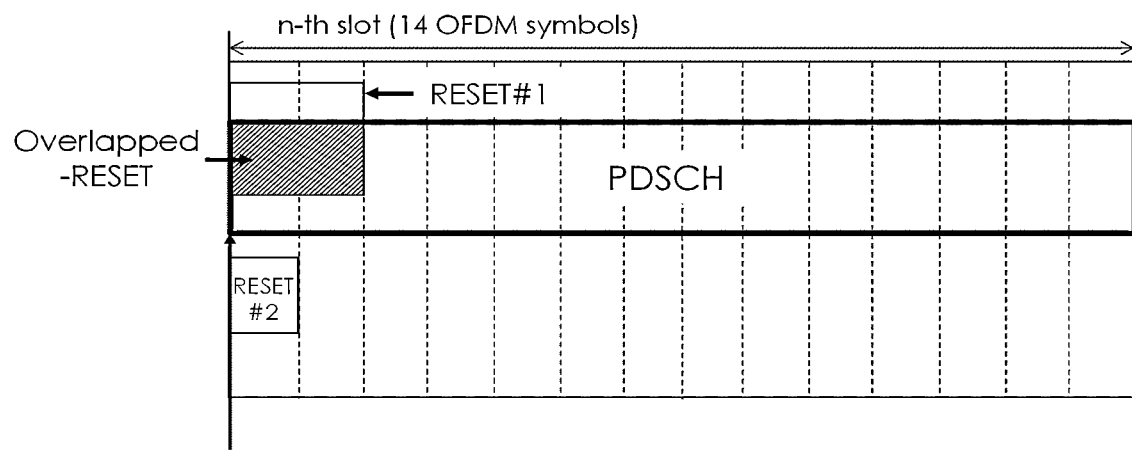
FIG. 12 illustrates a resource-set used in a wireless communication system according to an embodiment of the present invention.
Figure 12:
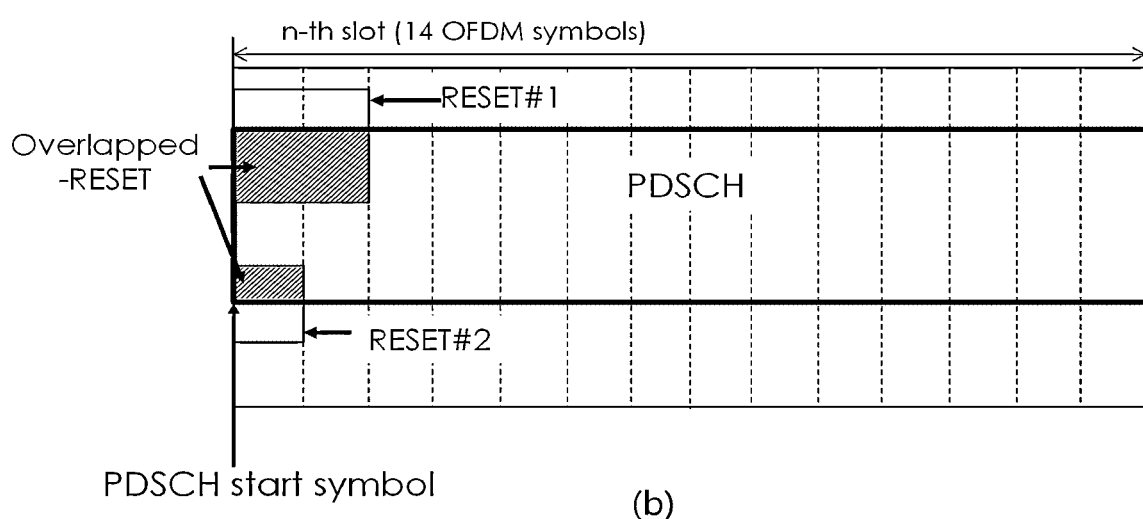

FIG. 12 illustrates a resource-set used in a wireless communication system according to an embodiment of the present invention.

The base station may use a resource-set (RESET), which is a set of time-frequency resources for indicating whether the corresponding resources can be used by the UE to receive a physical data channel. In more detail, the base station may use a resource-set to signal time-frequency resources that the UE cannot use for receiving a physical data channel. The UE may determine a time-frequency resource corresponding to at least one RESET through at least an RRC signal for initial cell access. In a specific embodiment, the base station may indicate in which RESET the UE cannot receive the physical data channel using the field of the DCI. For convenience of description, a field of DCI indicating whether the RESET can be used to receive a physical data channel is referred to as a RESET field. When rate matching is used for physical data channel reception, the RESET field may be referred to as a rate-matching indicator. In addition, when puncturing is used to receive a physical data channel, the RESET field may be referred to as a puncturing indicator. The base station may indicate one or a plurality of RESETs using the RRC signal. In more detail, the base station may indicate a time-frequency resource corresponding to the RESET by using an RRC signal. In addition, the base station may indicate whether one or a plurality of RESETs cannot be used for receiving the physical data channel using the L1 signaling or the DCI scheduling the physical data channel. In this case, the base station may signal the length of the field of the DCI for indicating whether one or a plurality of RESETs can be used for physical data channel reception using the RRC signal. In addition, according to the RESET configuration of the base station, the RESET may include all or part of the above-described CORESET. In more detail, the RESET may be designated in units of CORESET. For example, the RESET may be designated in a single CORESET or a plurality of CORESET units.

The UE may receive a physical data channel based on a time-frequency resource in which a time-frequency resource scheduled for the physical data channel reception of the UE overlaps a time-frequency resource corresponding to the RESET indicated as unavailable for the physical data channel reception. In this case, the time-frequency resource scheduled for the physical data channel reception of the UE may indicate a time-frequency resource scheduled for physical data channel reception of the UE by the DCI of the physical control channel. In more detail, the DCI scheduling the physical data channel may indicate a time-frequency resource in which the physical data channel reception is scheduled to the UE through time domain information and frequency domain information of a time-frequency resource in which physical data channel reception is scheduled. In this case, the time domain information may include an index of a start OFDM symbol of a slot in which reception of a physical data channel is scheduled. In addition, the DCI scheduling the physical data channel may indicate a time-frequency resource in which the physical data channel reception of the UE is scheduled using the information indicating the frequency band in which the physical data channel reception of the UE is scheduled. In this case, the information indicating the frequency band in which the physical data channel reception is scheduled may be indicated in units of PRBs or PRB groups. In more detail, the UE may determine the remaining time-frequency resource as the resource for receiving the physical data channel except for the RESET indicated as unavailable for receiving the physical data channel among the time-frequency resources scheduled for physical data channel reception. The UE determines a time-frequency resource scheduled for the physical data channel reception of the UE according to the DCI scheduling the physical data channel. Through this, the UE can determine a time-frequency resource in which the time-frequency resource corresponding to the RESET configured with the RRC signal overlaps the time-frequency resource scheduled for the physical data channel reception indicated by the DCI. For convenience of description, the time-frequency resource in which the time-frequency resource corresponding to the RESET configured for the UE overlaps the time-frequency resource scheduled for the physical data channel reception, is referred to as an overlapped-resource set (overlapped-RESET). If the time-frequency resource corresponding to the RESET that can be used for physical data channel reception and the time-frequency resource scheduled for physical data channel reception do not overlap, the UE may determine that the physical data channel reception is available in all of the time-frequency resources in which the physical data channel reception is scheduled. Specifically, when the time-frequency resource corresponding to the RESET that can be used for physical data channel reception and the time-frequency resource scheduled for physical data channel reception overlap, the UE may receive the physical data channel by performing rate matching based on the RESET field transmitted in the DCI scheduling the physical data channel. In this case, the UE may receive a physical data channel by performing rate matching in the time-frequency resource except for the time-frequency resource corresponding to the RESET in which the RESET field indicates that the physical data channel reception is unavailable in the time-frequency resource in which the physical data channel is scheduled. In another specific embodiment, when a time-frequency resource corresponding to a RESET that cannot be used for physical data channel reception and a time-frequency resource scheduled for physical data channel reception overlap, the UE may perform puncturing based on the RESET field. In this case, the UE may receive a physical data channel by performing puncturing on the time-frequency resource corresponding to the RESET in which the RESET field indicates that the physical data channel reception is unavailable in the time-frequency resource in which the physical data channel is scheduled. In addition, if the time-frequency resource corresponding to the RESET that cannot be used for physical data channel reception and the time-frequency resource scheduled for physical data channel reception do not overlap, the UE may determine that the physical data channel reception is available in all of the time-frequency resources scheduled for the physical data channel reception regardless of the value of the RESET field.

According to the above description, a time-frequency resource may be configured for the UE, which may be unavailable for reception of a physical data channel according to an RRC signal, and the UE may determine a time-frequency resource that cannot be actually used for reception of a physical data channel among corresponding time-frequencies indicated by the DCI. If the base station configures a time-frequency resource that cannot be used for reception of a physical data channel using only the RRC signal, since the availability of resources changes over time, even if the resource is actually available for reception of a physical data channel, the resource may not always be available. Therefore, the spectral efficiency may decrease. If the base station indicates a time-frequency resource that should not be used for reception of a physical data channel by DCI alone, since the base station must signal all information related to time-frequency resources that are unavailable for physical data channel reception each time through DCI, the overhead of the physical control channel can be increased. Accordingly, according to the embodiments of the present invention, the base station may increase the spectral efficiency or reduce the overhead of the physical control channel through the combination of the DCI with the RRC signal.

In the embodiment of FIG. 12, the first RESET RESET #1 and the second RESET RESET #2 are configured in the n-th slot by the RRC signal. In the embodiment of FIG. 12(*a*), a time-frequency resource scheduled for PDSCH reception of a UE by DCI overlaps a part of the first RESET RESET #1. Accordingly, the UE determines the time-frequency resource in which the PDSCH reception of the UE is scheduled by the DCI and the time-frequency resource in which the first RESET RESET #1 is overlapped as an overlapped-RESET. In the embodiment of FIG. 12(*b*), a time-frequency resource scheduled for PDSCH reception of a UE by DCI overlaps a part of the first RESET RESET #1. In addition, a time-frequency resource scheduled for PDSCH reception of a UE by DCI overlaps a part of the second RESET RESET #2. Accordingly, the UE determines the time-frequency resource in which the PDSCH reception of the UE is scheduled by the DCI and the time-frequency resource in which each of the first RESET RESET #1 and the second RESET RESET #2 overlaps as an overlapped-RESET.

The UE may not determine the time-frequency resource occupied by the RESET not configured for the UE in the current slot or may determine the time-frequency resource only through separate signaling. In addition, it may be difficult for the UE to determine whether the RESET configured for the UE can receive the physical data channel in the future slot. In addition, it may be difficult for the UE to determine a time-frequency resource occupied by a physical control channel dynamically allocated to a CORESET included in the RESET configured for the UE in a future slot. As a result, it may be difficult for the UE to determine a time-frequency resource for the UE to perform physical data channel reception. Accordingly, the UE may receive starting symbol information indicating a location of an OFDM symbol at which physical data channel transmission starts from the base station. In more detail, the UE may receive starting symbol information from the base station through the DCI scheduling the physical data channel. If the number of the positions of the OFDM symbol that can be designated as the starting symbol at which the physical data channel transmission starts is K, the base station can transmit the starting symbol information using bits of ceil($\log_2$ K). In this case, ceil(x) represents the smallest integer equal to or greater than x. In this case, the starting symbol may be designated for each slot. Also, the UE may determine the position of the OFDM symbol at which the physical data channel transmission starts based on the starting symbol information. For example, when the OFDM symbol that can be designated as the starting symbol is any one of the first to fourth OFDM symbols of the slot, the base station may transmit the starting symbol information using 2 bits of the DCI. In this case, when the value of 2 bits corresponding to the starting symbol information of the DCI is $00_b$, the UE may determine the starting symbol as the first OFDM symbol of the slot. In addition, when the value of 2 bits corresponding to the starting symbol information of the DCI is $01_b$, the UE may determine the starting symbol as the second OFDM symbol of the slot. In addition, when the value of 2 bits corresponding to the starting symbol information of the DCI is $1\,0_b$, the UE may determine the starting symbol as the third OFDM symbol of the slot. In addition, when the value of 2 bits corresponding to the starting symbol information of the DCI is $11_b$, the UE may determine the starting symbol as the fourth OFDM symbol of the slot. The UE may receive a physical data channel based on the starting symbol information. In more detail, the UE may determine a time-frequency resource to start receiving the physical data channel based on the starting symbol information. A method of receiving a data channel by a UE will be described with reference to FIGS. 13 to 24. In detail, a method of determining a time-frequency resource in which a UE receives a physical data channel will be described.

Figure 13:
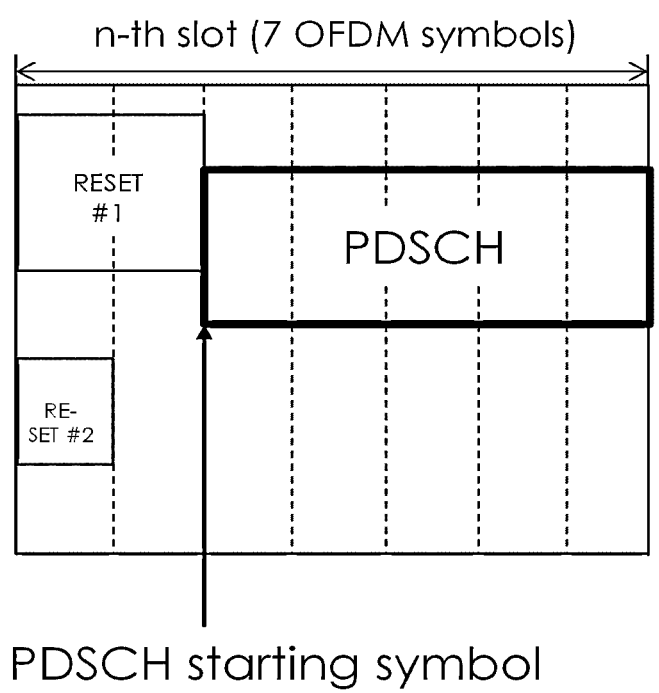
FIG. 13 illustrates a time-frequency resource domain in which a PDSCH is transmitted in a wireless communication system according to an embodiment of the present invention.

FIG. 13 illustrates a time-frequency resource domain in which a PDSCH is transmitted in a wireless communication system according to an embodiment of the present invention.

The base station may determine the starting symbol information signaled to the UE based on the RESET(s) in which the physical data channel overlaps the scheduled time-frequency resource in the slot corresponding to the starting symbol information. Specifically, the base station may perform determination based on the latest time resource (i.e., the last OFDM symbol of RESET(s)) among time-frequency resources corresponding to RESET(s) overlapping the time-frequency resource scheduled for the physical data channel in the slot corresponding to the starting symbol information. In this case, the base station may determine the starting symbol information of the physical data channel so as not to overlaps the RESET unavailable for physical data channel reception configured for the UE based on the time-frequency resource of the RESET configured for the UE through the RRC configuration If the RESET does not overlap the time-frequency resource corresponding to the frequency band scheduled for the physical data channel, the base station may start physical data channel transmission from the first OFDM symbol of the corresponding frequency band. Specifically, if there is a frequency band in the slot in which RESET is not configured, the base station may start the physical data channel transmission from the first OFDM symbol of the frequency band. FIG. 12 illustrates seven OFDM symbols of an n-th slot. In the embodiment of FIG. 12, a first RESET RESET #1 and a second RESET RESET #2 are configured in an n-th slot. In the frequency domain, the time-frequency resource scheduled for PDSCH reception of the UE overlaps the first RESET RESET #1, but does not overlap the second RESET RESET #2. In addition, since the first RESET RESET #1 is terminated in the second OFDM symbol of the n-th slot, the base station can start the PDSCH transmission from the third OFDM symbol of the n-th slot. In this case, the base station may set the value of the field indicating the starting symbol information of the DCI to 10 b.

When at least some of the time-frequency resources scheduled for the physical data channel reception of the UE overlap the RESET, the base station may designate an OFDM symbol after the last OFDM symbol of the corresponding RESET as the starting symbol. The UE may not expect reception of a physical data channel in an OFDM symbol corresponding to a RESET that is unavailable for physical data channel reception configured for the UE. In addition, the UE may expect the physical data channel reception from the OFDM symbol next to the last OFDM symbol of the RESET that is unavailable for physical data channel reception configured for the UE. In more detail, the UE may receive the physical data channel from the OFDM symbol next to the last OFDM symbol of the RESET that is unavailable for physical data channel reception.

In such embodiments, even though the time-frequency resources are not used for other purposes, they may not be used for physical data channel transmission. For maximum utilization of time-frequency resources, the UE may distinguish a frequency band overlapping a RESET that is unavailable for physical data channel reception configured for the UE among the frequency bands in which the physical data channel reception of the UE is scheduled from a band not overlapping a RESET that is unavailable for physical data channel reception configured for the UE, and determine the start time point of the physical data channel reception. In addition, the base station may designate the starting symbol information based on the last OFDM symbol among the OFDM symbols corresponding to the RESET(s) not configured for the UE. This will be described with reference to FIG. 14.

Figure 14:
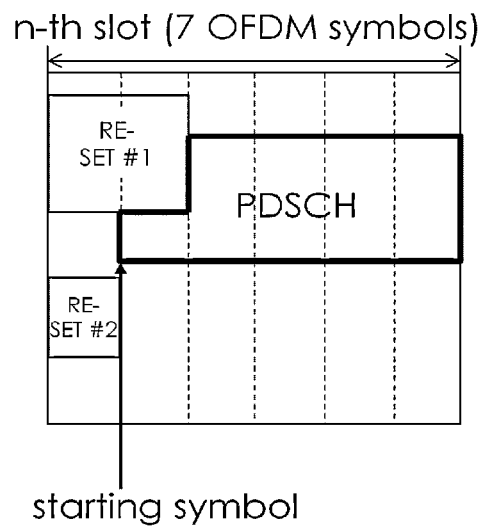
FIG. 14 illustrates a time-frequency resource domain in which a PDSCH is transmitted in a wireless communication system according to an embodiment of the present invention.
Figure 14:
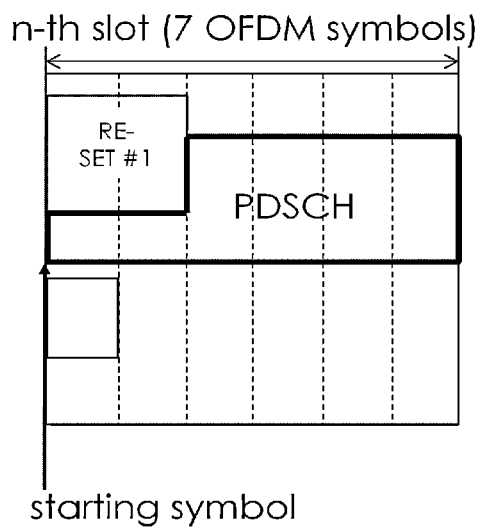

FIG. 14 illustrates a time-frequency resource domain in which a PDSCH is transmitted in a wireless communication system according to an embodiment of the present invention.

As described above, the UE may distinguish a frequency band overlapping a RESET that is unavailable for physical data channel reception configured for the UE among the frequency bands in which the physical data channel reception of the UE is scheduled from a frequency band not overlapping a RESET configured for the UE, and determine the start time of the physical data channel reception. In addition, the base station may designate the starting symbol information based on the last OFDM symbol among the OFDM symbols corresponding to the RESET(s) not configured for the UE. In more detail, the base station may indicate, as a starting symbol, an OFDM symbol next to the last OFDM symbol among OFDM symbols corresponding to RESET(s) not configured for the UE. In a specific embodiment, in the frequency band overlapping the RESET unavailable for the physical data channel reception configured for the UE among the frequency bands in which the physical data channel reception of the UE is scheduled, the UE may expect the physical data channel reception from the OFDM symbol next to the last OFDM symbol of the RESET in which the physical data channel reception configured for the UE is unavailable. In a specific embodiment, in the frequency band not overlapping the RESET unavailable for the physical data channel reception configured for the UE among the frequency bands in which the physical data channel reception is scheduled, the UE may expect the physical data channel reception from the OFDM symbol indicated by the starting symbol information. The reason for indicating the starting symbol of the physical data channel is because the UE may determine a RESET that is unavailable for physical data channel reception configured for the UE, but may not determine a RESET configured for another UE.

FIG. 14 illustrates seven OFDM symbols of an n-th slot. In the embodiment of FIG. 14, a first RESET CORESET #1 and a second RESET CORRESET #2 are configured in an n-th slot. In this case, the first RESET CORESET #1 is a RESET that is unavailable PDSCH reception configured for the UE, and the second RESET RESET #2 is a RESET configured for another UE. The PRB scheduled for PDSCH reception of the UE overlaps the first RESET RESET #1, but does not overlap the second RESET RESET #2. In this case, the last OFDM symbol of the first RESET RESET #1 is the second OFDM symbol of the n-th slot. In addition, the last OFDM symbol of the second RESET RESET #2 is the first OFDM symbol of the n-th slot. In the embodiment of FIG. 14(a), the base station designates a second OFDM symbol, which is the OFDM symbol next to the last symbol of the second RESET RESET #2, which is not configured for the UE, as a starting symbol. In this case, the field value of the DCI corresponding to the starting symbol information may be $01_b$. In the frequency band overlapping the first RESET RESET #1 among the frequency bands in which PDSCH reception of the UE is scheduled, the UE starts receiving the PDSCH from the OFDM symbol next to the last OFDM symbol of the first RESET RESET #1. Moreover, in the frequency band not overlapping the first RESET RESET #1 among the frequency bands in which PDSCH reception of the UE is scheduled, the UE starts receiving the PDSCH from the second OFDM symbol that is the OFDM symbol indicated by the starting symbol information.

In another specific embodiment, when the time-frequency resource in which the physical data channel reception of the UE is scheduled overlaps the RESET(s) not configured for the UE, the base station may indicate the OFDM symbol next to the last OFDM symbol of the RESET(s) not configured for the UE as a starting symbol. When there is no RESET not configured for the UE, which overlaps the time-frequency resources scheduled for the physical data channel reception of the UE, the base station may designate the first OFDM symbol of the slot as a starting symbol. In the embodiment of FIG. 14(b), since there is no RESET not configured for the UE, which overlaps the PRB scheduled for the PDSCH reception of the UE, the base station designates the first OFDM symbol as a starting symbol. In this case, the field value of the DCI corresponding to the starting symbol information may be $01_b$. In the frequency band overlapping the first RESET RESET #1 among the frequency bands in which PDSCH reception of the UE is scheduled, the UE starts PDSCH monitoring from the OFDM symbol next to the last OFDM symbol of the first RESET RESET #1. Moreover, in the frequency band not overlapping the first RESET RESET #1 among the frequency bands in which PDSCH reception of the UE is scheduled, the UE starts receiving the PDSCH from the first OFDM symbol that is the OFDM symbol indicated by the starting symbol information.

Only some of the time-frequency resources corresponding to the CORESET included in the RESET may be used for physical control channel transmission. In addition, the UE may determine the time-frequency resource in which the physical control channel of the UE is transmitted among time-frequency resources corresponding to RESET in which physical data channel reception configured for the UE is unavailable. Accordingly, frequency resources not used for physical control channel transmission among time-frequency resources corresponding to RESET may be used for physical data channel transmission. In this case, the UE may assume that the physical data channel is not transmitted to the time-frequency resource receiving the physical control channel among the time-frequency resources corresponding to the RESET in which the physical data channel reception configured for the UE is unavailable. The UE may receive a physical data channel by performing rate matching on the remaining time-frequency resources except for the corresponding time-frequency resources or by puncturing the time-frequency resources. This will be described with reference to FIGS. 15 to 16.

Figure 15:
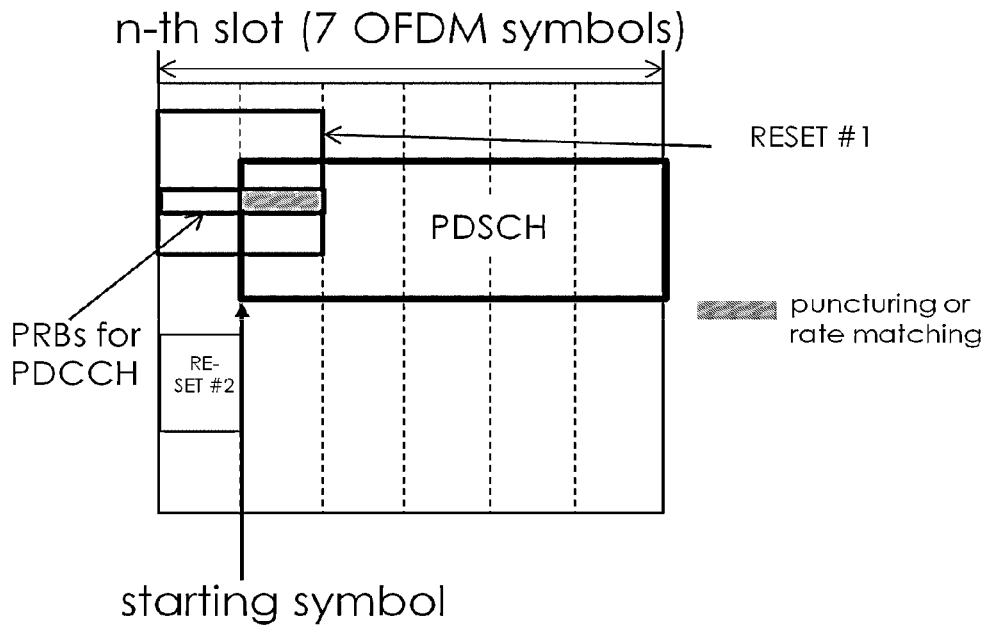
FIGS. 15 to 16 illustrate that a terminal of a wireless communication system according to an embodiment of the present invention receives a PDSCH in a RESET configured for a terminal.
Figure 16:
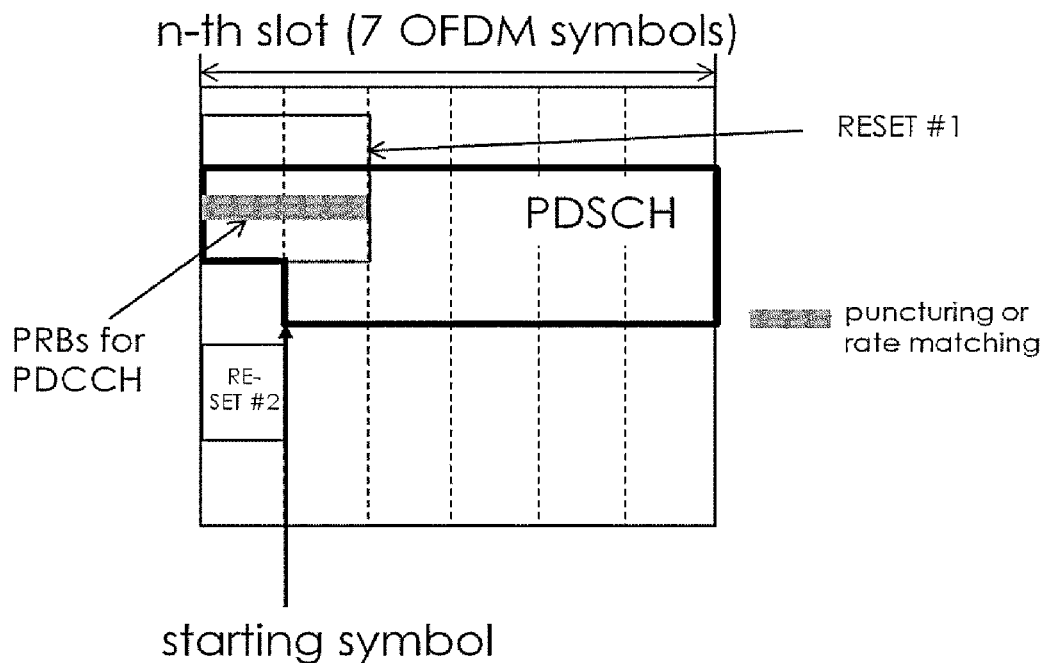

FIGS. 15 to 16 illustrate that a UE of a wireless communication system according to an embodiment of the present invention receives a PDSCH in a RESET configured for a UE.

Regardless of whether the physical data channel reception configured for the UE overlaps the unavailable RESET, the UE may receive the physical data channel from the OFDM symbol indicated by the starting symbol information in the frequency band in which the physical data channel reception of the UE is scheduled. In this case, when the RESET configured for the UE includes a CORESET and receives a physical control channel in the CORESET, a UE may puncture a time-frequency resource used for the physical control channel transmission to receive a physical data channel. In addition, when the RESET configured for the UE includes a CORESET and the UE receives a physical control channel in the corresponding CORESET, the UE may receive a physical data channel by performing rate matching on the remaining time-frequency resources except for the time-frequency resources used for the corresponding physical control channel transmission.

FIGS. 15 to 16 illustrate seven OFDM symbols of an n-th slot. In the embodiment of FIGS. 15 to 16, a first RESET RESET #1 and a second RESET RESET #2 are configured in an n-th slot. In this case, the first RESET CORESET #1 is a RESET that is unavailable PDSCH reception configured for the UE, and the second RESET RESET #2 is a RESET configured for another UE. The PRB scheduled for PDSCH reception of the UE overlaps the first RESET RESET #1, but does not overlap the second RESET RESET #2. In this case, the last OFDM symbol of the first RESET RESET #1 is the second OFDM symbol of the n-th slot. In addition, the last OFDM symbol of the second RESET RESET #2 is the first OFDM symbol of the n-th slot. In the embodiment of FIG. 15, the PDSCH is received from the second OFDM symbol indicated by the starting symbol information in the frequency band in which the PDSCH reception of the UE is scheduled. In this case, the UE punctures the PRB used for PDCCH transmission in the RESET configured for the UE and receives the PDSCH.

In another specific embodiment, the UE may receive the physical data channel from the first OFDM symbol of the frequency band that overlaps the RESET in which the physical data channel reception configured for the UE is unavailable among the frequency bands in which physical data channel reception is scheduled. In this case, the UE may puncture a time-frequency resource used for physical control channel transmission in a RESET configured for the UE and receive a physical data channel. In addition, the UE may receive a physical data channel by performing rate matching on remaining time-frequency resources except for time-frequency resources used for physical control channel transmission in a RESET configured for the UE. A UE may receive a physical data channel from an OFDM symbol indicated by starting symbol information in a frequency band in which the physical data channel reception configured for the UE does not overlap the unavailable RESET among the frequency bands in which the physical data channel reception is scheduled.

In the embodiment of FIG. 16, a UE receives a PDSCH from a first OFDM symbol of a frequency band overlapping a RESET in which a PDSCH reception configured for a UE is unavailable among frequency bands in which a PDSCH reception of a UE is scheduled. In this case, the UE may puncture the PRB used for the PDCCH transmission in the RESET in which PDSCH reception configured for the UE is unavailable and receive the PDSCH. In addition, the UE may receive the PDSCH by performing rate matching on the remaining time-frequency resources except for the PRB used for the PDCCH transmission in the RESET in which the PDSCH reception configured for the UE is unavailable. In addition, the UE monitors the PDSCH from the second OFDM symbol indicated by the starting symbol information in a frequency band not overlapping the RESET in which the PDSCH reception configured for the UE is unavailable among the frequency bands in which PDSCH reception of the UE is scheduled.

In such embodiments, the base station may configure the starting symbol according to the embodiments described with reference to FIGS. 13 to 14.

The base station may divide one slot into a plurality of frequency bands and signal a starting symbol in each of the plurality of frequency bands. The base station may signal a plurality of starting symbol information corresponding to the plurality of starting symbols through the DCI. In this case, the UE may receive a physical data channel based on the information of the plurality of starting symbols. This is because a plurality of RESET(s) may be configured in one slot, and a plurality of RESET(s) may be configured in different PRBs and OFDM symbols. In this case, the base station may configure the starting symbol of the corresponding frequency band based on the latest OFDM symbol among the last OFDM symbols of the RESET(s) in which the physical data channel reception overlapping the time-frequency resources scheduled for physical data channel reception of the UE is unavailable in the corresponding frequency band. In more detail, the base station may configure, as a starting symbol of the corresponding frequency band, the OFDM symbol next to the latest OFDM symbol among the last OFDM symbols of the RESET(s) in which the physical data channel reception overlapping the time-frequency resources scheduled for physical data channel reception of the UE is unavailable in the corresponding frequency band. In this case, when there is no RESET(s) in which the physical data channel reception overlapping the time-frequency resources scheduled for physical data channel reception of the UE is unavailable in the corresponding frequency band, the base station may configure the first OFDM symbol as the starting symbol of the corresponding frequency band.

In addition, the UE may start physical data channel reception based on the RESET in which physical data channel reception configured for UE is unavailable or the time-frequency resource scheduled for the physical data channel reception of a UE that overlaps a physical data channel transmitted to the UE in the corresponding frequency band. In a specific embodiment, the UE may receive the physical data channel from the OFDM symbol next to the last OFDM symbol of the RESET in which the physical data channel reception configured for the UE is unavailable, which overlaps the time-frequency resource scheduled for physical data channel reception of the UE in the corresponding frequency band, regardless of the starting symbol of the corresponding frequency band. In another specific embodiment, the UE may receive the physical data channel from the OFDM symbol next to the last OFDM symbol of the physical control channel transmitted to the UE, which overlaps the time-frequency resource scheduled for physical data channel reception of the UE in the corresponding frequency band, regardless of the starting symbol of the corresponding frequency band.

The base station may transmit the physical control channel and the physical data channel scheduled by the corresponding physical control channel through different slots. This scheduling scheme is referred to as cross-slot scheduling. For example, the base station may transmit a physical control channel in CORESET of the n-th slot. In this case, the physical control channel may schedule a physical data channel of the (n+k)-th slot. In this case, n is a natural number and k is a natural number greater than one. The location of a time-frequency resource occupied by the physical control channel mapped to the CORESET configured for the UE may vary in each slot. Since it is determined whether the CORESET is used for the physical data channel according to the physical control channel allocation of the base station, whether a RESET including a corresponding CORESET is unavailable for physical data channel reception may vary in each slot. Thus, when cross-slot scheduling is performed, it may be difficult for a base station or UE to determine a time-frequency resource used for physical data channel transmission in a slot in which a physical data channel scheduled by cross-slot scheduling is transmitted. Therefore, when cross-slot scheduling is used, a starting symbol configuration method and a signaling method corresponding to a physical data channel are problematic. This will be described with reference to FIG. 17.

Figure 17:
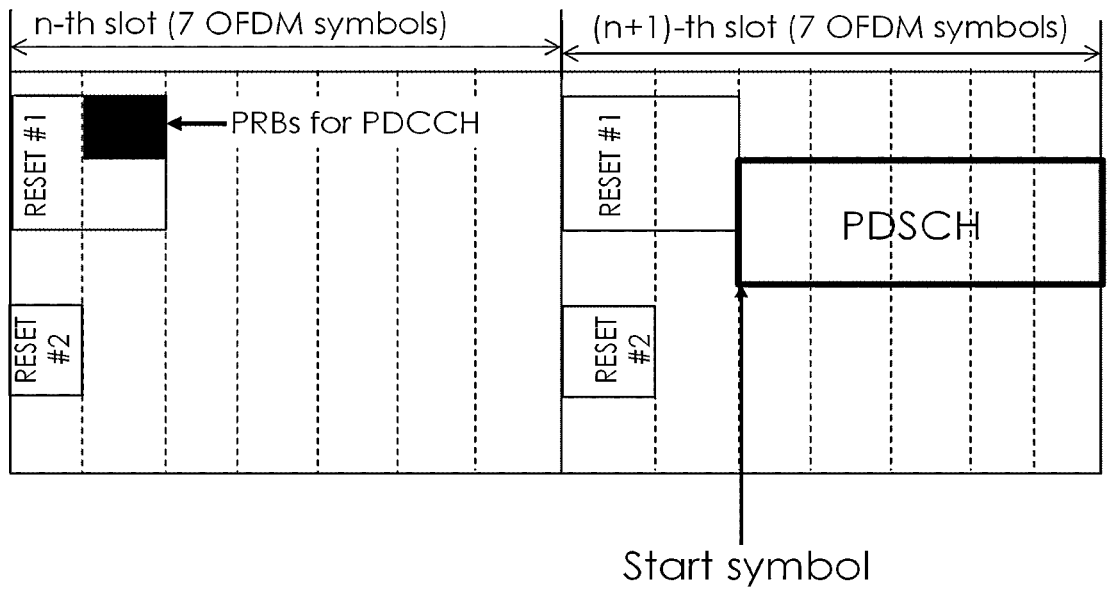
FIG. 17 illustrates that a terminal receives a PDSCH when cross-slot scheduling is performed in a wireless communication system according to an embodiment of the present invention.

FIG. 17 illustrates that a UE receives a PDSCH when cross-slot scheduling is performed in a wireless communication system according to an embodiment of the present invention.

When the physical data channel is scheduled by cross-slot scheduling, the position of the starting symbol may be fixed to a specific OFDM symbol of the slot in which the physical data channel is transmitted. In this case, the specific OFDM symbol may be configured based on the last OFDM symbol of the RESET configured for the UE. In more detail, the specific OFDM symbol may be the OFDM symbol next to the last OFDM symbol of the RESET configured for the UE. For example, when the last symbol of the RESET configured for the UE is the third OFDM symbol of the corresponding slot, the specific OFDM symbol may be the fourth OFDM symbol. The base station may signal a specific OFDM symbol through an RRC signal or periodically transmitted system information. In this case, the UE may determine the starting symbol corresponding to the physical data channel scheduled by the cross-slot scheduling based on the RRC signal or the system information. In addition, a starting symbol corresponding to a physical data channel scheduled by cross-slot scheduling may be configured for each of a plurality of frequency bands. In more detail, a starting symbol corresponding to a physical data channel scheduled by cross-slot scheduling may be configured for each PRB or every specific number of continuous PRBs. In another specific embodiment, a starting symbol corresponding to a physical data channel scheduled by cross-slot scheduling may be commonly configured in all frequency bands of a cell. In another specific embodiment, the base station may signal the starting symbol through the DCI of the physical control channel performing cross-slot scheduling.

The UE may receive a physical data channel by performing rate matching on time-frequency resources except for the time-frequency resource in which physical data channels are scheduled and the time-frequency resource in which the RESET is overlapped among the time-frequency resources in which physical data channels are scheduled by cross-slot scheduling. In addition, the UE may receive a physical data channel by puncturing the time-frequency resource in which physical data channels are scheduled and the time-frequency resource in which the RESET is overlapped among the time-frequency resources in which physical data channels are scheduled by cross-slot scheduling. In addition, the operation of the UE receiving the physical data channel may be applied to the embodiments described above with reference to the drawings prior to FIG. 17.

As described above, the DCI scheduling the physical data channel may indicate whether the RESET can be used for physical data channel reception by using the RESET field. In this case, the RESET field may be used for another purpose other than the above purpose. In detail, when the physical data channel is scheduled by cross-slot scheduling, the RESET field may indicate in which slot the physical data channel is scheduled. This is because when a physical data channel is scheduled in a future slot by cross-slot scheduling, it may be difficult for the base station to determine which RESET cannot be used in the slot in which the physical data channel is scheduled during cross-slot scheduling. When the RESET field is used for other purposes, the UE may assume that time-frequency resources corresponding to the configured RESET are not available for the physical data channel.

In the embodiment of FIG. 17, the PDCCH transmitted in the n-th slot schedules the PDSCH transmitted in the (n+1)-th slot. The position of the starting symbol used when receiving the PDSCH scheduled by the cross-slot scheduling in all frequency bands in the corresponding cell is the third OFDM symbol, which is the symbol next to the last symbol of RESET #1 overlapping the PDSCH in the frequency domain. Therefore, the UE starts receiving the PDSCH from the third OFDM symbol in the (n+1)-th slot. In addition, the RESET field indicates that the PDSCH is scheduled in the (n+1)-th slot. Therefore, the UE starts receiving the PDSCH from the third OFDM symbol in the (n+1)-th slot.

The base station may schedule the PDSCH transmitted in a plurality of slots using one physical control channel. This scheduling scheme is referred to as the scheduling based on the slot-aggregation. For example, the base station may transmit a physical control channel in RESET of the n-th slot. In this case, the physical control channel may schedule a physical data channel of the n-th slot, the (n+1)-th slot, . . . the (n+k)-th slot. In this case, n is a natural number and k is a natural number greater than one. The location of a time-frequency resource occupied by the physical control channel mapped to the RESET configured for the UE may vary in each slot. Thus, when the scheduling based on the slot-aggregation is performed, it may be difficult for a base station or UE to determine a time-frequency resource used for physical data channel transmission in a slot in which a physical data channel scheduled by the scheduling based on the slot-aggregation is transmitted. Therefore, when the scheduling based on the slot-aggregation is used, a starting symbol corresponding to a physical data channel configuration method and a signaling method are problematic. This will be described with reference to FIGS. 18 to 19.

Figure 18:
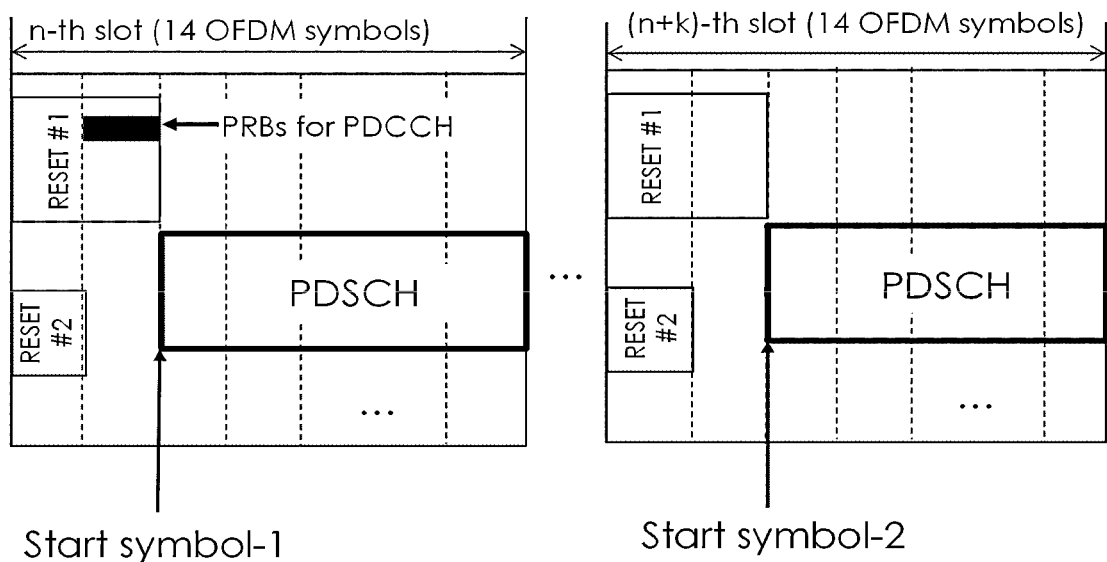
FIGS. 18 and 19 illustrates that a terminal receives a PDSCH when the scheduling based on the slot-aggregation is performed in a wireless communication system according to an embodiment of the present invention.
Figure 19:
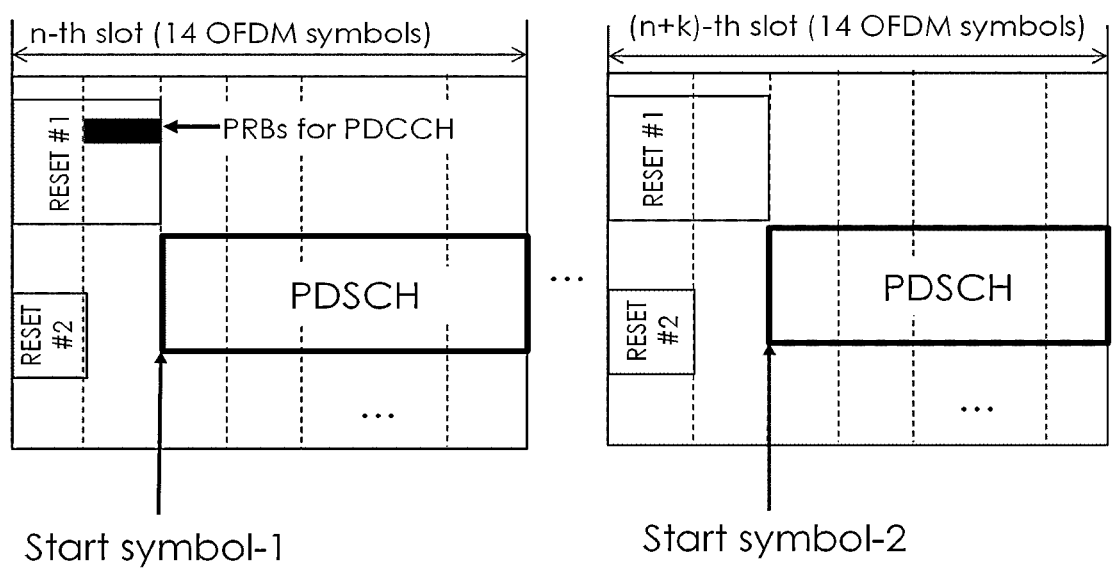

FIGS. 18 and 19 illustrates that a UE receives a PDSCH when the scheduling based on the slot-aggregation is performed in a wireless communication system according to an embodiment of the present invention.

When the physical data channel is scheduled in a plurality of future slots, the UE may start the physical data channel reception based on the constant OFDM symbol position in the plurality of slots. Specifically, when a physical data channel is scheduled by the scheduling based on the slot-aggregation, the UE may start the physical data channel reception based on the constant OFDM symbol position in all slots in which a physical data channel scheduled by slot-aggregation based is transmitted. Specifically, when the physical data channel is scheduled by the scheduling based on the slot-aggregation, the location of the starting symbol corresponding to all slots in which the physical data channel scheduled by the scheduling based on the slot-aggregation is transmitted may be configured to the same specific OFDM symbol of the slot in which the corresponding physical data channel is transmitted. In this case, a specific OFDM symbol may be configured based on the last OFDM symbol in which the RESET may be located in each slot. In more detail, the specific OFDM symbol may be the OFDM symbol next to the last OFDM symbol of the RESET configured for the UE. For example, when the last symbol of the configured RESET is the third OFDM symbol of the corresponding slot, the specific OFDM symbol may be the fourth OFDM symbol. The base station may signal a specific OFDM symbol through an RRC signal or periodically transmitted system information. In this case, the UE may determine starting symbols corresponding to all slots in which the physical data channel scheduled by the scheduling based on the slot-aggregation is transmitted based on the RRC signal or system information. Also, starting symbols corresponding to all slots in which the physical data channel scheduled by the scheduling based on the slot-aggregation is transmitted may be configured for a plurality of frequency bands. In more detail, starting symbols corresponding to all slots in which a physical data channel scheduled by the scheduling based on the slot-aggregation is transmitted may be configured for each PRB or for a specific number of continuous PRBs. In another specific embodiment, starting symbols corresponding to all slots in which a physical data channel scheduled by the scheduling based on the slot-aggregation is transmitted may be commonly configured in all frequency bands of a cell. According to another specific embodiment, the base station may signal a starting symbol through the DCI of a physical control channel for performing the scheduling based on the slot-aggregation.

When a physical data channel is scheduled in a plurality of future slots, the UE may receive the physical data channel in the same RESET in each of the plurality of future slots. In more detail, the RESET field may be equally applied to all slots in which a physical data channel scheduled by the scheduling based on the slot-aggregation is transmitted. According to another specific embodiment, the DCI of the physical control channel for the scheduling based on the slot-aggregation may indicate a starting symbol corresponding to any one slot among all slots in which the physical data channel scheduled by the scheduling based on the slot-aggregation is transmitted. The RESET field may indicate whether RESET can be used for physical data channel reception in any one among a plurality of slots in which a physical data channel scheduled by the scheduling based on the slot-aggregation is transmitted. In this case, any one slot may be a slot in which a physical control channel including a DCI scheduling a physical data channel is transmitted. When the scheduling based on the slot-aggregation is used, the UE may assume that it cannot be used for physical data channel reception in a time-frequency resource corresponding to RESET in a slot not indicated by the RESET field among slots in which a physical data channel scheduled by the scheduling based on the slot-aggregation is transmitted.

In the embodiment of FIG. 18, a PDCCH transmitted in an n-th slot schedules a PDSCH transmitted in an n-th slot and a PDSCH transmitted in an (n+1)-th slot. The position of the starting symbol used when receiving the PDSCH scheduled by the scheduling based on the slot-aggregation in all frequency bands in the corresponding cell is the third OFDM symbol. Accordingly, the UE starts receiving the PDSCH from the third OFDM symbol in the n-th slot and the (n+1)-th slot.

In the above-described embodiments, the position of starting symbols corresponding to all slots in which the physical data channel scheduled by the scheduling based on the slot-aggregation is transmitted are the same. According to another specific embodiment, the DCI of the physical control channel for the scheduling based on the slot-aggregation may indicate a starting symbol corresponding to any one slot among all slots in which the physical data channel scheduled by the scheduling based on the slot-aggregation is transmitted. In more detail, the DCI of the physical control channel for the scheduling based on the slot-aggregation may indicate a starting symbol corresponding to the first slot among all slots in which the physical data channel scheduled by the scheduling based on the slot-aggregation is transmitted. In another specific embodiment, the DCI of the physical control channel for the scheduling based on the slot-aggregation may indicate a starting symbol of a slot in which the physical control channel for the scheduling based on the slot-aggregation is transmitted. In these embodiments, the starting symbol of the slot in which the physical data channel in which the location of the starting symbol is not indicated by the DCI of the physical control channel for the scheduling based on the slot-aggregation may be fixed to the constant specific OFDM symbol. For convenience of description, the starting symbol corresponding to the physical data channel in which the position of starting symbol is not indicated by the DCI of the physical control channel for the scheduling based on the slot-aggregation is referred to as the remaining starting symbol. In the method for configuring the location of the remaining starting symbol and the signaling method, the embodiments described above may be identically applied to embodiment in which the positions of starting symbols corresponding to all slots in which physical data channels scheduled by the scheduling based on the slot-aggregation are transmitted are the same. Specifically, a specific OFDM symbol may be configured based on the last OFDM symbol of the configured RESET. In more detail, the specific OFDM symbol may be the OFDM symbol next to the last OFDM symbol of the RESET configured for the UE. The base station may signal a specific OFDM symbol through an RRC signal or periodically transmitted system information. In this case, the UE may determine the positions of the remaining starting symbols based on the RRC signal or system information. In addition, the remaining starting symbols may be configured for a plurality of frequency bands. In more detail, the remaining starting symbols may be configured for each PRB or every specific number of continuous PRBs. In another specific embodiment, the remaining starting symbols may be configured to be common to all frequency bands of the cell.

In the embodiment of FIG. 19, a PDCCH transmitted in an n-th slot schedules a PDSCH transmitted in an n-th slot and a PDSCH transmitted in an (n+1)-th slot. In this case, the PDCCH indicates the starting symbol of the n-th slot as the first OFDM symbol. In addition, the position of the starting symbol used when receiving the remaining PDSCH in which the starting symbol is not indicated in the PDCCH is the second OFDM symbol. Accordingly, the UE starts monitoring the PDSCH from the first OFDM symbol in the n-th slot and starts monitoring the PDSCH from the second OFDM symbol in the (n+1)-th slot.

In a slot after the slot in which the physical control channel for the scheduling based on the slot-aggregation is transmitted, the UE may receive a physical data channel by performing rate matching on time-frequency resources except for the time-frequency resource in which physical data channels are scheduled and the time-frequency resource in which the RESET is overlapped among time-frequency resources in which a physical data channel is scheduled by the scheduling based on the slot-aggregation, in a slot after the slot in which the physical control channel for the scheduling based on the slot-aggregation is transmitted. As described above, the value of the RESET field may be applied to a slot after the slot in which the physical control channel for the scheduling based on the slot-aggregation is transmitted. In this case, the UE may perform rate matching on time-frequency resources except for the time-frequency resource in which the physical data channel is scheduled and the time-frequency resource in which the RESET with unavailable physical data channel reception is overlapped among time-frequency resources in which a physical data channel is scheduled by the scheduling based on the slot-aggregation. Furthermore, in a slot after the slot in which the physical control channel for the scheduling based on the slot-aggregation is transmitted, the UE may receive a physical data channel by puncturing the time-frequency resource in which physical data channels are scheduled and the time-frequency resource in which the RESET is overlapped among time-frequency resources in which a physical data channel is scheduled by the scheduling based on the slot-aggregation, in a slot after the slot in which the physical control channel for the scheduling based on the slot-aggregation is transmitted. As described above, the value of the RESET field may be applied to a slot after the slot in which the physical control channel for the scheduling based on the slot-aggregation is transmitted. In this case, the UE may puncture the time-frequency resource in which the physical data channel is scheduled and the time-frequency resource in which the RESET with unavailable physical data channel reception is overlapped among time-frequency resources in which a physical data channel is scheduled by the scheduling based on the slot-aggregation. In addition, the operation of the UE receiving the physical data channel may be applied to the embodiments described above with reference to the drawings prior to FIG. 17.

The base station may divide overlapped-RESET into a plurality of sub-resource-sets and indicate whether each of the sub-resource-sets is unavailable for physical data channel reception. In addition, the UE may also determine whether each of the sub-resource-sets is unavailable for physical data channel reception. In more detail, the UE may receive from the base station a DCI including an N-bit field indicating N sub-resource-sets. In this case, each bit of the N-bit field may indicate whether each of the N sub-resource-sets is unavailable for physical data channel reception. This will be described with reference to FIG. 20.

Figure 20:
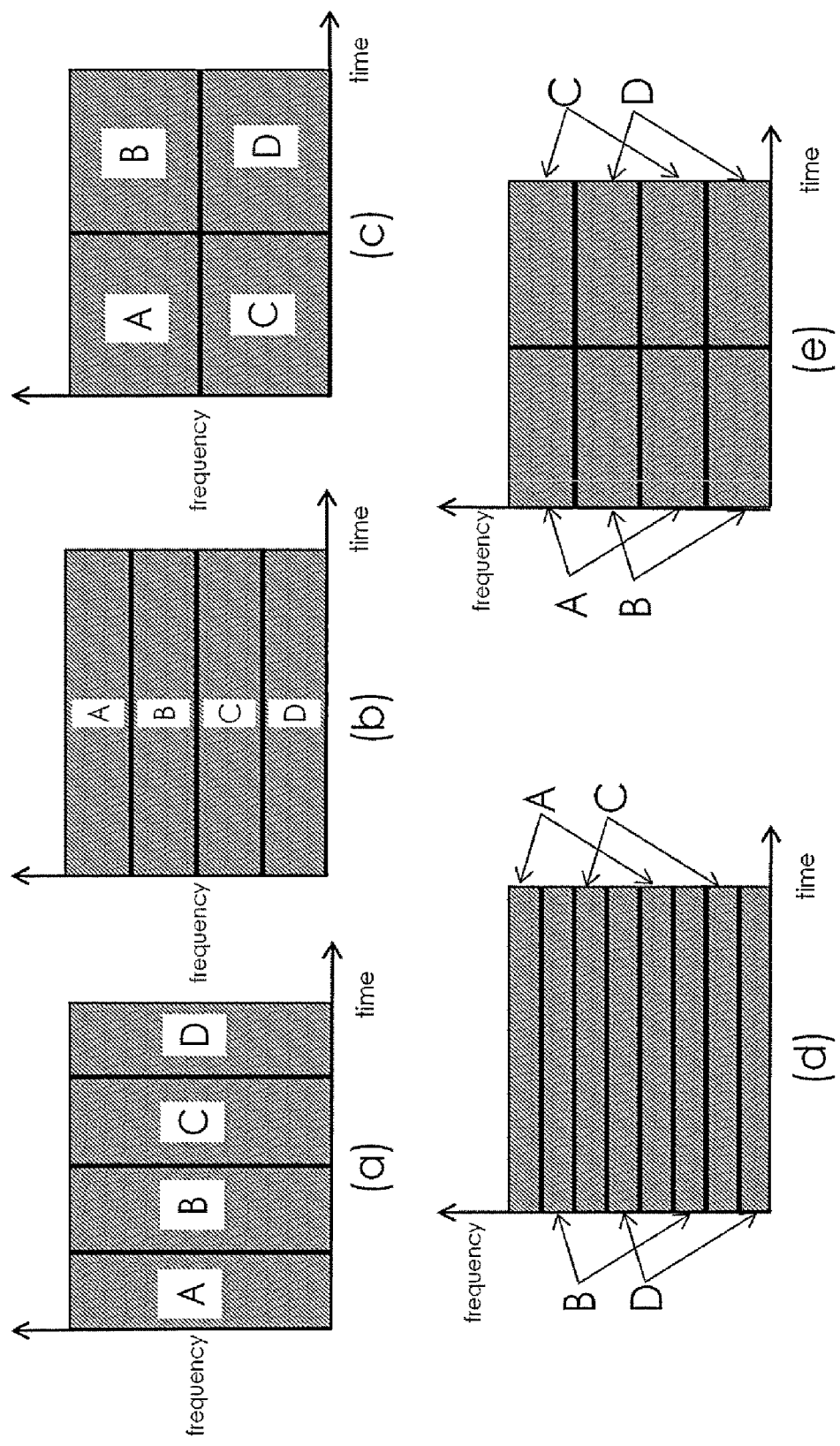
FIG. 20 illustrates an example of a sub-resource-set used in a wireless communication system according to an embodiment of the present invention.

FIG. 20 illustrates an example of a sub-resource-set used in a wireless communication system according to an embodiment of the present invention.

As described above, the base station may indicate whether a sub-resource-set can be used for physical data channel reception by using an N-bit field. For convenience of description, this field is referred to as a sub-resource-set bitmap. If there is one overlapped-RESET, the corresponding overlapped-RESET may be divided into N sub-resource-sets. In this case, each bit of the sub-resource-set bitmap may indicate whether each of the N sub-resource-sets can be used for physical data channel reception. When the number of overlapped-RESETs is smaller than N, each overlapped-RESET may be configured as at least one sub-resource-set. When the number of overlapped-RESETs is greater than N, a plurality of overlapped-RESETs may be configured as one sub-resource-set. In addition, when the number of overlapped-RESETs is N, each of the N overlapped-RESET may be configured as one sub-resource-set.

When configuring one overlapped-RESET as a plurality of sub-resource-sets, the sub-resource-set may be configured based on the time domain without distinction in the frequency domain. In this case, the sub-resource-set may be configured based on the ODFM symbol occupied by the overlapped-RESET. FIG. 20(a) illustrates an example of a sub-resource-set configured based on the time domain.

In addition, when configuring one overlapped-RESET as a plurality of sub-resource-sets, the sub-resource-sets may be configured based on the frequency domain without distinction in the time domain. In this case, the sub-resource-set may be configured based on the PRB occupied by the overlapped-RESET. In this case, the sub-resource-set may include only continuous PRBs. In another specific embodiment, the sub-resource-set may include a discontinuous PRB. In a specific embodiment, overlapped-RESET may be configured as M sub-resource-sets. In this case, when overlapped-RESET occupies X PRBs, M−1 sub-resource-sets may be configured to occupy floor (X/M) PRBs, and one sub-resource-set may be configured to occupy X−(M−1)*floor(X/M) PRB. In this case, floor(x) represents the largest natural number equal to or smaller than x. FIGS. 20(b) and 20(d) illustrate an example of a sub-resource-set configured based on the frequency domain.

In addition, when configuring one overlapped-RESET as a plurality of sub-resource-sets, the sub-resource-sets may be configured based on the frequency domain. In this case, the sub-resource-set may be configured based on the OFDM symbol and the PRB occupied by the overlapped-RESET. In this case, the sub-resource-set may include only continuous PRBs. In another specific embodiment, the sub-resource-set may include a discontinuous PRB. FIGS. 20(c) and 20(e) illustrate an example of a sub-resource-set configured based on the time-frequency domain.

If the overlapped-RESET includes a plurality of RESETs, the plurality of RESETs may be configured preferentially as a sub-resource-set. In more detail, bits of the overlapped-RESET bitmap may be allocated to a plurality of RESETs first.

According to another specific embodiment, the base station may distinguish time-frequency resources scheduled for physical data channel reception of a UE regardless of overlapped-RESET, and may signal whether the separated resources can be used for physical data channel reception. In more detail, time-frequency resources scheduled for physical data channel reception of a UE may be equally divided into 2N based on the frequency domain. In this case, the base station may signal whether it can be used for physical data channel reception of the UE using the N bit field of the L1 signaling or the N bit field of the DCI. The UE may determine a time-frequency resource that may be used for physical data channel reception based on the value of the N-bit field of the L1 signaling or the N-bit field of the DCI.

Figure 21:
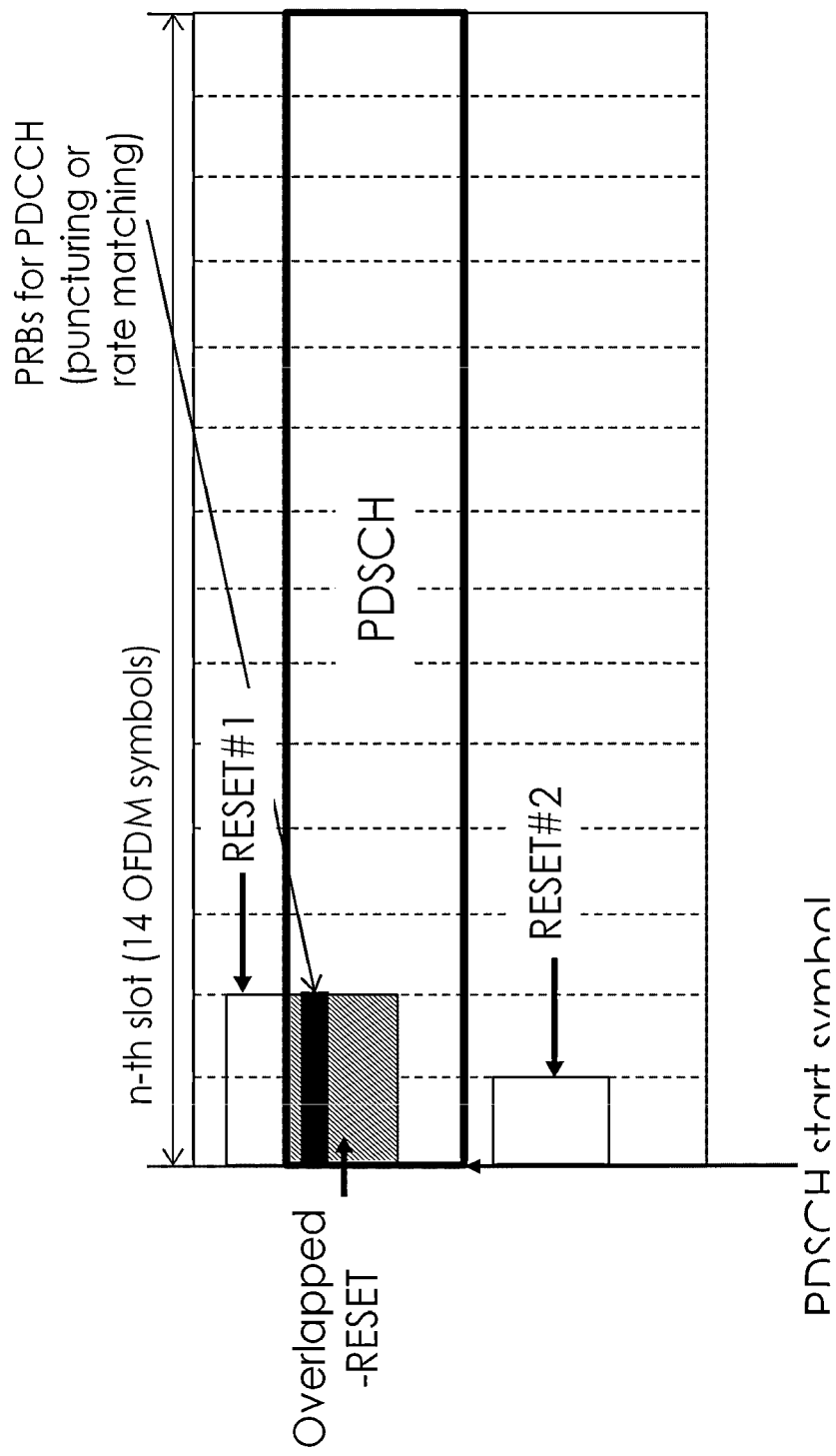
FIG. 21 illustrates that a terminal receives a PDSCH based on overlapped-RESET in a wireless communication system according to an embodiment of the present invention.

FIG. 21 illustrates that a UE receives a PDSCH based on overlapped-RESET in a wireless communication system according to an embodiment of the present invention.

As described above, if it is indicated that the PDSCH is transmitted in the sub-resource-set in the sub-resource-set bitmap included in the DCI scheduling the physical data channel, the UE may receive the physical data channel in the sub-resource-set. When the PDCCH is received in the time-frequency domain corresponding to the sub-resource-set, the UE may receive a physical data channel by puncturing the time-frequency domain occupied by the physical control channel. In addition, when the physical control channel is received in the time-frequency domain corresponding to the sub-resource-set, the UE may receive the physical data channel by performing rate matching on the remaining sub-resource-sets except for the time-frequency domain occupied by the physical control channel. In the embodiment of FIG. 21, the first RESET RESET #1 and the second RESET RESET #2 are configured in the n-th slot by the RRC signal. In the embodiment of FIG. 21, a time-frequency resource scheduled for PDSCH reception of a UE by DCI overlaps a part of the first RESET RESET #1. In addition, the DCI does not indicate that the first RESET RESET #1 is unavailable for PDSCH reception. Accordingly, the UE determines the time-frequency resource in which the PDSCH reception of the UE is scheduled by the DCI and the time-frequency resource in which the first RESET RESET #1 is overlapped as an overlapped-RESET. In this case, the PDCCH is received through a time-frequency resource corresponding to the overlapped-RESET. The UE may receive the PDSCH by puncturing the time-frequency domain occupied by the PDCCH. In addition, the UE may receive the PDSCH by performing rate matching in the overlapped-RESET except for the time-frequency domain occupied by the PDCCH.

As described above, the base station may configure RESET using the RRC signal. When the base station configures the RESET using the RRC signal, a method of indicating a time-frequency resource corresponding to at least one RESET may be problematic. This will be described with reference to FIGS. 22 to 24.

The base station may signal the index of the PRB occupied by the RESET and the index of OFDM symbol occupied by the RESET to indicate a time-frequency resource corresponding to the RESET. When the RESET occupies the continuous time-frequency resource, the base station may indicate the continuous time-frequency resource using one indication value. In this case, the indication value is referred to as a resource indication value (MV), and this indication method is referred to as an MV method. In more detail, the base station may generate one MV by combining the start positions of the continuous resources and the number of the continuous resources. In more detail, when the RESET occupies continuous OFDM symbols, the base station may generate an MV using the start index of the OFDM symbol and the index of the last OFDM symbol. In addition, when RESET occupies a continuous PRB and a continuous OFDM symbol, the base station may generate one RIV based on the index of the PRB, and generate one MV based on the index of the OFDM symbol. In this case, the base station may transmit two MV values. In another specific embodiment, one value may be generated by encoding two RIVs. In this case, the base station may signal only time-frequency resources occupied by the RESET by transmitting only one generated value. A method of generating the MV will be described in detail with reference to FIGS. 27 to 30.

If the time-frequency resource occupied by the RESET is noncontiguous, the base station may signal the time-frequency resource occupied by the RESET using a bitmap. In addition, when the base station signals the time-frequency resources occupied by the RESET, the base station may also signal a monitoring period corresponding to the RESET. For example, when the monitoring period of the RESET is two slots, the UE may determine that the corresponding RESET exists every two slots. In addition, when the base station signals the time-frequency resources occupied by the RESET, the base station may signal information on the CORESET included in the RESET. The information on the CORESET may include at least one of information on Resource element group (REG) bundling and information on control channel element (CCE)-to-REG mapping.

The base station needs to signal a connection relationship between the RESET and the bit field of the L1-signaling indicating the RESET. At this point, the bit field may be the RESET field described above. The base station may indicate a bit field index of L1-signaling corresponding to RESET to signal a connection relationship between RESET and a bit field of L1-signaling indicating the RESET. The L1-signaling may be a DCI scheduling a physical data channel. In addition, L1-signaling may be a group-common DCI transmitted in a slot in which a physical data channel is transmitted. According to a specific embodiment, the base station may signal a connection relationship between RESET and a bit field of L1-signaling indicating RESET regardless of physical data channel allocation information. For example, the RESET field may be n bits. In order for the base station to signal that the i-th bit of the RESET field indicates whether the RESET is unavailable for physical data reception, the base station may signal i through an RRC signal for configuring the corresponding RESET. If the value of the i-th bit of the RESET field is 1, the UE may determine that a time-frequency resource corresponding to the corresponding RESET cannot be used for physical data channel reception. In addition, when the value of the i-th bit of the RESET field is 0, the UE may determine that the physical data channel is received from the time-frequency resource corresponding to the RESET. The bits of the RESET field corresponding to the RESET that do not overlap the time-frequency resource in which the physical data channel is scheduled may be used for other purposes. In this case, a time-frequency resource in which a physical data channel is scheduled may be indicated by a Resource Allocation (RA) field. In more detail, it may indicate whether time-frequency resources corresponding to different RESETs are unavailable in physical data channel reception. For example, the first bit of the RESET field may indicate whether physical data channel reception is available in the first RESET RESET #1 and the second RESET RESET #2, and the second bit may indicate whether physical data channel reception is available in the third RESET RESET #3 and the fourth RESET RESET #4. In this case, the first PREST RESET #1 and the second RESET RESET #2 overlap the time-frequency resource in which the physical data channel is scheduled. The third PREST RESET #3) and the fourth RESET RESET #4 do not overlap the time-frequency resource in which the physical data channel is scheduled. In this case, the first bit of the RESET field may not indicate whether physical data channel reception is available in the first RESET RESET #1 and the second RESET RESET #2, and may indicate whether physical data channel reception is available in the first RESET RESET #1. In addition, the first second of the RESET field may not indicate whether physical data channel reception is available in the third RESET RESET #3 and the fourth RESET RESET #4, and may indicate whether physical data channel reception is available in the second RESET RESET #2. If all RESETs indicated by any one bit of the RESET field do not overlap the time-frequency resource in which the physical data channel is scheduled, the corresponding bit may indicate whether a specific CORESET or a RESET including CORSET is used for physical data channel reception.

In another specific embodiment, the base station may signal a connection relationship between the RESET and a bit field of L1-signaling indicating the RESET based on the time-frequency resource in which the physical data channel is scheduled. For example, the base station may signal time-frequency resource information corresponding to RESET to the UE. In this case, the UE may signal the connection relationship between the overlapped-RESET and the L1-signaling described above using the RRC signal. Alternatively, the base station may implicitly signal a connection relationship between the overlapped-RESET and the L1-signaling. Specifically, when overlapped-RESET is divided into a plurality of sub-resource-sets, each of the RESET(s) may be identified by different indices. In this case, the bit indicating the sub-resource-set among the plurality of bits constituting the rate-matching indicator may be determined based on an index for identifying the RESET. In a specific embodiment, the UE may map the sub-resource-sets to the bits of the RESET field in order. For example, the j-th sub-resource-set may be mapped to the ((j mod B)+1)-th bit of the RESET field. In this case, B may indicate the number of bits of the RESET field. In addition, X mod Y may represent the remaining value when X is divided by Y.

Time-frequency resources corresponding to different RESETs may overlap. In this case, the physical data channel reception method may be a problem in a time-frequency resource in which the UE corresponds to the RESET. This will be described with reference to FIGS. 22 to 24.

Figure 22:
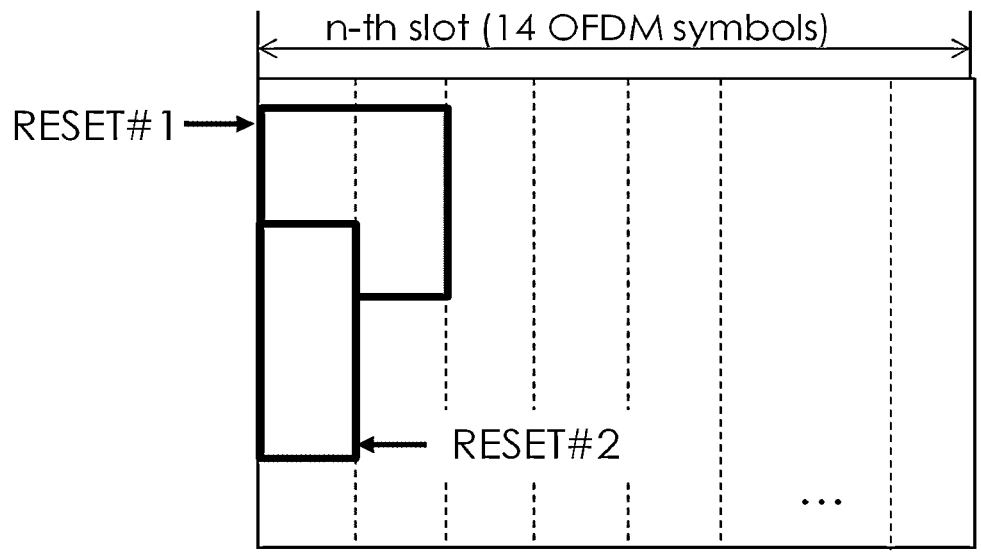
FIGS. 22 to 24 illustrate a case in which time-frequency resources indicated as occupied by different RESETs overlap.
Figure 22:
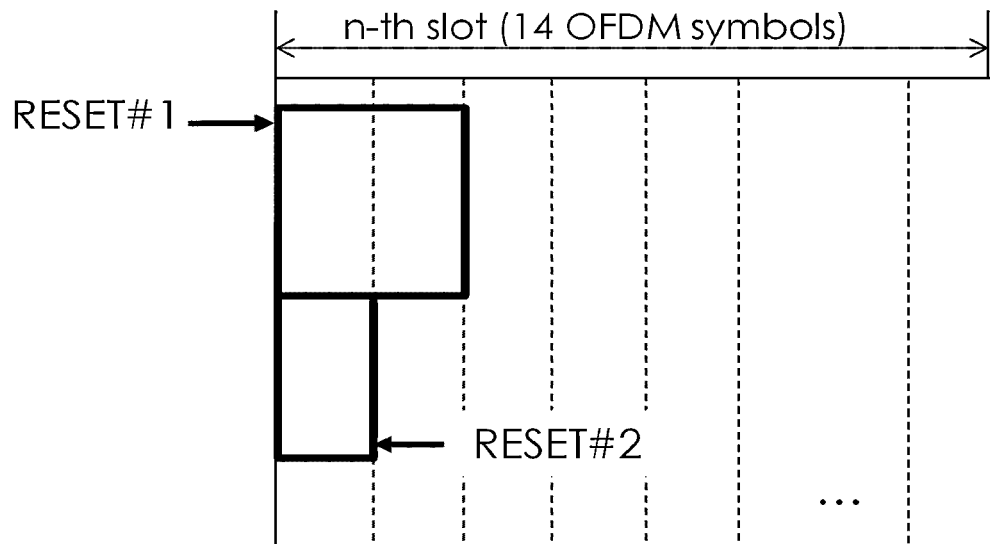
Figure 23:
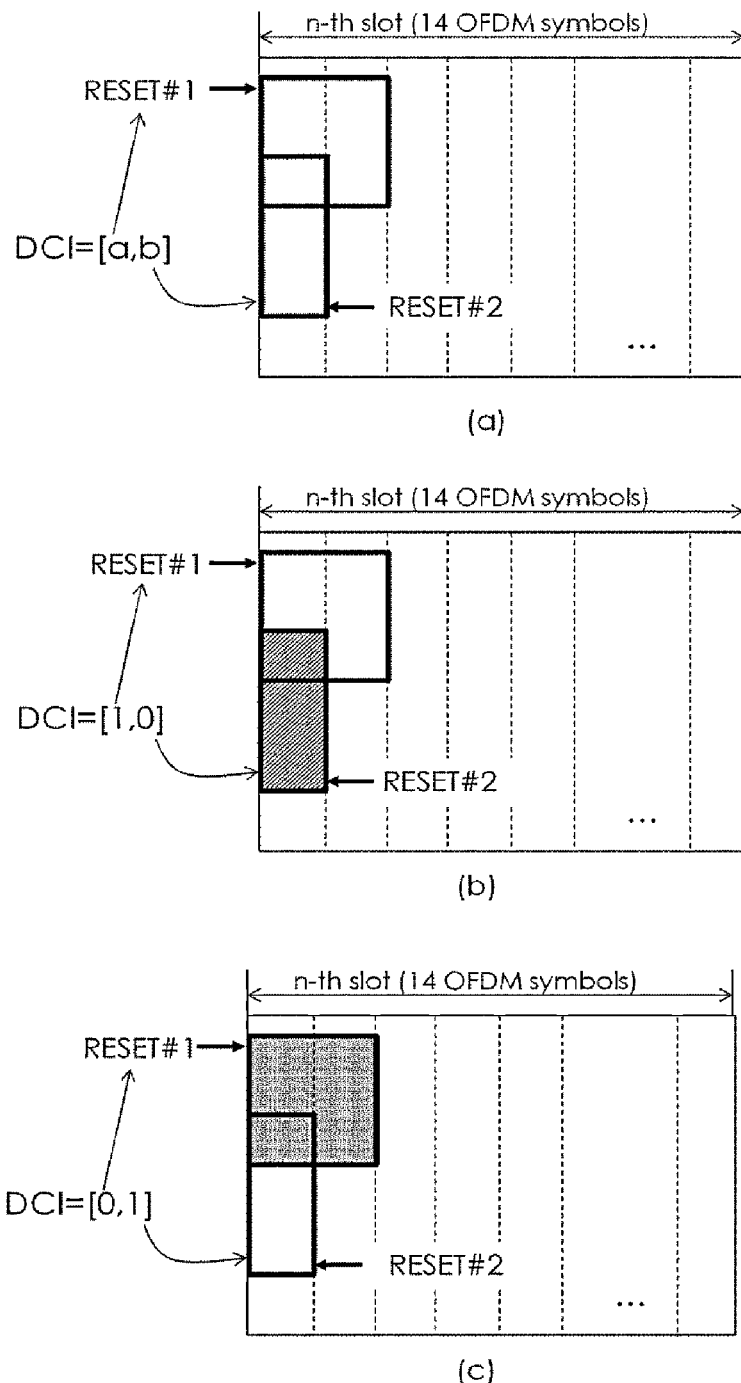
Figure 24:
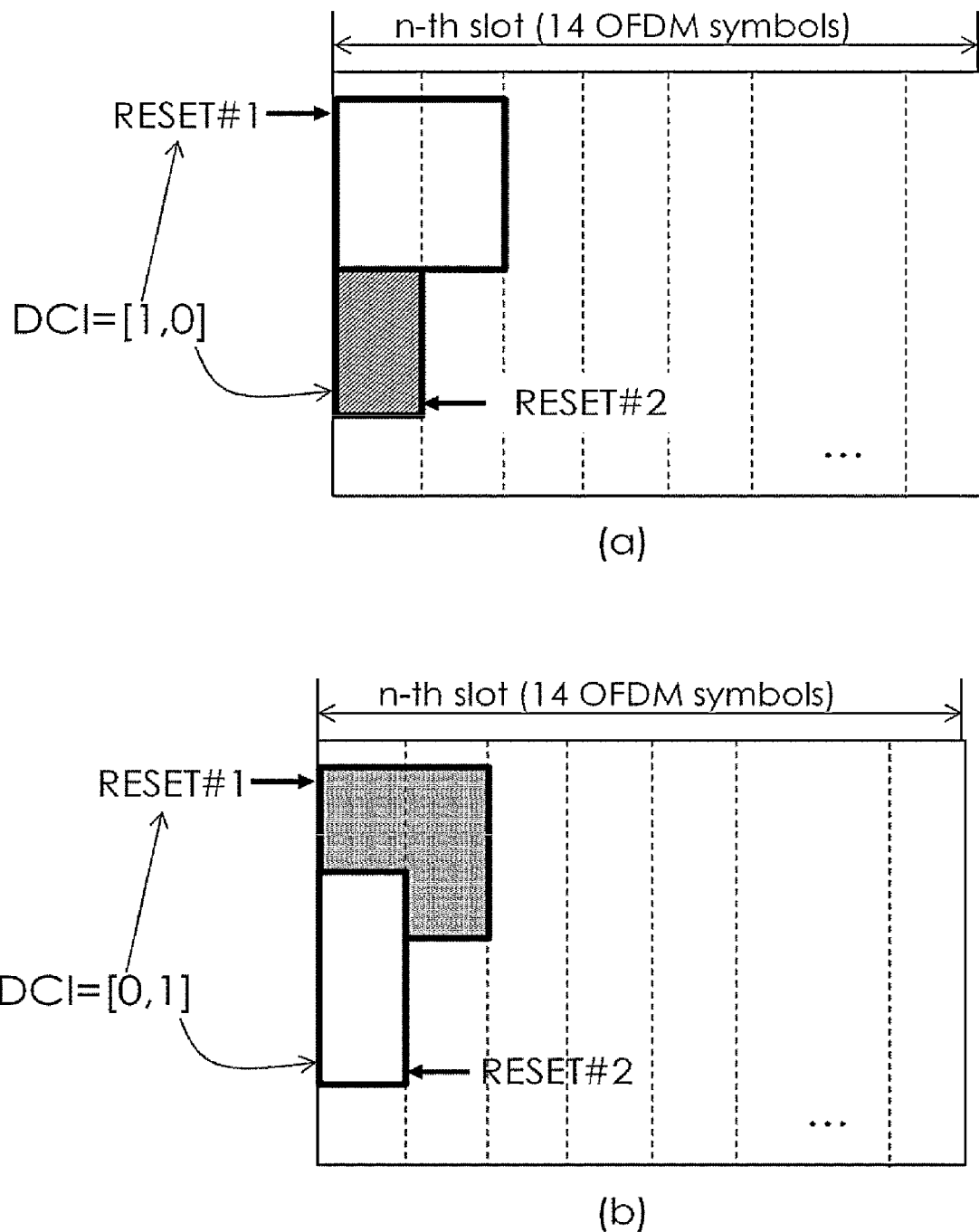

FIGS. 22 to 24 illustrate a case in which time-frequency resources indicated as occupied by different RESETs overlap.

When the base station configures the RESET for the UE, the UE may assume that the RESETs do not overlap each other. In detail, when time-frequency resources corresponding to different RESETs overlap, the UE may determine that the corresponding time-frequency resources are included in one RESET and not included in the remaining RESETs. In more detail, the UE may determine that time-frequency resources overlapped in RESET(s) are included in any one of the RESETs according to the priority of the RESET. In this case, the priority of the RESET may be explicitly indicated in the RRC signal. In another specific embodiment, the priority of RESET may be determined according to the order in which RESET is configured in the RRC signal. In another specific embodiment, the priority of the RESET may be determined according to the bit index of the RESET field to which the RESET is mapped. Also, the priority of the RESET including the CORESET monitored by the UE to receive the physical control channel may always be the highest. In addition, the priority of the RESET including the CORESET in which the UE receives the PDCCH may always be the highest.

In the embodiment of FIG. 22, the time-frequency resource indicated as occupied by the first RESET RESET #1) and the time-frequency resource indicated as occupied by the second RESET RESET #2 overlap. In the embodiment of FIG. 22A, the priority of the second RESET RESET #2 is higher than that of the first RESET RESET #1.

Therefore, the time-frequency resource, in which the time-frequency resource indicated as occupied by the first RESET RESET #1 and the time-frequency resource indicated as occupied by the second RESET RESET #2 overlap, is included in the second RESET RESET #2 and not included in the first RESET RESET #1. In the embodiment of FIG. 22(b), the priority of the first RESET RESET #1 is higher than that of the second RESET RESET #2. Therefore, the time-frequency resource, in which the time-frequency resource indicated as occupied by the first RESET RESET #1 and the time-frequency resource indicated as occupied by the second RESET RESET #2 overlap, is included in the first RESET RESET #1 and not included in the second RESET RESET #2.

In another specific embodiment, when the base station configures the RESET for the UE, the UE may assume that the RESETs may overlap each other. In this case, it is a problem when the bits of the RESET field corresponding to different RESETs indicate different information. For example, it is indicated whether a bit of the bit field of the L1-signaling corresponding to the first RESET is unavailable for physical data channel reception in the first RESET, and a bit of the bit field of the L1-signaling corresponding to the second RESET may be indicated as being available for physical data channel reception in the second RESET. In this case, the UE may give priority to any information. In more detail, information indicating that it can be used for physical data channel reception may be given priority. In the embodiment of FIGS. 23 to 24, as shown in FIG. 23(a), the time-frequency resource indicated as occupied by the first RESET RESET #1) and the time-frequency resource indicated as occupied by the second RESET RESET #2 overlap. In the embodiment of FIG. 23(b), the RESET field indicates that the first RESET RESET #1 is unavailable for PDSCH reception and indicates that the second RESET RESET #2 is available for PDSCH reception. Accordingly, the UE receives the PDSCH in the second RESET RESET #2, including the time-frequency resource in which the first RESET RESET #1 and the second RESET RESET #2 overlap. In the embodiment of FIG. 23(c), the RESET field indicates that the first RESET RESET #1 is available for PDSCH reception and indicates that the second RESET RESET #2 is unavailable for PDSCH reception. Accordingly, the UE receives the PDSCH in the first RESET RESET #1, including the time-frequency resource in which the first RESET RESET #1 and the second RESET RESET #2 overlap.

In more detail, information indicating that it is unavailable for physical data channel reception may be given priority. In the embodiment of FIG. 24(a), the RESET field indicates that the first RESET RESET #1 is unavailable for PDSCH reception and indicates that the second RESET RESET #2 is available for PDSCH reception. Accordingly, the UE receives the PDSCH in the second RESET RESET #2, excluding the time-frequency resource in which the first RESET RESET #1 and the second RESET RESET #2 overlap. In the embodiment of FIG. 24(b), the RESET field indicates that the first RESET RESET #1 is available for PDSCH reception and indicates that the second RESET RESET #2 is unavailable for PDSCH reception. Accordingly, the UE receives the PDSCH in the first RESET RESET #1, excluding the time-frequency resource in which the first RESET RESET #1 and the second RESET RESET #2 overlap.

In addition, when different RESETs overlap and the L1-signaling bit fields corresponding to different RESETs indicate different information, the UE may determine whether to give priority to information indicating that physical data channel reception is unavailable or information indicating that physical data channel reception is available based on the RRC signal. In addition, the UE can independently determine which information is given priority for each RESET. The UE may give priority to information indicating that physical data channel reception is unavailable in the time-frequency resource corresponding to the first RESET, and may give priority to information indicating that physical data channel reception is available in the time-frequency resource corresponding to the second RESET.

Figure 25:
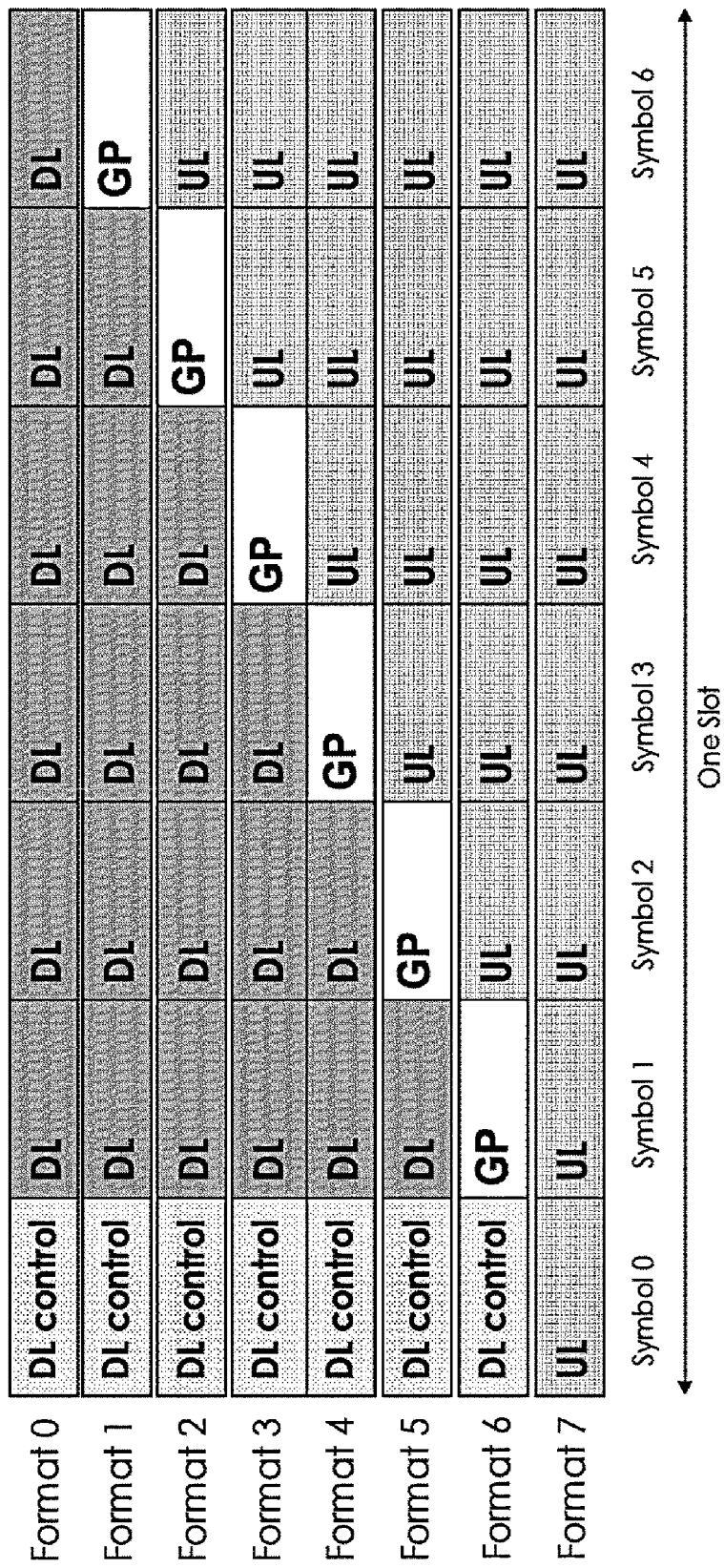
FIG. 25 illustrates a slot configuration used in a wireless communication system according to an embodiment of the present invention.

FIG. 25 illustrates a slot configuration used in a wireless communication system according to an embodiment of the present invention.

One slot may include seven OFDM symbols. In another specific embodiment, one slot may include 14 OFDM symbols. The slot may include a DL symbol used for DL transmission. In addition, the slot may include a UL symbol used for UL transmission. Further, when a slot is changed from DL transmission to UL transmission or from UL transmission to DL transmission, it may include a GAP symbol that is not used for DL transmission or UL transmission. This is because the base station and the UE need time to change from the transmission mode to the reception mode or from the reception mode to the transmission mode. The GAP symbol may be one OFDM symbol. In addition, the slot may include one OFDM symbol for transmitting DL control information.

FIG. 25 shows eight slot configurations. In Format 0, a slot includes only a DL symbol DL. In Format 1, a slot includes six DL symbols DL and one GAP symbol GP. In Format 2, a slot includes five DL symbols DL, one GAP symbol GP, and one UL symbol UL. In Format 3, a slot includes four DL symbols DL, one GAP symbol GP, and two UL symbols UL. In Format 4, a slot includes three DL symbols DL, one GAP symbol GP, and three UL symbols UL. In Format 5, a slot includes two DL symbols DL, one GAP symbol GP, and four UL symbols UL. In Format 6, a slot includes on DL symbol DL, one GAP symbol GP, and five UL symbols UL. In Format 7, a slot includes six UL symbols DL and one GAP symbol GP. In Format 8, a slot includes only a UL symbol UL. For convenience of description, a slot including only a DL symbol, such as Format 0, is referred to as a DL only slot. A slot including only UL symbols, such as Format 7, is referred to as a UL only slot. A slot including both DL and UL symbols, such as Format 1 to Format 6, is referred to as a hybrid slot. In a slot other than the UL only slot, a CORESET for PDCCH transmission may be configured. In this case, group-common PDCCH and UE-specific PDCCH may be transmitted in CORESET. One or more UEs may receive a group-common PDCCH. In addition, the group-common PDCCH may include slot configuration information indicating the slot configuration. In this case, the group-common PDCCH may include slot configuration information of a slot in which the PDCCH is transmitted. In addition, the group-common PDCCH may include slot configuration information of the slot next to the slot in which the PDCCH is transmitted as well as the slot in which the PDCCH is transmitted. In addition, the group-common PDCCH may include slot configuration information of N future slots as well as the slot in which the PDCCH is transmitted. In this case, the future slot is a slot corresponding to a later time than the slot in which the PDCCH is transmitted. In addition, N is a natural number of 1 or more. N can be changed dynamically. Moreover, N can be configured by the RRC signal. In addition, the base station may be dynamically indicated to the UE in the set configured in the RRC signal.

A method of signaling slot configuration information will be described with reference to FIGS. 26 to 33.

Figure 26:
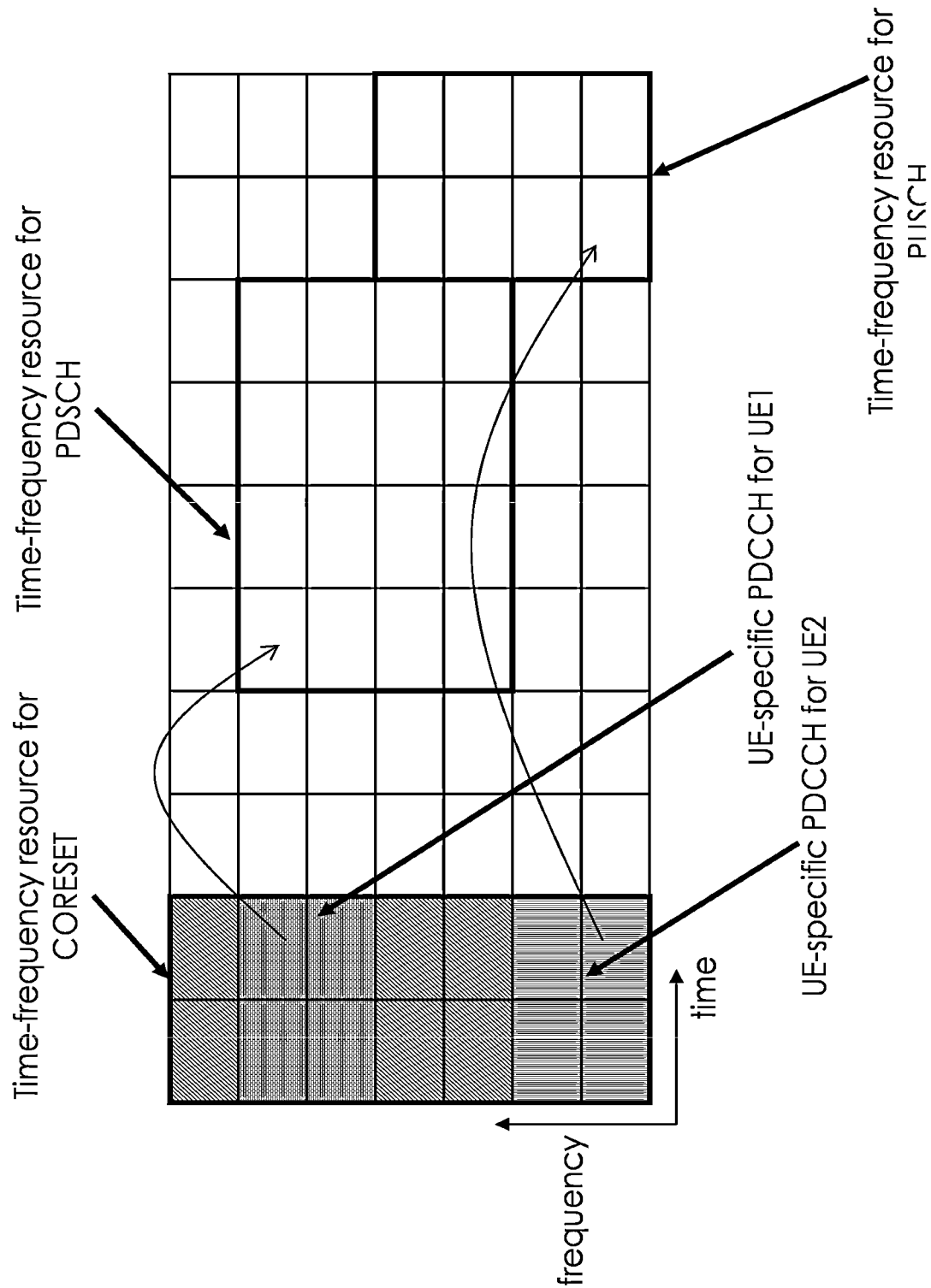
FIG. 26 illustrates that a UE-specific PDCCH indicates a scheduled resource to a terminal in a wireless communication system according to an embodiment of the present invention.

FIG. 26 illustrates that a UE-specific PDCCH indicates a scheduled resource to a UE in a wireless communication system according to an embodiment of the present invention.

In the embodiment of FIG. 26, the UE-specific PDCCH for the first UE UE1 indicates a time-frequency resource in which PDSCH reception of the first UE UE1 is scheduled. In addition, the UE-specific PDCCH for the second UE UE2 indicates a time-frequency resource scheduled for PUSCH reception of the second UE UE2. In this case, the base station may indicate a continuous time-frequency resource using one indication value. In more detail, in the LTE system, a base station indicates a continuous time-frequency resource using one indication value. In this case, the indication value is referred to as a resource indication value (RIV), and this indication method is referred to as an RIV method. In more detail, RIV may indicate the starting position of a continuous resource and the number of continuous resources. The UE may determine the starting position of the continuous resource allocated to the UE and the number of the corresponding resources based on the RIV.

In the type-2 resource allocation of the LTE system, the RIV is used as follows. If the DCI format of the PDCCCH is any one of 1A, 1B and 1D, or the DCI format of the EPDCCH is any one of 1A, 1B and 1D, or the DCI format of the MPDCCH is 6-1A, the DCI includes the MV. The base station may indicate continuous resources in the frequency domain in which the physical data channel reception of the UE is scheduled using the RIV. In this case, the UE may obtain $RB_{start}$, which is the start RB of continuous resources, and $L_{CRBs}$, which is the number of RBs of the continuous resources, in the frequency domain scheduled by the DCI, based on the MV included in the DCI. Therefore, the base station can determine the value of MV according to the following equation.

if $(L_{CRBs}-1) \le \lfloor N_{RB}^{DL}/2 \rfloor$ then $RIV = N_{RB}^{DL}(L_{CRBs}-1) + RB^{start}$ else $RIV = N_{RB}^{DL}(N_{RB}^{DL} - L_{CRBs}+1) + (N_{RB}^{DL} - 1 - RB^{start})$ where $L_{CRBs} \ge 1$ and shall not exceed $N_{RB}^{DL} - RB^{start}$.

In this case, $N_{RB}^{DL}$ is the total number of RBs that can be used for resource allocation for DL transmission. When a second type (type-2) resource allocation scheme is used for UL transmission, NDLRB may be replaced with $N_{RB}^{UL}$, which is the total number of RBs that can be used for resource allocation for UL transmission.

When the format of the PDCCH is 1C, the base station may indicate a scheduled resource to the UE in a plurality of RB units according to a second type (type-2) resource allocation scheme. $N_{RB}^{step}$ represents the number of a plurality of RBs. In this case, the start positions of the continuous resources indicated by the MV that the base station can configure are as follows.

$RB_{start}=0, N_{RB}^{step}, 2N_{RB}^{step}, \ldots, (\lfloor N_{RB}^{DL}/N_{RB}^{step} \blacksquare -1) M_{RB}^{step}$ In addition, the start positions of the continuous resources indicated by the RIV that the base station can configure are as follows.

$L_{CRBs} = N_{RB}^{step}, 2N_{RB}^{step}, \ldots, \lfloor N_{RB}^{DL}/N_{RB}^{step} \rfloor N_{RB}^{step}$ In this case, the base station may determine the value of the RIV according to the following equation.

if $(L'_{CRBs}-1) \le \lfloor N'_{RB}^{DL}/2 \rfloor$ then $RIV = N'_{RB}^{DL}(L'_{CRBs}-1) + RB'_{start}$ else $RIV = N'_{RB}^{DL}(N'_{RB}^{DL} - L'_{CRBs}+1) + (N'_{RB}^{DL} - 1 - RB'_{start})$ In this case, $N_{RB}^{DL}$ is the total number of RBs that can be used for resource allocation for DL transmission. When a second type (type-2) resource allocation scheme is used for UL transmission, $N_{RB}^{DL}$ may be replaced with $N_{RB}^{UL}$, which is the total number of RBs that can be used for resource allocation for UL transmission.

The base station may indicate continuous resources in the time domain in which the physical data channel reception of the UE is scheduled using the RIV. In this case, the UE may obtain $S_{start}$, which is the start OFDM symbol of continuous resources, and $L_{symbols}$, which is the number of OFDM symbols of the continuous resources, in the frequency domain scheduled by the DCI, based on the RIV included in the DCI. $S_{start}$ can be interpreted as a position in a slot. For example, when $S_{start}=0$, $S_{start}$ may indicate the first OFDM symbol of the slot. When $N_{symbol}$ is the total number of symbols allocated to the physical data channel reception of the UE scheduled by the DCI, the value of MV is determined according to the following equation.

if $(L_{symbols}-1) \le \lfloor N_{symbols}/2 \rfloor$ then $RIV = N_{symbols}(L_{symbols}-1) + S_{start}$ else $RIV = N_{symbols}(N_{symbols} - L_{symbols}-1) + S_{start}$ where $L_{symbols} \ge 1$ and shall not exceed $N_{symbals} - S_{start}$ The base station may indicate a scheduled resource to the UE in units of a plurality of OFDM symbols. $N_{symbol}^{step}$ represents the number of OFDM symbols. In this case, the start positions of the continuous resources indicated by the RIV that the base station can configure are as follows.

$S_{start}=0, N_{symbol}^{step}, 2N_{symbol}^{step}, \ldots, (\lfloor N_{symbols}/N_{symbol}^{step} \rfloor -1) N_{symbol}^{step}$ In addition, the number of continuous OFDM symbols of continuous resources indicated by the RIV that the base station can configure is as follows.

$L_{symbols} = N_{symbol}^{step}, 2N_{symbol}^{step}, \ldots, (\lfloor N_{symbols}/N_{symbol}^{step} \rfloor) N_{symbol}^{step}$ The base station may configure the value of RIV according to the following equation.

if $(L'_{symbols}-1) \le \lfloor N'_{symbols}/2 \rfloor$ then $RIV = N'_{symbols}(L'_{symbols}-1) + S'_{start}$ else $RIV = N'_{symbols}(N'_{symbols} - L'_{symbols}+1) + (N'_{symbols} - 1 - S'_{start})$ where $L'_{symbol} = L_{symbols}/N_{symbol}^{step}$, $S'_{start} = S_{start}/N_{symbol}^{step}$ and $N'_{symbols} = \lfloor N_{symbols}/N_{symbol}^{step} \rfloor$.

where $L'_{symbols} \ge 1$ and shall not exceed $N'_{symbols} - S'_{start}$

Figure 27:
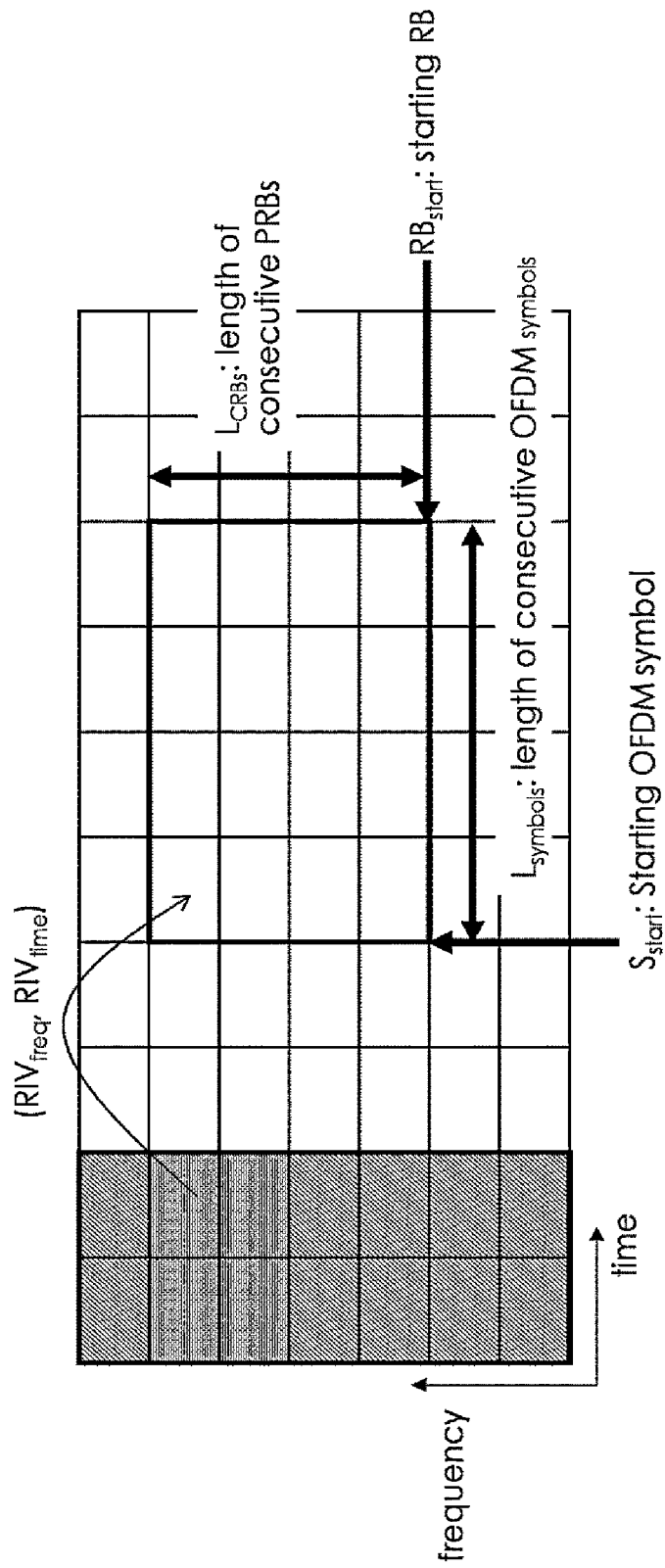
FIG. 27 illustrates that a base station transmits two RIVs to a terminal to indicate a scheduled time frequency domain to the terminal in a wireless communication system according to an embodiment of the present invention.

FIG. 27 illustrates that a base station transmits two RIVs to a UE to indicate a scheduled time frequency domain to the UE in a wireless communication system according to an embodiment of the present invention.

As described above, the base station may indicate a time-frequency resource scheduled for PDSCH reception of the UE or a time-frequency resource scheduled for PUSCH transmission of the UE using the RIV. In this case, the UE may receive the PDSCH or transmit the PUSCH in the time-frequency resource indicated by the RIV. The base station may indicate a scheduled resource to the UE using the value of the RIV in the frequency domain and the RIV in the time domain. Specifically, the base station may indicate the time-frequency resource scheduled for the UE by independently indicating the value of the RIV of the frequency domain and the MV of the time domain. For convenience of description, the MV of the frequency domain is represented by $RIV_{freq}$, and the MV of the time domain is represented by $RIV_{time}$. In a specific embodiment, the base station may indicate a time-frequency resource to which the PDSCH is allocated by transmitting a DCI including two RIVs, that is, $RIV_{freq}$ and $RIV_{time}$, for scheduling PDSCH reception.

In the embodiment of FIG. 27, the base station transmits each of $RIV_{freq}$ and $RIV_{time}$ through the DCI. In this case, the UE may determine the time frequency domain indicated by $RIV_{freq}$ and $RIV_{time}$ according to the above-described embodiments. Specifically, the UE obtains $L_{CRB}$ and $RB_{start}$ from $RIV_{freq}$ according to the embodiments described above. In addition, the UE obtains $L_{symbols}$ and $S_{start}$ from $RIV_{time}$.

If the maximum value that RIV can represent is Q, the length of bits for representing RIV is $[\log_2 Q+1]$. If the maximum number of RBs that the base station can use for scheduling the UE is six and the maximum number of OFDM symbols is nine, the value of $RIV_{freq}$ is any one of 0 to 20. In this case, the value of $RIV_{time}$ is any one of 0 to 44. Therefore, 5 bits are needed to indicate $RIV_{freq}$ and 6 bits are needed to indicate $RIV_{time}$. Therefore, a total of 11 bits are needed to indicate a scheduled time-frequency resource to the UE. If a plurality of RIVs can be encoded into one MV, the number of bits used for transmitting the MV can be reduced. This will be described with reference to FIG. 28.

Figure 28:
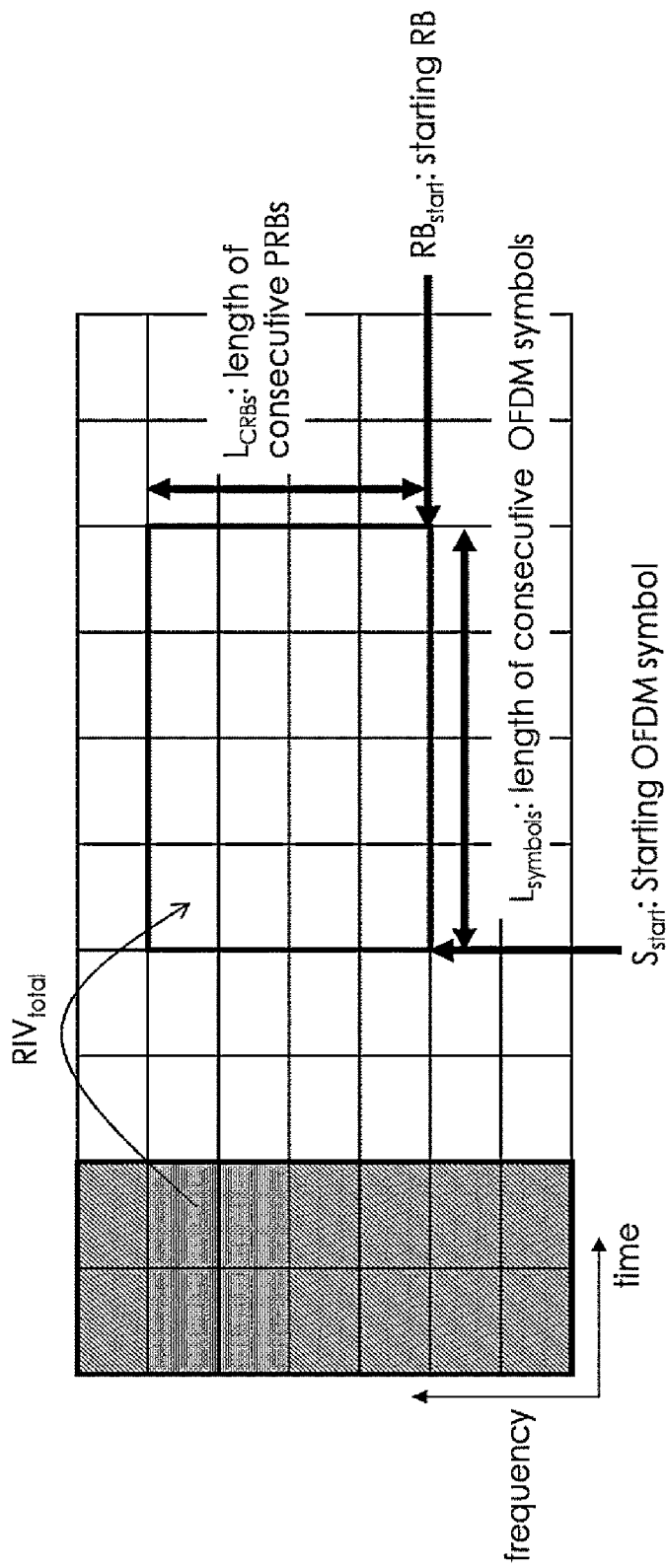
FIG. 28 illustrates that a base station transmits two RIVs to a terminal to indicate a scheduled time frequency domain to the terminal in a wireless communication system according to an embodiment of the present invention.

FIG. 28 illustrates that a base station transmits two RIVs to a UE to indicate a scheduled time frequency domain to the UE in a wireless communication system according to an embodiment of the present invention.

The base station may indicate a scheduled time-frequency resource to the UE by transmitting one MV. In this case, one MV may be a value generated by encoding two RIVs $RIV_1$ and $RIV_2$. The two RIVs may be $RIV_{freq}$ and $RIV_{time}$ described above. The maximum value that $RIV_1$ can have is represented as $RIV_1^{max}$. In addition, the MV generated by encoding two MV is referred to as the final MV $RIV_{total}$. The base station may determine the value of the final RIV $RIV_{total}$ according to the following equation.

$$RIV_{total}=RIV_1+(RIV_1^{max}+1)*RIV_2.$$

In addition, the UE can obtain $RIV_1$ and $RIV_2$ from the final $RIV_{total}$ according to the following equations.

$$RIV_1=RIV_{total} \bmod (RIV_1^{max}+1)$$

$$RIV_2=(RIV_{total}-RIV_1)/(RIV_1^{max}+1)$$

In this case, $RIV_1$ may be $RIV_{freq}$. In addition, $RIV_2$ may be $RIV_{time}$. When the base station schedules time-frequency resources to the UE in one RB unit, $RIV_{freq}^{max}$, which is the maximum value of $RIV_{freq}$, may be determined according to the following equation.

$$RIV_{freq}^{max}=N_{RB}^{DL}*(N_{RB}^{DL}+1)/2-1$$

When the base station schedules time-frequency resources to the UE in units of a plurality of RBs and the number of the plurality of RBs is represented as $N_{RB}^{step}$, $RIV_{freq}^{max}$ may be determined according to the following equation.

$$RIV_{freq}^{max}=N'_{RB}^{DL}*(N'_{RB}^{DL}+1)/2-1$$

In this case, $N'_{RB}^{DL}=[N_{RB}^{DL}/N_{RB}^{step}]$. In this case, NDLRB is the total number of RBs that can be used for resource allocation for DL transmission. If RIV is used for resources for UL transmission, the NDLRB may be replaced with NULRB, which is the total number of RBs that can be used for resource allocation for UL transmission.

In this case, $RIV_2$ may be $RIV_{time}$. In addition, $RIV_1$ may be $RIV_{freq}$. When the base station schedules time-frequency resources to the UE in one OFDM unit, $RIV_{time}^{max}$, which is the maximum value of $RIV_{time}$, may be determined according to the following equation.

$$RIV_{time}^{max}=N_{symbols}*(N_{symbols}+1)/2-1$$

When the base station schedules time-frequency resources to the UE in units of a plurality of OFDM symbols and the number of the plurality of RBs is represented as $N_{symbol}^{step}$, RIVfreqmax may be determined according to the following equation.

$$RIV_{freq}^{max}=N'_{RB}^{DL}*(N'_{RB}^{DL}+1)/2-1$$

In this case, $N'_{symbols}=[N_{symbols}/N_{symbol}^{step}]$.

In the embodiment of FIG. 28, the base station transmits one final RIV $RIV_{total}$ through the DCI of the UE-specific PDCCH. The UE obtains $RIV_{time}$ and $RIV_{freq}$ from the final MV $RIV_{total}$ according to the embodiments described above. The UE obtains $L_{CRB}$ and $RB_{start}$ from $RIV_{freq}$. In addition, the UE obtains $L_{symbols}$ and $S_{start}$ from $RIV_{time}$.

In another specific embodiment, the base station may encode three or more RIVs to generate one final MV $RIV_{total}$, and may transmit the final MV $RIV_{total}$ using DCI. In this case, the base station may sequentially encode two RIVs to generate a final MV $RIV_{total}$. For example, the base station may encode three RIVs $RIV_1$, $RIV_2$, and $RIV_3$ to generate the final MV $RIV_{total}$. For example, the base station may encode three RIVs $RIV_1$, $RIV_2$, and $RIV_3$ to generate the final MV $RIV_{total}$. Thereafter, the base station may generate the final RIV $RIV_{total}$ by encoding the middle MV and the remaining one MV $RIV_3$.

Through these embodiments, the base station can reduce the number of bits used for RIV transmission. For example, six RBs can be scheduled by the UE, and nine OFDM symbols can be scheduled by the UE. In this case, RIVfreq may have a value of any one of 0 to 20. In addition, RIVtime may have a value of any one of 0 to 44. As in the above-described embodiment, when the final MV RIVtotal is generated by encoding RIVfreq and RIVtime, the final MV RIVtotal may have a value of one of 0 to 944. Therefore, 10 bits are required to transmit the final MV RIVtotal. Specifically, when the RIV follows this embodiment, the bit of the DCI used for the MV transmission can be reduced by one bit than when the base station transmits each of the $RIV_{freq}$ and the $RIV_{time}$. Table 4 shows the number of bits of DCI required for RIV transmission according to the number of RBs and OFDM symbols that a UE can schedule when transmitting $RIV_{freq}$ and $RIV_{time}$, respectively. In addition, Table 5 shows the number of bits of DCI required for MV transmission according to the number of RBs and OFDM symbols that a UE can schedule when transmitting the final RIV $RIV_{total}$ by encoding $RIV_{freq}$ and $RIV_{time}$. Through Table 4 and Table 5, when transmitting a final MV $RIV_{total}$ by encoding a plurality of RIVs, it can be checked that the number of bits of DCI required for MV transmission can be reduced.

TABLE 4

| Separate encoding | # of OFDM symbols | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| # of PRBs 6 | 5 | 7 | 8 | 9 | 9 | 10 | 10 | 11 | 11 | 11 | 12 | 12 | 12 | 12 |
| 15 | 7 | 9 | 10 | 11 | 11 | 12 | 12 | 13 | 13 | 13 | 14 | 14 | 14 | 14 |
| 25 | 9 | 11 | 12 | 13 | 13 | 14 | 14 | 15 | 15 | 15 | 16 | 16 | 16 | 16 |
| 50 | 11 | 13 | 14 | 15 | 15 | 16 | 16 | 17 | 17 | 17 | 18 | 18 | 18 | 18 |
| 75 | 12 | 14 | 15 | 16 | 16 | 17 | 17 | 18 | 18 | 18 | 19 | 19 | 19 | 19 |
| 100 | 13 | 15 | 16 | 17 | 17 | 18 | 18 | 19 | 19 | 19 | 20 | 20 | 20 | 20 |

TABLE 5

| Joint encoding | # of OFDM symbols | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| # of PRBs 6 | 5 | 6 | 7 | 8 | 9 | 9 | 10 | 10 | 10 | 11 | 11 | 11 | 11 | 12 |
| 15 | 7 | 9 | 10 | 11 | 11 | 12 | 12 | 12 | 13 | 13 | 13 | 14 | 14 | 14 |
| 25 | 9 | 10 | 11 | 12 | 13 | 13 | 14 | 14 | 14 | 15 | 15 | 15 | 15 | 16 |
| 50 | 11 | 12 | 13 | 14 | 15 | 15 | 16 | 16 | 16 | 17 | 17 | 17 | 17 | 18 |
| 75 | 12 | 14 | 15 | 15 | 16 | 16 | 17 | 17 | 17 | 18 | 18 | 18 | 18 | 19 |
| 100 | 13 | 14 | 15 | 16 | 17 | 17 | 18 | 18 | 18 | 19 | 19 | 19 | 19 | 20 |

In the above-described embodiments, only the case in which the final RIV RIVtotal generation and the final RIV RIVtotal transmission indicate a time-frequency resource scheduled for the DCI has been described. However, the above-described embodiments are not limited thereto, and may also be applied to a case of indicating a time-frequency resource using RIV. For example, when the base station schedules time-frequency resources through the RRC signal, the above-described embodiments may be applied. In addition, when the base station indicates the preempted time-frequency resources to the UE, the above-described embodiments may be applied. In this case, the preempted time-frequency resource may indicate that some of the time-frequency resources already scheduled for the UE are not scheduled for the UE.

The base station may indicate a time resource for scheduling to the UE according to the following embodiments. In more detail, the base station may configure a time resource mapping table indicating the mapping of a physical data channel scheduled for a UE and a time resource using the RRC signal. In this case, the RRC signal may be a UE-specific RRC signal. In addition, the base station may signal the state of the mapping table using any field included in the DCI scheduling the physical data channel reception or the physical data channel transmission of the UE. The UE may determine the mapping table of time resources configured by the base station based on the RRC signal, and determine the domain of the time resource in which the corresponding data channel is scheduled based on one field included in the DCI scheduling the physical data channel reception or physical data channel transmission of the UE. The number of states of the time resource mapping table may be 16. In this case, any one field included in the DCI may be 4 bits. The time resource mapping table may include a K1 value indicating a HARQ-ACK transmission slot, a slot in which the physical data channel is transmitted, the number of first OFDM symbols scheduled for the physical data channel and the number of OFDM symbols scheduled for the physical data channel in the slot in which the physical data channel is transmitted, and a mapping type of a physical data channel. In this case, the mapping type of the physical data channel may indicate whether the position of the demodulation reference signal (DMRS) is determined regardless of the position of the physical data channel. In a specific embodiment, the base station may configure a slot in which the physical data channel is transmitted, a first OFDM symbol scheduled for a physical data channel in a slot in which the physical data channel is transmitted, and the number of OFDM symbols scheduled for a physical data channel by using 6 bits of the RRC signal. For example, two bits of six bits may represent a slot in which a physical data channel is transmitted. Two bits indicating a slot in which a physical data channel is transmitted are referred to as K0. K0 may represent an index difference between a slot in which a UE receives a DCI and a slot in which a physical data channel scheduled for the UE is transmitted. The value that K0 can have may be any one of $00_b$, $01_b$, $10_b$, and $11_b$. When the value of K0 is 0, the slot in which the UE receives the DCI and the slot in which the scheduled physical data channel is transmitted to the UE may be the same. In addition, 4 bits of 6 bits may indicate the first OFDM symbols scheduled for the physical data channel and the number of OFDM symbols scheduled for the physical data channel in the slot in which the physical data channel is transmitted. In this case, the number of OFDM symbols scheduled for the physical data channel may be any one of 2, 4, 7, and 14. In more detail, 4 bits may be mapped as shown in Table 6 according to the first OFDM symbol scheduled for a physical data channel and the number of OFDM symbols scheduled for a physical data channel.

TABLE 6

| State | Starting symbol index | Length |
|---|---|---|
| 0 | 0 | 2 |
| 1 | 2 | 2 |
| 2 | 4 | 2 |
| 3 | 6 | 2 |
| 4 | 8 | 2 |
| 5 | 10 | 2 |
| 6 | 12 | 2 |
| 7 | 0 | 4 |

TABLE 6-continued

| State | Starting symbol index | Length |
|---|---|---|
| 8 | 2 | 4 |
| 9 | 4 | 4 |
| 10 | 6 | 4 |
| 11 | 8 | 4 |
| 12 | 10 | 4 |
| 13 | 0 | 7 |
| 14 | 7 | 7 |
| 15 | 0 | 14 |

When configuring the OFDM symbol index of one slot with 0 to 15, each state may represent the following OFDM symbol. The OFDM symbol indicated by the state value may be as follows. 0:{0,1}, 1:{2,3}, 2:{4,5}, 3:{6,7}, 4:{8,9}, 5:{10,11}, 6:{12,13}, 7:{0,1,2,3}, 8:{2,3,4,5}, 9:{4,5,6,7}, 10:{6,7,8,9}, 11:{8,9,10,11}, 12:{0,11,12,13}, 13:{0,1,2,3,4,5,6}, 14:{7,8,9,10,11,12,13}, 15:{0,1,2,3,4,5,6,7,8,9,10,11,12,13,14}. In this case, in X: {Y}, X represents a state value, and Y represents an OFDM symbol indicated by the X state.

In another specific embodiment, one bit of six bits may indicate a slot in which a physical data channel is transmitted. One bit indicating a slot in which a physical data channel is transmitted is referred to as K0. K0 may represent an index difference between a slot in which a UE receives a DCI and a slot in which a physical data channel scheduled for the UE is transmitted. The value that K0 can have may be any one of 0 and 1. If the value of K0 is 0, the slot in which the UE receives the DCI and the slot in which the scheduled physical data channel is transmitted to the UE may be the same. If the value of K0 is 1, a difference between the index of the slot in which the UE receives the DCI and the index of the slot in which the physical data channel scheduled for the UE is transmitted may be E. In this case, E may be fixed to 1 or another natural number. In addition, 5 bits of 6 bits may indicate the first OFDM symbols scheduled for the physical data channel and the number of OFDM symbols scheduled for the physical data channel in the slot in which the physical data channel is transmitted. In this case, the number of OFDM symbols scheduled for the physical data channel may be any one of 1, 2, 4, 7, and 14. In more detail, 5 bits may be mapped as shown in Table 7 according to the first OFDM symbol scheduled for a physical data channel and the number of OFDM symbols scheduled for a physical data channel.

TABLE 7

| State | Starting symbol index | Length |
|---|---|---|
| 0 | 0 | 2 |
| 1 | 2 | 2 |
| 2 | 4 | 2 |
| 3 | 6 | 2 |
| 4 | 8 | 2 |
| 5 | 10 | 2 |
| 6 | 12 | 2 |
| 7 | 0 | 4 |
| 8 | 2 | 4 |
| 9 | 4 | 4 |
| 10 | 6 | 4 |
| 11 | 8 | 4 |
| 12 | 10 | 4 |
| 13 | 0 | 7 |
| 14 | 7 | 7 |
| 15 | 0 | 14 |
| 16 | 0 | 1 |
| 17 | 1 | 1 |
| 18 | 2 | 1 |

TABLE 7-continued

| State | Starting symbol index | Length |
|---|---|---|
| 19 | 3 | 1 |
| 20 | 4 | 1 |
| 21 | 5 | 1 |
| 22 | 6 | 1 |
| 23 | 7 | 1 |
| 24 | 8 | 1 |
| 25 | 9 | 1 |
| 26 | 10 | 1 |
| 27 | 11 | 1 |
| 28 | 12 | 1 |
| 29 | 13 | 1 |
| 30 | — | — |
| 31 | — | — |

0:{0,1}, 1:{2,3}, 2:{4,5}, 3:{6,7}, 4:{8,9}, 5:{10,11}, 6:{12,13}, 7:{0,1,2,3}, 8:{2,3,4,5}, 9:{4,5,6,7}, 10:{6,7,8,9}, 11:{8,9,10,11}, 12:{10,11,12,13}, 13:{0,1,2,3,4,5,6}, 14:{7,8,9,10,11,12,13}, 15:{0,1,2,3,4,5,6,7,8,9,10,11,12,13,14}, 16:{0}, 17:{1}, 18:{2}, 19:{3}, 20:{4}, 21:{5}, 22:{6}, 23:{7}, 24:{8}, 25:{9}, 26:{10}, 27:{11}, 28:{12}, 29:{13}. In this case, in X: {Y}, X represents a state value, and Y represents an OFDM symbol indicated by the X state. In addition, state values 30 and 31 may be reserved. The state values 30 and 31 may represent all semi-statically configured DL symbols and semi-statically configured unknown symbols, respectively. In this case, the unknown symbol may indicate a symbol that is not configured as a UL symbol or a DL symbol. In addition, the state values 30 and 31 may represent all OFDM symbols except for the designated number of OFDM symbols at the end of the slot, respectively, among all semi-statically configured DL symbols and all semi-statically configured unknown symbols In this case, the designated number may be a fixed number. For example, the designated number may be one. In addition, the designated number may be separately designated for each UE. Specifically, the designated number may be configured for each UE by the RRC signal.

In another specific embodiment, 1 bit of 6 bits may indicate a reference position of a slot in which a physical data channel is transmitted. In this case, 1 bit may indicate whether the reference position of the slot in which the physical data channel is transmitted is the first OFDM symbol of the slot or an OFDM symbol immediately after CORESET. 5 bits of the 6 bits may be the number of OFDM symbols scheduled for a physical data channel. If 1 bit of 6 bits indicates the start time point of the slot, and the index of the OFDM starting symbol indicated by 5 bits of 6 bits is A, the physical data channel is transmitted in the OFDM symbol corresponding to the number of OFDM symbols in which the physical data channel is transmitted. If 1 bit of 6 bits represents an OFDM symbol immediately after CORESET, and the index of the OFDM starting symbol indicated by 5 bits of 6 bits is A, the physical data channel is transmitted in OFDM symbols corresponding to the number of OFDM symbols in which the physical data channel is transmitted from A+B. In this case, B is an index of an OFDM symbol corresponding to the OFDM symbol immediately after CORESET.

FIGS. 29 to 33 illustrate an OFDM symbol corresponding to a physical data channel scheduled for a UE represented by 6 bits of an RRC signal in a wireless communication system according to another embodiment of the present invention.

According to a specific embodiment, 6 bits of an RRC signal used by a base station to indicate a physical data channel scheduled for a UE may indicate 14 states in which the number of OFDM symbols scheduled for the physical data channel is 1, 2 states in which the number of OFDM symbols scheduled for the physical data channel is 7, and 28 states in which the number of OFDM symbols scheduled for the physical data channel is a multiple of 2. In this case, the state in which the number of OFDM symbols scheduled for the physical data channel is a multiple of 2 may follow an RIV scheme in which 14 OFDM symbols are bundled and indicated. According to a specific embodiment, the OFDM symbol that can be represented by 6 bits may the same as that in FIG. 29.

According to a another specific embodiment, 6 bits of an RRC signal used by a base station to indicate a physical data channel scheduled for a UE may indicate 14 states in which the number of OFDM symbols scheduled for the physical data channel is 1, 8 states in which the number of OFDM symbols scheduled for the physical data channel is 7, and 28 states in which the number of OFDM symbols scheduled for the physical data channel is a multiple of 2. In this case, the state in which the number of OFDM symbols scheduled for the physical data channel is a multiple of 2 indicates that the state starts with an even OFDM symbol index. According to a specific embodiment, the OFDM symbol that can be represented by 6 bits may the same as that in FIG. 30.

According to a another specific embodiment, 6 bits of an RRC signal used by a base station to indicate a physical data channel scheduled for a UE may indicate 14 states in which the number of OFDM symbols scheduled for the physical data channel is 1, and 49 states in which the number of OFDM symbols scheduled for the physical data channel is a multiple of 2. In this case, 28 states of 49 states in which the number of OFDM symbols scheduled for the physical data channel is a multiple of 2 indicate starting from an even OFDM symbol index, and 21 states indicate starting from an odd OFDM symbol index. According to a specific embodiment, the OFDM symbol that can be represented by 6 bits may the same as that in FIG. 31.

According to a another specific embodiment, 6 bits of an RRC signal used by a base station to indicate a physical data channel scheduled for a UE may indicate 14 states in which the number of OFDM symbols scheduled for the physical data channel is 1, and 48 states in which the number of OFDM symbols scheduled for the physical data channel is a multiple of 2. In this case, 28 states of 48 states in which the number of OFDM symbols scheduled for the physical data channel is a multiple of 2 may indicate starting from an even OFDM symbol index, and 20 states may indicate starting from an odd OFDM symbol index. According to a specific embodiment, the OFDM symbol that can be represented by 6 bits may be the same as that in FIG. 32.

In another specific embodiment, 6 bits of an RRC signal used by a base station to indicate a scheduled physical data channel to a UE may indicate 14 states in which the number of OFDM symbols scheduled for the physical data channel is 1, 8 states in which the number of OFDM symbols scheduled for the physical data channel is 7, 13 states in which the number of OFDM symbols scheduled for the physical data channel is 2, 11 states in which the number of OFDM symbols scheduled for the physical data channel is 4, one state in which the number of OFDM symbols scheduled for the physical data channel is 14, 4 states in which the number of OFDM symbols scheduled for the physical data channel is 3, 2 states in which the number of OFDM symbols scheduled for the physical data channel is 5, 2 states in which the number of OFDM symbols scheduled for the physical data channel is 6, one state in which the number of OFDM symbols scheduled for the physical data channel is 8, one state in which the number of OFDM symbols scheduled for the physical data channel is 9, one state in which the number of OFDM symbols scheduled for the physical data channel is 10, one state in which the number of OFDM symbols scheduled for the physical data channel is 11, one state in which the number of OFDM symbols scheduled for the physical data channel is 12, and one state in which the number of OFDM symbols scheduled for the physical data channel is 13. In this case, all states in which the number of OFDM symbols scheduled for the physical data channel is 3 may start from an OFDM symbol index corresponding to a multiple of 3. According to a specific embodiment, the OFDM symbol that can be represented by 6 bits may the same as that in FIG. 33.

According to a another specific embodiment, 6 bits of an RRC signal used by a base station to indicate a physical data channel scheduled for a UE may indicate 14 states in which the number of OFDM symbols scheduled for the physical data channel is 1, 8 states in which the number of OFDM symbols scheduled for the physical data channel is 7, 13 states in which the number of OFDM symbols scheduled for the physical data channel is 2, 11 states in which the number of OFDM symbols scheduled for the physical data channel is 4, one state in which the number of OFDM symbols scheduled for the physical data channel is 14, 10 states in which the number of OFDM symbols scheduled for the physical data channel is 5, and 7 states in which the number of OFDM symbols scheduled for the physical data channel is 8. In this case, a state in which the number of OFDM symbols scheduled for the physical data channel is 1 may indicate starting from all possible OFDM symbol indices.

According to a another specific embodiment, 6 bits of an RRC signal used by a base station to indicate a physical data channel scheduled for a UE may indicate 14 states in which the number of OFDM symbols scheduled for the physical data channel is 1, 8 states in which the number of OFDM symbols scheduled for the physical data channel is 7, 13 states in which the number of OFDM symbols scheduled for the physical data channel is 2, 11 states in which the number of OFDM symbols scheduled for the physical data channel is 4, one state in which the number of OFDM symbols scheduled for the physical data channel is 14, 12 states in which the number of OFDM symbols scheduled for the physical data channel is 3, and 5 states in which the number of OFDM symbols scheduled for the physical data channel is 10. In this case, a state in which the number of OFDM symbols scheduled for the physical data channel is 1 may indicate starting from all possible OFDM symbol indices.

According to a another specific embodiment, 6 bits of an RRC signal used by a base station to indicate a physical data channel scheduled for a UE may indicate 14 states in which the number of OFDM symbols scheduled for the physical data channel is 1, 8 states in which the number of OFDM symbols scheduled for the physical data channel is 7, 13 states in which the number of OFDM symbols scheduled for the physical data channel is 2, 11 states in which the number of OFDM symbols scheduled for the physical data channel is 4, one state in which the number of OFDM symbols scheduled for the physical data channel is 14, 9 states in which the number of OFDM symbols scheduled for the physical data channel is 6, 6 states in which the number of OFDM symbols scheduled for the physical data channel is 9, and 2 states in which the number of OFDM symbols scheduled for the physical data channel is 11. In this case, a state in which the number of OFDM symbols scheduled for the physical data channel is 1 may indicate starting from all possible OFDM symbol indices.

In the above, a method of representing a time-frequency resource scheduled for a UE using RIV has been described. The base station may use the RIV to indicate a continuous resource in the time domain, scheduled for the UE. In this case, the base station may indicate the location of the starting symbol of the scheduled continuous resource to the UE using the index of the reference OFDM symbol. The index of the start OFDM symbol indicated by RIV is obtained by subtracting the index of the reference OFDM symbol from the start OFDM symbol of the time-frequency resource scheduled for the UE. In more detail, the base station may signal an index of a reference OFDM symbol using an RRC signal. In addition, the base station may determine the RIV value according to the following equation.

if $(L_{symbols}-1) \leq \lfloor N_{symbols}/1 \rfloor$ then $RIV = N_{symbols}(L_{symbols}-1) + S'_{start}$ else $RIV = N_{symbols}(N_{symbols}-L_{symbols}+1) + (N_{symbols}-1-S'_{start})$ where $L_{symbols} \geq 1$ and shall not exceed $N_{symbols}-S'_{start}$. $L_{symbols}$ represents the number of OFDM symbols of time resources scheduled for the UE. In addition, $S_{start}$ is an index of the obtained start OFDM symbol of the time resource scheduled for the UE based on the index of the reference OFDM symbol. Therefore, the start OFDM symbol index of the time resource scheduled for the UE can be obtained according to the following equation.

$S_{start} = S'_{start} + R$

In this case, R is an index of a reference OFDM symbol. When using the reference OFDM symbol in this way, it is possible to reduce the memory size that the UE has to prepare for data channel reception. In addition, these embodiments may reduce the number of bits of the field used to transmit the RIV.

Previously, it has been described that the base station can configure the index of the reference OFDM symbol by using the RRC signal. In another specific embodiment, the UE may assume the index of the reference OFDM symbol as the first OFDM symbol of the slot. In another specific embodiment, the UE may determine the index of the reference OFDM symbol based on the CORESET transmitted by the DCI scheduling the physical data channel reception of the UE. For example, the UE may determine the first OFDM symbol index of the CORESET to which the DCI scheduling the physical data channel reception of the UE is transmitted as the index of the reference OFDM symbol. In another specific embodiment, the UE may determine the index of the OFDM symbol immediately after the last OFDM symbol of the CORESET, in which the DCI scheduling time resource for the UE is transmitted, as the index of the reference OFDM symbol. When the index of the first OFDM symbol of the CORESET in which the DCI scheduling the physical data channel reception of the UE for the UE is K, and the number of OFDM symbols corresponding to time resources occupied by the CORESET is A, the index of the reference OFDM symbol may be referred to as K+A. The number of bits required for RRC signal transmission can be reduced than when an index of a reference OFDM symbol is signaled through the RRC signal.

In another specific embodiment, the UE may determine the index of the reference OFDM symbol based on the CORESET transmitted by the DCI scheduling the physical data channel reception of the UE and the above described K0 value. K0 represents the slot in which the PDSCH is scheduled. If K0=0, it indicates that slots in which the DCI scheduling the physical data channel reception of the UE for the UE and the corresponding physical data channel are transmitted are the same as each other. In addition, when K0=1, it indicates that the corresponding physical data channel is transmitted after the slot immediately after the slot in which the DCI scheduling the physical data channel reception of the UE is transmitted to the UE. In a specific embodiment, if K0 is greater than 0, the UE may determine that the index of the reference OFDM symbol is 0. In addition, if K0 is equal to 0, the UE may determine the index of the reference OFDM symbol as the first OFDM symbol of the CORESET in which the DCI scheduling the physical data channel reception for the UE is transmitted. In another specific embodiment, if K0 is equal to 0, the UE may determine the index of the reference OFDM symbol as a value obtained by adding the number of OFDM symbols corresponding to the time resource occupied by the CORESET to the index of the first OFDM symbol of the CORESET to which the DCI scheduling the physical data channel reception of the UE is transmitted. In such an embodiment, the UE may perform different operations when cross-scheduling is performed or not, thereby reducing the number of bits required for MV transmission. In addition, the number of bits required for RRC signal transmission can be reduced than when an index of a reference OFDM symbol is signaled through the RRC signal.

In another specific embodiment, the UE may determine the index of the reference OFDM symbol based on the mapping type of the physical data channel received by the UE. In this case, the mapping type of the physical data channel may indicate whether the position of the demodulation reference signal (DMRS) is determined regardless of the position of the physical data channel. In addition, the physical channel received by the UE may be a PDSCH. In more detail, a mapping type of a physical data channel may be classified into a type A and a type B. Type A may indicate that the position of the DMRS is fixed at OFDM symbol index 2 or 3 in the slot. In this case, the position of the DMRS may be indicated by a physical broadcast channel (PBCH). In addition, the type B may indicate that the first DMRS is located in the first OFDM symbol of the physical data channel. When the mapping type of the physical data channel is the type A, the UE may determine that the index of the reference OFDM symbol is 0. In addition, when the mapping type of the physical data channel is the type B, the UE may determine the index of the reference OFDM symbol as the index of the first OFDM symbol of the CORESET in which the DCI scheduling the physical data channel reception for the UE is transmitted. In another specific embodiment, when the mapping type of the physical data channel is the type B, The UE may determine the index of the reference OFDM symbol as a value obtained by adding the number of OFDM symbols corresponding to the time resource occupied by the corresponding CORESET to the index of the first OFDM symbol of the CORESET to which the DCI scheduling the physical data channel reception of the UE is transmitted.

In another specific embodiment, the UE may determine the index of the reference OFDM symbol based on the location of the DCI scheduling the physical data channel reception of the UE. In more detail, when the DCI scheduling the physical data channel reception of the UE is located before a predetermined OFDM symbol, the UE may determine that the index of the reference OFDM symbol is 0. In addition, when the DCI scheduling the physical data channel reception of the UE is located before a predetermined OFDM symbol, the UE may determine the index of the reference OFDM symbol as the index of the first OFDM symbol of the CORESET in which the DCI scheduling the physical data channel reception of the UE is transmitted. In another specific embodiment, when the DCI scheduling the physical data channel reception of the UE is located before a predetermined OFDM symbol, the UE may determine the index of the reference OFDM symbol as the sum obtained by adding the number of OFDM symbols corresponding to the time resources occupied by the corresponding CORESET to the index of the first OFDM symbol of the CORESET in which the DCI scheduling the physical data channel reception of the UE is transmitted. The position of the predetermined OFDM symbol may be the same as the position of DMRS when the mapping type of the physical data channel received by the UE configured by the PBCH is the type A. In more detail, when the mapping type of the physical data channel is the type A and the PBCH indicates the second OFDM symbol by the position of DMRS, the position of the predetermined OFDM symbol may be the second OFDM symbol. In addition, when the mapping type of the physical data channel is the type A and the PBCH indicates the third OFDM symbol by the position of DMRS, the position of the predetermined OFDM symbol may be the third OFDM symbol.

In another specific embodiment, the UE may determine the index of the reference OFDM symbol based on the CORESET in which the DCI scheduling the physical data channel reception of the UE is transmitted, the K0 value described above, and whether the DCI scheduling the physical data channel reception of the UE is located before a predetermined OFDM symbol. K0 represents the slot in which the PDSCH is scheduled. In a specific embodiment, when K0 is greater than 0 or the DCI scheduling the physical data channel reception of the UE is located before a predetermined OFDM symbol, the UE may determine that the index of the reference OFDM symbol is 0. In addition, when K0 is equal to 0 or the DCI scheduling the physical data channel reception of the UE is not located before a predetermined OFDM symbol, the UE may determine the index of the reference OFDM symbol as the first OFDM symbol of the CORESET in which the DCI scheduling the physical data channel reception of the UE is transmitted. In another specific embodiment, when K0 is equal to 0 and the DCI scheduling the physical data channel reception of the UE is not located before a predetermined OFDM symbol, the UE may determine the index of the reference OFDM symbol as the sum obtained by adding the number of OFDM symbols corresponding to the time resources occupied by the CORESET to the index of the first OFDM symbol of the CORESET in which the DCI scheduling the physical data channel reception of the UE is transmitted. In such an embodiment, the UE may perform different operations when cross-scheduling is performed or not, thereby reducing the number of bits required for RIV transmission. In addition, the number of bits required for RRC signal transmission can be reduced than when an index of a reference OFDM symbol is signaled through the RRC signal.

In another specific embodiment, the UE may determine the index of the reference OFDM symbol based on the CORESET monitored by the UE. Specifically, when a plurality of CORESETs monitored by a UE are configured in one slot, the UE may determine the index of the reference OFDM symbol as the earliest OFDM symbol among the OFDM symbols occupied by the plurality of CORESETs. This is because it may be difficult for the UE to determine through which CORESET among the plurality of CORESETs the base station transmits the physical control channel. According to this embodiment, the UE may receive the physical data channel even if the physical control channel is transmitted to any CORESET among the plurality of CORESETs.

In another specific embodiment, when the CORESET in which the DCI scheduling the physical data channel reception of the UE is transmitted is located in a slot different from the slot in which the corresponding physical data channel is transmitted, the UE may determine the index of the reference OFDM symbol as 0. In addition, when the CORESET in which the DCI scheduling the physical data channel reception of the UE is transmitted is located in the same slot as the slot in which the corresponding physical data channel is transmitted, the UE may determine the index of the reference OFDM symbol as the first OFDM symbol of the CORESET in which the DCI scheduling the physical data channel reception of the UE is transmitted. According to another specific embodiment, when the CORESET in which the DCI scheduling the physical data channel reception of the UE is transmitted is located in the same slot as the slot in which the corresponding physical data channel is transmitted, the UE may determine the index of the reference OFDM symbol as a value obtained by adding the number of OFDM symbols corresponding to the time resource occupied by the CORESET to the index of the first OFDM symbol of the CORESET in which the DCI scheduling the physical data channel reception of the UE is transmitted.

In addition, when the DCI schedules reception of the physical data channel of the UE, the UE may not expect that the first OFDM symbol and the last OFDM symbol of the time-frequency resource in which the physical data channel reception of the UE is scheduled are located in different slots. Specifically, the UE may determine the last OFDM symbol of the time-frequency resource in which the reception of the physical data channel of the UE is scheduled as the last OFDM symbol of the slot in which the start OFDM symbol of the time-frequency resource scheduled for reception of the physical data channel of the UE is located or the symbol before the last OFDM symbol. For example, the number of OFDM symbols included in the slot may be 14, and the DCI may indicate the first OFDM symbol of the time-frequency resource in which the physical data channel reception of the UE is scheduled as the seventh OFDM symbol. In this case, when the number of OFDM symbols occupied by the time-frequency resource scheduled for the physical data channel reception of the UE, which is indicated by the DCI, is 7, the UE may determine the OFDM symbol scheduled for the physical data channel reception of the UE as the seventh OFDM symbol to the fourteenth OFDM symbol. In the above-described embodiments, the physical data channel received by the UE may be a PDSCH.

The embodiment in which the base station indicates the position of the starting symbol of the continuous resource scheduled for the UE using the index of the reference OFDM symbol can also be applied a case in which the base station schedules the physical channel transmission of the UE. In more detail, the UE may determine the index of the reference OFDM symbol as the first OFDM symbol of the slot. The OFDM symbol mentioned in relation to the physical channel transmission of the UE may be a DFT-S-OFDM symbol.

In another specific embodiment, the UE may determine the index of the reference OFDM symbol based on the mapping type of the physical data channel transmitted by the UE. In this case, the mapping type of the physical data channel transmitted by the UE may indicate whether the location of the DMRS is determined regardless of the location of the physical data channel. In addition, the physical channel transmitted by the UE may be a PUSCH. In addition, the mapping type of the physical data channel transmitted by the UE may be configured through the UL-DMRS-config-type transmitted through the RRC signal. In more detail, a mapping type of a physical data channel may be classified into a type A and a type B. The type A may indicate that the position of the first DMRS is fixed in the slot. In addition, the type B may indicate that the first DMRS is located in the first OFDM symbol of the physical data channel. When the mapping type of the physical data channel is the type A, the UE may determine the index of the reference OFDM symbol as the index of the first OFDM symbol corresponding to the physical data channel. When the mapping type of the physical data channel is the type B, the UE may determine that the index of the reference OFDM symbol is 0.

In another specific embodiment, the UE may determine the index of the reference OFDM symbol based on the mapping type of the physical data channel transmitted by the UE and the UL transmission waveform. The UE may perform UL transmission using any one of CP-OFDM and DFT-S-OFDM. The base station may configure whether the UE uses one of CP-OFDM and DFT-S-OFDM using the RRC signal. When the mapping type of the physical data channel is the type B, the UE may determine that the index of the reference OFDM symbol is 0. If the mapping type of the physical data channel is the type A and the UE is configured to use the DFT-S-OFDM waveform, the UE may determine the index of the reference OFDM symbol as the index of the OFDM symbol next to the OFDM symbol in which the first DMRS is located. This is because a DFT-S-OFDM symbol used as a UL DMRS may not be used for physical data channel UL transmission. In addition, if the mapping type of the physical data channel is type A and the UE is configured to use a CP-OFDM waveform, the UE may determine the index of the reference OFDM symbol as the index of the OFDM symbol in which the first DMRS is located.

In another specific embodiment, the UE may determine the index of the reference OFDM symbol based on the semi-statically configured symbol configuration. In more detail, the UE may determine the index of the reference OFDM symbol as the index of the unknown symbol immediately after the DL symbol in the slot in which the physical data channel of the UE is scheduled. In another specific embodiment, the UE may determine the index of the reference OFDM symbol as a value obtained by adding the number of GAP symbols to the index of the unknown symbol immediately after the DL symbol in the slot in which the physical data channel of the UE is scheduled. The number of GAP symbols may be determined based on a timing advance (TA) value and an OFDM symbol length. In another specific embodiment, the number of GAP symbols may be configured by the base station. In addition, when the DL data channel is scheduled for the unknown symbol, the UE may regard the unknown symbol as a DL symbol. In addition, when the UL data channel is scheduled for the unknown symbol, the UE may regard the unknown symbol as a UL symbol.

In addition, when the DCI schedules transmission of the physical data channel of the UE, the UE may not expect that the first OFDM symbol and the last OFDM symbol of the time-frequency resource in which the physical data channel transmission of the UE is scheduled are located in different slots. Specifically, the UE may determine the last OFDM symbol of the time-frequency resource in which the transmission of the physical data channel of the UE is scheduled as the last OFDM symbol of the slot in which the start OFDM symbol of the time-frequency resource scheduled for transmission of the physical data channel of the UE is located or the symbol before the last OFDM symbol. For example, the number of OFDM symbols included in the slot may be 14, and the DCI may indicate the first OFDM symbol of the time-frequency resource in which the physical data channel transmission of the UE is scheduled as the seventh OFDM symbol. In this case, when the number of OFDM symbols occupied by the time-frequency resource scheduled for the physical data channel transmission of the UE, which is indicated by the DCI, is 7, the UE may determine the OFDM symbol scheduled for the physical data channel transmission of the UE as the seventh OFDM symbol to the fourteenth OFDM symbol. In the above-described embodiments, the physical data channel transmitted by the UE may be a PUSCH.

In the above-described embodiments, the physical data channel may include a PDSCH or a PUSCH. In addition, the physical control channel may include a PDCCH or a PUCCH. In addition, in the embodiment described using PUSCH, PDCCH, PUCCH, and PDCCH, other types of data channels and control channels may be applied.

The method and system of the present disclosure are described in relation to specific embodiments, configuration elements, a part of or the entirety of operations of the present disclosure may be implemented using a computer system having general purpose hardware architecture.

The aforementioned description of the present disclosure has been presented for the purposes of illustration and description. It is apparent to a person having ordinary skill in the art to which the present disclosure relates that the present disclosure can be easily modified into other detailed forms without changing the technical principle or essential features of the present disclosure. Therefore, these embodiments as described above are only proposed for illustrative purposes and do not limit the present disclosure. For example, each component described to be of a single type can be implemented in a distributed manner. Likewise, components described to be distributed can be implemented in a combined manner.

The scope of the present disclosure is presented by the accompanying Claims rather than the aforementioned description. It should be understood that all changes or modifications derived from the definitions and scopes of the Claims and their equivalents fall within the scope of the present disclosure.

The invention claimed is:

1. A terminal of a wireless communication system, the terminal comprising:
a communication module; and
a processor configured to control the communication module,
wherein the processor is configured to:
receive a radio resource control (RRC) signal from a base station of the wireless communication system through the communication module,
determine a first time-frequency resource corresponding to at least one resource-set indicated by the RRC signal, receive a physical control channel from the base station through the communication module, wherein the physical control channel schedules a physical data channel in a plurality of slots, determine a second time-frequency resource in which a physical data channel reception of the terminal is scheduled by the physical control channel, wherein the first time-frequency resource overlaps the second time-frequency resource, wherein the overlapping time-frequency resource includes a plurality of sub-resource-sets, obtain a rate-matching indicator from a downlink control information (DCI) field of the physical control channel, and receive the physical data channel according to the rate-matching indicator, wherein the resource-set is a set of time-frequency resources.

2. The terminal of claim 1, wherein each of the plurality of sub-resource-sets is divided based on a frequency domain among the overlapping time-frequency resources without distinction in a time domain.

3. The terminal of claim 1, wherein the at least one resource-set are respectively identified by indices which are different from each other,
wherein the rate-matching indicator is composed of a plurality of bits,
wherein a sub-resource-set indicated by each of the plurality of bits is determined based on the indices.

4. The terminal of claim 1, wherein when the second time-frequency resource and all of the at least one resource-set do not overlap, the processor is configured to receive the physical data channel in the second time-frequency resource, regardless of the rate-matching indicator.

5. The terminal of claim 1, wherein the physical control channel is received in a first slot,
wherein when the second time-frequency resource and the at least one resource-set overlap in a second slot in which the physical data channel is received, the processor is configured to perform rate matching to receive the physical data channel in a time-frequency resource except for a time-frequency resource in which the at least one resource-set overlaps with a time-frequency in which the physical data channel is scheduled in a time-frequency resource in which a physical data channel is scheduled in the second slot,
wherein the first slot and the second slot are different from each other.

6. A method of operating a terminal of a wireless communication system, the method comprising:
receiving a radio resource control (RRC) signal from a base station of the wireless communication system;
determining a first time-frequency resource corresponding to at least one resource-set indicated by the RRC signal;
receiving a physical control channel from the base station, wherein the physical control channel schedules a physical data channel in a plurality of slots;
determining a second time-frequency resource in which a physical data channel reception of the terminal is scheduled by the physical control channel wherein the first time-frequency resource overlaps the second time-frequency resource, wherein the overlapping time-frequency resource includes a plurality of sub-resource-sets,
obtaining a rate-matching indicator from a downlink control information (DCI) field of the physical control channel; and
receiving the physical data channel according to the rate-matching indicator,
wherein the resource-set is a set of time-frequency resources.

7. The method of claim 6, wherein each of the plurality of sub-resource-sets is divided based on a frequency domain among the overlapping time-frequency resources without distinction in a time domain.

8. The method of claim 6, wherein the at least one resource-set are respectively identified by indices which are different from each other,
wherein the rate-matching indicator is composed of a plurality of bits,
wherein a sub-resource-set indicated by each of the plurality of bits is determined based on the indices.

9. The method of claim 6, wherein the receiving the physical data channel comprises, when the second time-frequency resource and all of the at least one resource-set do not overlap, receiving the physical data channel in the second time-frequency resource, regardless of the rate-matching indicator.

10. The method of claim 6, wherein the physical control channel is received in a first slot,
wherein the receiving the physical data channel comprises, when the second time-frequency resource and the at least one resource-set overlap in a second slot in which the physical data channel is received, performing rate matching to receive the physical data channel in a time-frequency resource except for a time-frequency resource in which a time-frequency resource in which the at least one resource-set overlaps with a time-frequency in which the physical data channel is scheduled in a time-frequency resource in which a physical data channel is scheduled in the second slot,
wherein the first slot and the second slot are different from each other.

* * * * *